United States Patent
Chen et al.

(10) Patent No.: US 9,061,940 B2
(45) Date of Patent: *Jun. 23, 2015

(54) CONCRETE COMPOSITIONS AND METHODS

(71) Applicant: Calera Corporation, Los Gatos, CA (US)

(72) Inventors: Irvin Chen, Santa Clara, CA (US); Patricia Tung Lee, Oxford (GB); Joshua Patterson, Watsonville, CA (US)

(73) Assignee: Calera Corporation, Los Gatos, CA (US)

( * ) Notice: Subject to any disclaimer, the term of this patent is extended or adjusted under 35 U.S.C. 154(b) by 305 days.
This patent is subject to a terminal disclaimer.

(21) Appl. No.: 13/573,786

(22) Filed: Oct. 3, 2012

(65) Prior Publication Data
US 2013/0167756 A1 Jul. 4, 2013

Related U.S. Application Data

(63) Continuation-in-part of application No. 13/294,967, filed on Nov. 11, 2011, now abandoned, which is a (Continued)

(51) Int. Cl.
*C04B 7/28* (2006.01)
*C04B 7/34* (2006.01)
(Continued)

(52) U.S. Cl.
CPC .............. *C04B 12/00* (2013.01); *C04B 7/424* (2013.01); *C04B 28/021* (2013.01);
(Continued)

(58) Field of Classification Search
CPC .... C04B 20/008; C04B 20/0076; C04B 7/28; C04B 14/26; C04B 14/28; C04B 18/08; C04B 18/141; C04B 18/06; C04B 18/061; C04B 18/062; C04B 18/067; C04B 28/02; C04B 28/04; C04B 28/021; C04B 2103/0086; C04B 2103/0084; C04B 31/24; C04B 31/086; C04B 31/20; C04B 7/24; C04B 7/34; C04B 7/345; C04B 7/36; C04B 7/367; C04B 7/421; C04B 7/424; C04B 14/06; C04B 14/106; C04B 22/10; C04B 28/10; C04B 2103/1037
USPC .............. 52/220.1, 294, 306, 309.12, 309.17, 52/745.05, 223.6; 95/129, 134, 135, 139, 95/141–143; 106/461, 462, 638, 705, 708, 106/713–715, 718, 723, 738, 739, 106/811–818; 423/220, 230, 232, 158, 423/242.1, 243.01, 245.1, 419.1, 430–432, 423/441, 155, 165, 173, 594.18, 437.1; 404/17, 34, 44; 210/702, 710, 714, 210/717, 718, 72, 724, 726, 728–774, 210/748.01, 806; 588/252.2, 256, 257, 251, 588/400; 204/157.47, 515
See application file for complete search history.

(56) References Cited

U.S. PATENT DOCUMENTS 3,538,036 A * 11/1970 Frazier et al. ..................... 524/5
(Continued)

FOREIGN PATENT DOCUMENTS

EP 2253600 A1 11/2010
(Continued)

OTHER PUBLICATIONS

Constantz, B. (2009) "The Risk of Implementing New Regulations on Game-Changing Technology: Sequestering CO2 in the Built Environment" AGU, 90(22), Jt. Assem, Suppl., Abstract.
(Continued)

*Primary Examiner* — Joseph Drodge
(74) *Attorney, Agent, or Firm* — Vandana Bansal; Calera Corporation

(57) ABSTRACT

Provided herein are compositions, methods, and systems for cementitious compositions containing calcium carbonate compositions and aggregate. The compositions find use in a variety of applications, including use in a variety of building materials and building applications.

23 Claims, 7 Drawing Sheets

Related U.S. Application Data continuation-in-part of application No. 12/838,794, filed on Jul. 19, 2010, now Pat. No. 8,470,275, which is a continuation of application No. 12/604,383, filed on Oct. 22, 2009, now Pat. No. 7,815,880, and a continuation-in-part of application No. 12/571,398, filed on Sep. 30, 2009, now Pat. No. 7,771,684.

(60) Provisional application No. 61/101,631, filed on Sep. 30, 2008, provisional application No. 61/107,645, filed on Oct. 22, 2008, provisional application No. 61/110,489, filed on Oct. 31, 2008, provisional application No. 61/116,141, filed on Nov. 19, 2008, provisional application No. 61/117,542, filed on Nov. 24, 2008, provisional application No. 61/148,353, filed on Jan. 29, 2009, provisional application No. 61/149,610, filed on Feb. 3, 2009, provisional application No. 61/149,640, filed on Feb. 3, 2009, provisional application No. 61/225,880, filed on Jul. 15, 2009, provisional application No. 61/234,251, filed on Aug. 14, 2009, provisional application No. 61/246,042, filed on Sep. 25, 2009, provisional application No. 61/471,986, filed on Apr. 5, 2011, provisional application No. 61/476,730, filed on Apr. 18, 2011, provisional application No. 61/542,426, filed on Oct. 3, 2011.

(51) Int. Cl.
*C04B 7/345* (2006.01)
*C04B 7/24* (2006.01)
*C04B 14/28* (2006.01)
*C04B 18/06* (2006.01)
*C04B 18/08* (2006.01)
*C04B 28/02* (2006.01)
*C04B 28/10* (2006.01)
*C04B 12/00* (2006.01)
*C04B 7/42* (2006.01)
*C04B 7/36* (2006.01)
*C01B 31/24* (2006.01)
*C04B 111/10* (2006.01)

(52) U.S. Cl.
CPC ............ *C04B 7/364* (2013.01); *C04B 18/062* (2013.01); *C04B 7/421* (2013.01); *C01B 31/24* (2013.01); *C04B 14/28* (2013.01); *C04B 7/34* (2013.01); *C04B 2111/1037* (2013.01); *C04B 28/10* (2013.01)

(56) References Cited

U.S. PATENT DOCUMENTS

| | | | |
|---|---|---|---|
| 4,997,484 A * | 3/1991 | Gravitt et al. | 106/708 |
| 5,518,540 A * | 5/1996 | Jones, Jr. | 106/638 |
| 5,690,729 A * | 11/1997 | Jones, Jr. | 106/682 |
| 5,897,704 A * | 4/1999 | Baglin | 106/696 |
| 6,264,736 B1 * | 7/2001 | Knopf et al. | 106/682 |
| 7,735,274 B2 | 6/2010 | Constantz et al. | |
| 7,744,761 B2 | 6/2010 | Constantz et al. | |
| 7,749,476 B2 | 7/2010 | Constantz et al. | |
| 7,753,618 B2 | 7/2010 | Constantz et al. | |
| 7,754,169 B2 | 7/2010 | Constantz et al. | |
| 7,771,684 B2 | 8/2010 | Constantz et al. | |
| 7,790,012 B2 | 9/2010 | Kirk et al. | |
| 7,815,880 B2 | 10/2010 | Constantz et al. | |
| 7,829,053 B2 | 11/2010 | Constantz et al. | |
| 7,875,163 B2 | 1/2011 | Gilliam et al. | |
| 7,887,694 B2 | 2/2011 | Constantz et al. | |
| 7,906,028 B2 | 3/2011 | Constantz et al. | |
| 7,914,685 B2 | 3/2011 | Constantz et al. | |
| 7,922,809 B1 * | 4/2011 | Constantz et al. | 106/713 |
| 7,931,809 B2 | 4/2011 | Constantz et al. | |
| 7,939,336 B2 | 5/2011 | Constantz et al. | |
| 7,966,250 B2 | 6/2011 | Constantz et al. | |
| 7,993,500 B2 | 8/2011 | Gilliam et al. | |
| 7,993,511 B2 | 8/2011 | Gilliam et al. | |
| 8,006,446 B2 | 8/2011 | Constantz et al. | |
| 8,062,418 B2 | 11/2011 | Constantz et al. | |
| 8,114,214 B2 * | 2/2012 | Constantz et al. | 106/738 |
| 8,137,455 B1 | 3/2012 | Constantz et al. | |
| 2009/0001020 A1 | 1/2009 | Constantz et al. | |
| 2009/0020044 A1 | 1/2009 | Constantz et al. | |
| 2009/0169452 A1 | 7/2009 | Constantz et al. | |
| 2009/0202410 A1 | 8/2009 | Kawatra et al. | |
| 2009/0301352 A1 | 12/2009 | Constantz et al. | |
| 2010/0000444 A1 | 1/2010 | Constantz et al. | |
| 2010/0024686 A1 | 2/2010 | Constantz et al. | |
| 2010/0051859 A1 | 3/2010 | House et al. | |
| 2010/0063902 A1 | 3/2010 | Constantz et al. | |
| 2010/0077691 A1 | 4/2010 | Constantz et al. | |
| 2010/0077922 A1 | 4/2010 | Constantz et al. | |
| 2010/0083880 A1 | 4/2010 | Constantz et al. | |
| 2010/0084280 A1 | 4/2010 | Gilliam et al. | |
| 2010/0111810 A1 | 5/2010 | Constantz et al. | |
| 2010/0116683 A1 | 5/2010 | Gilliam et al. | |
| 2010/0132556 A1 | 6/2010 | Constantz et al. | |
| 2010/0132591 A1 | 6/2010 | Constantz et al. | |
| 2010/0135865 A1 | 6/2010 | Constantz et al. | |
| 2010/0135882 A1 | 6/2010 | Constantz et al. | |
| 2010/0140103 A1 | 6/2010 | Gilliam et al. | |
| 2010/0144521 A1 | 6/2010 | Constantz et al. | |
| 2010/0150802 A1 | 6/2010 | Gilliam et al. | |
| 2010/0154679 A1 | 6/2010 | Constantz et al. | |
| 2010/0155258 A1 | 6/2010 | Kirk et al. | |
| 2010/0158786 A1 | 6/2010 | Constantz et al. | |
| 2010/0196104 A1 | 8/2010 | Constantz et al. | |
| 2010/0200419 A1 | 8/2010 | Gilliam et al. | |
| 2010/0219373 A1 | 9/2010 | Seeker et al. | |
| 2010/0224503 A1 | 9/2010 | Kirk et al. | |
| 2010/0229725 A1 | 9/2010 | Farsad et al. | |
| 2010/0230293 A1 | 9/2010 | Gilliam et al. | |
| 2010/0230830 A1 | 9/2010 | Farsad et al. | |
| 2010/0236242 A1 | 9/2010 | Farsad et al. | |
| 2010/0239467 A1 | 9/2010 | Constantz et al. | |
| 2010/0239487 A1 | 9/2010 | Constantz et al. | |
| 2010/0247410 A1 | 9/2010 | Constantz et al. | |
| 2010/0258035 A1 | 10/2010 | Constantz et al. | |
| 2010/0276299 A1 | 11/2010 | Kelly et al. | |
| 2010/0290967 A1 | 11/2010 | Detournay et al. | |
| 2010/0313793 A1 | 12/2010 | Constantz et al. | |
| 2010/0313794 A1 | 12/2010 | Constantz et al. | |
| 2010/0319586 A1 | 12/2010 | Blount et al. | |
| 2010/0326328 A1 | 12/2010 | Constantz et al. | |
| 2011/0030586 A1 | 2/2011 | Constantz et al. | |
| 2011/0030957 A1 | 2/2011 | Constantz et al. | |
| 2011/0033239 A1 | 2/2011 | Constantz et al. | |
| 2011/0035154 A1 | 2/2011 | Kendall et al. | |
| 2011/0036728 A1 | 2/2011 | Farsad et al. | |
| 2011/0042230 A1 | 2/2011 | Gilliam et al. | |
| 2011/0054084 A1 | 3/2011 | Constantz et al. | |
| 2011/0059000 A1 | 3/2011 | Constantz et al. | |
| 2011/0067600 A1 | 3/2011 | Constantz et al. | |
| 2011/0067603 A1 | 3/2011 | Constantz et al. | |
| 2011/0067605 A1 | 3/2011 | Constantz et al. | |
| 2011/0071309 A1 | 3/2011 | Constantz et al. | |
| 2011/0079515 A1 | 4/2011 | Gilliam et al. | |
| 2011/0083968 A1 | 4/2011 | Gilliam et al. | |
| 2011/0091366 A1 | 4/2011 | Kendall et al. | |
| 2011/0091955 A1 | 4/2011 | Constantz et al. | |
| 2011/0132234 A1 | 6/2011 | Constantz et al. | |
| 2011/0147227 A1 | 6/2011 | Gilliam et al. | |
| 2011/0203489 A1 | 8/2011 | Constantz et al. | |
| 2011/0226989 A9 | 9/2011 | Seeker et al. | |
| 2011/0240916 A1 | 10/2011 | Constantz et al. | |
| 2011/0247336 A9 | 10/2011 | Farsad et al. | |

(56) References Cited

U.S. PATENT DOCUMENTS

2011/0277474 A1 11/2011 Constantz et al.
2011/0277670 A1 11/2011 Self et al.

FOREIGN PATENT DOCUMENTS

| | | |
|---|---|---|
| JP | 2006-075717 A | 3/2006 |
| KR | 10-2010-0023813 A | 3/2010 |
| WO | WO 2008/018928 A2 | 2/2008 |
| WO | WO 2008/148055 A1 | 12/2008 |
| WO | WO 2009/006295 A2 | 1/2009 |
| WO | WO 2008/018928 A3 | 3/2009 |
| WO | WO 2009/086460 A1 | 7/2009 |
| WO | WO 2009/006295 A3 | 12/2009 |
| WO | WO 2009/146436 A1 | 12/2009 |
| WO | WO 2009/155378 A1 | 12/2009 |
| WO | WO 2010/006242 A1 | 1/2010 |
| WO | WO 2010/008896 A1 | 1/2010 |
| WO | WO 2010/009273 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/048457 A1 | 4/2010 |
| WO | WO 2010/051458 A1 | 5/2010 |
| WO | WO 2010/068924 A1 | 6/2010 |
| WO | WO 2010/074686 A1 | 7/2010 |
| WO | WO 2010/074687 A1 | 7/2010 |
| WO | WO 2010/087823 A1 | 8/2010 |
| WO | WO 2010/091029 A1 | 8/2010 |
| WO | WO 2010/093713 A1 | 8/2010 |
| WO | WO 2010/093716 A1 | 8/2010 |
| WO | WO 2010/101953 A1 | 9/2010 |
| WO | WO 2010/104989 A1 | 9/2010 |
| WO | WO 2010/132863 A1 | 11/2010 |
| WO | WO 2010/136744 A1 | 12/2010 |
| WO | WO 2011/008223 A1 | 1/2011 |
| WO | WO 2011/017609 A1 | 2/2011 |
| WO | WO 2011/038076 A1 | 3/2011 |
| WO | WO 2011/049996 A1 | 4/2011 |
| WO | WO 2011/066293 A1 | 6/2011 |
| WO | WO 2011/075680 A1 | 6/2011 |
| WO | WO 2011/081681 A1 | 7/2011 |
| WO | WO 2011/097468 A2 | 8/2011 |
| WO | WO 2011/102868 A1 | 8/2011 |

OTHER PUBLICATIONS

International search report and written opinion dated Jul. 25, 2013 for PCT/US2012/000498.

* cited by examiner

CONCRETE COMPOSITIONS AND METHODS

CROSS-REFERENCE TO RELATED APPLICATIONS

This application claims priority to U.S. Provisional Patent Application No. 61/542,426, filed 3 Oct. 2011 and is a continuation-in-part of U.S. application Ser. No. 13/294,967, filed 11 Nov. 2011, which:
is a continuation-in-part of U.S. application Ser. No. 12/838,794, filed 19 Jul. 2010, which is a continuation of U.S. application Ser. No. 12/604,383, filed 22 Oct. 2009, issued as U.S. Pat. No. 7,815,880, which is a continuation-in-part of U.S. application Ser. No. 12/571,398, filed 30 Sep. 2009, issued as U.S. Pat. No. 7,771,684; and
claims priority to U.S. Provisional Patent Application No. 61/101,631, filed 30 Sep. 2008; U.S. Provisional Patent Application No. 61/107,645, filed 22 Oct. 2008; U.S. Provisional Patent Application No. 61/110,489, filed 31 Oct. 2008; U.S. Provisional Patent Application No. 61/116,141, filed 19 Nov. 2008; U.S. Provisional Patent Application No. 61/117,542, filed 24 Nov. 2008; U.S. Provisional Patent Application No. 61/148,353, filed 29 Jan. 2009; U.S. Provisional Patent Application No. 61/149,610, filed 3 Feb. 2009; U.S. Provisional Patent Application No. 61/149,640, filed 3 Feb. 2009; U.S. Provisional Patent Application No. 61/225,880, filed 15 Jul. 2009; U.S. Provisional Patent Application No. 61/234,251, filed 14 Aug. 2009; U.S. Provisional Patent Application No. 61/246,042, filed 25 Sep. 2009; U.S. Provisional Patent Application No. 61/471,986, filed 5 Apr. 2011; and U.S. Provisional Patent Application No. 61/476,730, filed 18 Apr. 2011,
all of which are incorporated herein by reference in their entireties in the present disclosure.

STATEMENT AS TO FEDERALLY SPONSORED RESEARCH

Work described herein was made in whole or in part with the support of the United States Government under Contract number Award No. DE-FE0002472 awarded by the Department of Energy. The Government has certain rights in this invention.

BACKGROUND

Concrete may be a widely used engineering material in the world. It is estimated that the present world consumption of concrete may be 11 billion metric tons per year. Concrete refers to a composite material of a binding medium having particles or fragments of aggregate embedded therein. In most construction concretes employed, the binding medium typically is formed from a mixture of a hydraulic cement and water. Typically, most of the hydraulic cements employed today are based upon Portland cement. Portland cement is made primarily from limestone, certain clay minerals, and gypsum in a high temperature process that drives off carbon dioxide and chemically combines the primary ingredients into new compounds. The energy required to fire the mixture may consume about 4 GJ per ton of cement produced. Because carbon dioxide is generated by both the cement production process itself, as well as by energy plants that generate power to run the production process, cement production is typically a leading source of carbon dioxide atmospheric emissions. It is estimated that cement plants account for 5% of global emissions of carbon dioxide. Additionally, cement plants produce other pollutants like NOx, SOx, VOCs, particulates and mercury. Cement plants also produce cement kiln dust (CKD), which need to be land filled, often in hazardous materials landfill sites. As global warming, pollution, and ocean acidification become an increasing problem and the desire to reduce carbon dioxide gas emissions (a principal cause of global warming) continues, there exists a need for more environment friendly methods to produce cement or concrete.

SUMMARY

In one aspect, there is provided a cementitious composition, comprising between 10-55 wt % of a composition comprising calcium carbonate, wherein between 50-100 wt % of the calcium carbonate is in a metastable polymorphic form comprising vaterite, and wherein the calcium carbonate has a $\delta^{13}C$ value of between −12 to −30‰; and between 45-90 wt % of aggregate, wherein the cementitious composition after combination with water sets and hardens into cement where the calcium carbonate binds to the aggregate and the cement has a compressive strength of at least 2000 psi or between 2000-6000 psi. In some embodiments of the foregoing aspect, the cementitious composition comprises between 10-25 wt % of the composition comprising calcium carbonate and between 75-90 wt % of the aggregate. In some embodiments of the foregoing aspect and embodiments, the calcium carbonate comprises other polymorphic forms selected from the group consisting of amorphous calcium carbonate, aragonite, calcite, and combinations thereof. In some embodiments of the foregoing aspect and embodiments, the aggregate comprises fine aggregate, coarse aggregate, or a combination thereof. In some embodiments of the foregoing aspect and embodiments, the fine aggregate is sand. In some embodiments of the foregoing aspect and embodiments, the coarse aggregate is rock. In some embodiments of the foregoing aspect and embodiments, the compressive strength of at least 2000 psi is after at least 1 day, 7 days, or 28 days. In some embodiments of the foregoing aspect and embodiments, the cement has a compressive strength of at least 3000 psi or between 2000-6000 psi. In some embodiments of the foregoing aspect and embodiments, the cement has a porosity of between 10-90%. In some embodiments of the foregoing aspect and embodiments, the cementitious composition further comprises fly ash, slag, metakaolin, admixture, or combinations thereof.

Provided herein is a composition, comprising less than 50% calcium carbonates by weight, the remainder of the composition being aggregate, wherein the calcium carbonates bind to the aggregate, and wherein the composition has a compressive strength of at least 3000 psi and a porosity of at least 25% at least 7-days after preparation of the composition. In some embodiments of the foregoing aspect, the composition comprises less than 40% calcium carbonates by weight, the remainder of the composition being aggregate. In some embodiments of the foregoing aspect and embodiments, the composition comprises less than 30% calcium carbonates by weight, the remainder of the composition being aggregate. In some embodiments of the foregoing aspect and embodiments, the composition comprises less than 20% calcium carbonates by weight, the remainder of the composition being aggregate. In some embodiments of the foregoing aspect and embodiments, the composition comprises less than 10% calcium carbonates by weight, the remainder of the composition being aggregate. In some embodiments of the foregoing aspect and embodiments, the aggregate comprises fine aggregate, coarse aggregate, or a combination of fine and coarse aggregate. In some embodiments of the foregoing aspect and embodiments, the aggregate comprises fine aggregate. In some embodiments of the foregoing aspect and embodiments, the fine aggregate is sand. In some embodiments of the foregoing aspect and embodiments, the aggregate comprises coarse aggregate. In some embodiments of the foregoing aspect and embodiments, the coarse aggregate is rock. In some embodiments of the foregoing aspect and embodiments, the aggregate comprises a combination of fine aggregate and coarse aggregate. In some embodiments of the foregoing aspect and embodiments, the fine aggregate is sand and the coarse aggregate is rock. In some embodiments of the foregoing aspect and embodiments, the composition has a compressive strength of at least 4000 psi at least 7-days after preparation of the composition. In some embodiments of the foregoing aspect and embodiments, the composition has a compressive strength of at least 5000 psi at least 7-days after preparation of the composition. In some embodiments of the foregoing aspect and embodiments, the composition has a porosity of at least 25% and less than 55%.

In one aspect, there is provided a method for forming a cementitious composition, comprising mixing between 10-55 wt % of a composition comprising calcium carbonate, wherein between 50-100 wt % of the calcium carbonate is in a metastable polymorphic form comprising vaterite, and wherein the calcium carbonate has a $\delta^{13}C$ value of between −12 to −30‰, with between 45-90 wt % of aggregate to form a cementitious composition, and contacting the cementitious composition with water when the cementitious composition sets and hardens into cement with a compressive strength of at least 2000 psi where the calcium carbonate binds to the aggregate. In some embodiments of the foregoing aspect, the method further comprises before the mixing step a) making the composition comprising calcium carbonate by contacting an industrial waste gas stream comprising carbon dioxide with a proton removing agent to form a carbon dioxide charged water; and b) contacting the carbon dioxide charged water with divalent cations to form the composition comprising calcium carbonate. In some embodiments of the foregoing aspect and embodiments, the contacting of the carbon dioxide charged water with the divalent cations is under precipitation conditions that favor the formation of the composition comprising calcium carbonate that has between 50-100 wt % of the calcium carbonate in a metastable polymorphic form comprising vaterite. In some embodiments of the foregoing aspect and embodiments, the precipitation conditions are selected from temperature, pH, residence time, proton removing agent, additive, ion ratio, rate of precipitation, mixing rate, form of agitation, presence of seed crystal, catalyst, membrane, substrate, separation, drying, refining, and combinations thereof. In some embodiments of the foregoing aspect and embodiments, the industrial waste gas stream is from an industrial plant selected from power plant, chemical processing plant, steel mill, paper mill, cement plant, other industrial plant that produces $CO_2$ as a byproduct, and combinations thereof. In some embodiments of the foregoing aspect and embodiments, the proton removing agent is NaOH, $Na_2CO_3$, KOH, $K_2CO_3$, $NH_4OH$, $Ca(OH)_2$, $Mg(OH)_2$, or combinations thereof. In some embodiments of the foregoing aspect and embodiments, the method further comprises drying the composition to form the composition having a particle size of between 1-50 microns. In some embodiments of the foregoing aspect and embodiments, the calcium carbonate binds to the aggregate when the vaterite transforms to aragonite. In some embodiments of the foregoing aspect and embodiments, the calcium carbonate comprises other polymorphic forms selected from the group consisting of amorphous calcium carbonate, aragonite, calcite, and combinations thereof. In some embodiments of the foregoing aspect and embodiments, the aggregate comprises fine aggregate, coarse aggregate, or a combination thereof. In some embodiments of the foregoing aspect and embodiments, the fine aggregate is sand and the coarse aggregate is rock. In some embodiments of the foregoing aspect and embodiments, the compressive strength of at least 2000 psi is after at least 1 day, 7 days, or 28 days. In some embodiments of the foregoing aspect and embodiments, the method further comprises adding fly ash, slag, metakaolin, admixture, or combinations thereof to the cementitious composition. In some embodiments of the foregoing aspect and embodiments, the method further comprises pouring the cementitious composition to form a building material.

Provided herein is a method, comprising: a) processing a waste gas stream comprising carbon dioxide to produce an original composition comprising one or more carbonates; b) removing process water from the original composition to produce a concentrated composition, concentrated with respect to the one or more carbonates; d) producing from the concentrated composition a hardened composition, wherein the hardened composition has a compressive strength of at least 2000 psi and a porosity of at least 25% at 7-days. In some embodiments, the carbonates are calcium carbonates, magnesium carbonates, or a combination of calcium carbonates and magnesium carbonates. In some embodiments, the carbonates are calcium carbonates. In some embodiments, the carbonates are selected from the group of calcium carbonates consisting of amorphous calcium carbonate, vaterite, aragonite, ikaite, and calcite. In some embodiments, the carbonates comprise vaterite. In some embodiments, the carbonates further comprise calcite. In some embodiments, the vaterite to calcite ratio is at least 1:1. In some embodiments, the vaterite to calcite ratio is at least 3:1. In some embodiments, the vaterite to calcite ratio is at least 9:1. In some embodiments, removing process water from the original composition produces a concentrated composition comprising at least 50% solids. In some embodiments, removing process water from the original composition produces a concentrated composition comprising at least 25% solids. In some embodiments, removing process water from the original composition produces a concentrated composition comprising at least 99% solids. In some embodiments, removing process water from the original composition comprises drying the composition at room temperature. In some embodiments, removing process water from the original composition comprises drying the composition at elevated temperature. In some embodiments, the elevated temperature is at least 30° C. and less than 250° C. In some embodiments, the elevated temperature is at least 50° C. and less than 100° C. In some embodiments, particles of the concentrated composition have a mean particle size of less than 250 microns. In some embodiments, particles of the concentrated composition have a mean particle size of less than 100 microns. In some embodiments, particles of the concentrated composition have a mean particle size of less than 50 microns. In some embodiments, the method further comprises adding mix water to the concentrated composition after removing process water. In some embodiments, mix water is added to produce a water:carbonates ratio of at least 0.25 and less than 0.60. In some embodiments, mix water is added to produce a water:carbonates ratio of at least 0.25 and less than 0.50. In some embodiments, mix water is added to produce a water:carbonates ratio of at least 0.25 and less than 0.40. In some embodiments, the method further comprises adding aggregate to the concentrated composition prior to producing the hardened composition. In some embodiments, the composition comprises at least 60% aggregate by weight, the remainder of the composition being the concentrated composition. In some embodiments, the composition comprises at least 70% aggregate by weight, the remainder of the composition being the concentrated composition. In some embodiments, the composition comprises at least 80% aggregate by weight, the remainder of the composition being the concentrated composition. In some embodiments, the composition comprises at least 90% aggregate by weight, the remainder of the composition being the concentrated composition. In some embodiments, the aggregate comprises fine aggregate, coarse aggregate, or a combination of fine and coarse aggregate. In some embodiments, the aggregate comprises fine aggregate. In some embodiments, the fine aggregate is sand. In some embodiments, the aggregate comprises coarse aggregate. In some embodiments, the coarse aggregate is rock. In some embodiments, the aggregate comprises a combination of fine aggregate and coarse aggregate. In some embodiments, the fine aggregate is sand and the coarse aggregate is rock. In some embodiments, the method further comprises heating the hardened composition, increasing the compressive strength of the hardened composition. In some embodiments, the hardened composition is heated to at least 80° C. In some embodiments, the hardened composition has a compressive strength of at least 4000 psi at 7-days. In some embodiments, the hardened composition has a compressive strength of at least 5000 psi at 7-days. In some embodiments, the hardened composition has a porosity of at least 25% and less than 55%.

Provided is a composition produced according to any one of the foregoing methods.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

DETAILED DESCRIPTION

Figure 1:
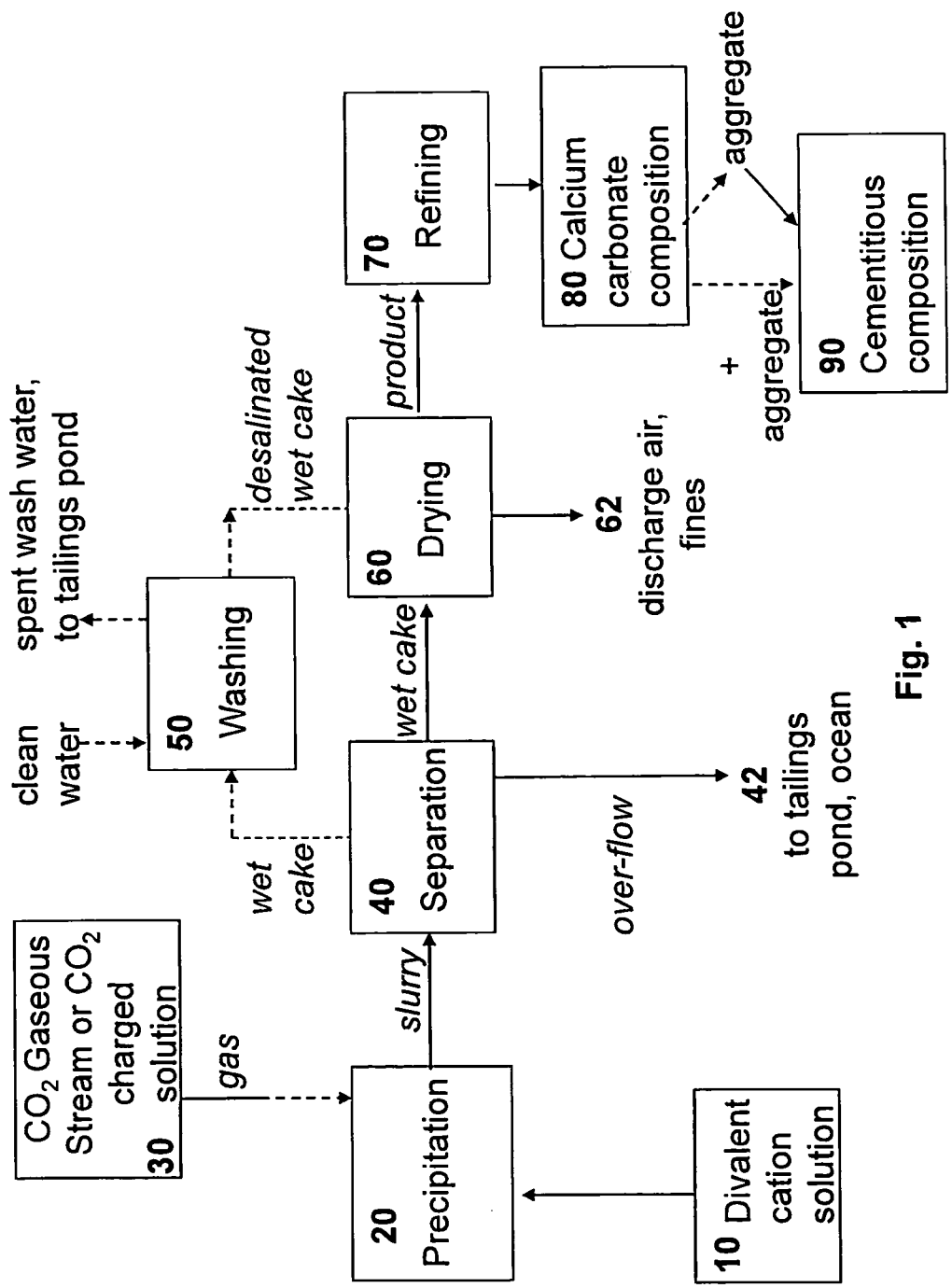
FIG. 1 illustrates a flow diagram for some embodiments provided herein.

Cementitious compositions (cement, mortar, concrete etc.), and methods for making and using the same, are provided. Aspects of the cementitious compositions include producing carbonate compositions from $CO_2$, which compositions when combined with conventional and/or formed aggregate components form cementitious compositions. The compositions find use in a variety of applications, including use in a variety of building materials and building applications.

Before describing in greater detail, it is to be understood that the invention is not limited to particular embodiments described herein as such embodiments may vary. It is also to be understood that the terminology used herein is for the purpose of describing particular embodiments only, and the terminology is not intended to be limiting. The scope of the invention will be limited only by the appended claims. Unless defined otherwise, all technical and scientific terms used herein have the same meaning as commonly understood by one of ordinary skill in the art to which this invention belongs.

Where a range of values is provided, it is understood that each intervening value, to the tenth of the unit of the lower limit unless the context clearly dictates otherwise, between the upper and lower limit of that range and any other stated or intervening value in that stated range, is encompassed. The upper and lower limits of these smaller ranges may independently be included in the smaller ranges and are also encompassed, subject to any specifically excluded limit in the stated range. Where the stated range includes one or both of the limits, ranges excluding either or both of those included limits are also included.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided might be different from the actual publication dates, which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments. Any recited method may be carried out in the order of events recited or in any other order that is logically possible. Although any methods and materials similar or equivalent to those described herein may also be used in the practice or testing of the invention described herein, representative illustrative methods and materials are described herein.

A. Compositions

In one aspect, there are provided cementitious compositions including aggregates and a composition comprising calcium carbonate. The "cementitious composition" or "cement composition" as used herein includes cement, mortar, or concrete compositions that after combination with water set and harden into cement. Fine aggregates such as sand may be added to the cement to make mortar and coarse aggregates such as rocks (optionally including fine aggregates) may be added to the cement to make concrete.

The "calcium carbonate composition" or "precipitation material" or "composition containing calcium carbonate" are used interchangeably herein and include the composition containing calcium carbonate where the calcium carbonate wholly or partially is in the form of vaterite. Other polymorphic forms of calcium carbonate may also be present along with vaterite and include, without limitation, aragonite, calcite, amorphous calcium carbonate or combination thereof.

The composition comprising calcium carbonate is the binding medium in the cementitious composition such that the calcium carbonate binds to the aggregate resulting in high compressive strength. The composition comprising calcium carbonate comprises a metastable component vaterite. The metastable polymorphic form vaterite imparts unexpected and surprising properties to the calcium carbonate composition. The vaterite in the calcium carbonate composition upon contact with water transforms to aragonite which leads to the binding of the calcium carbonate composition with the aggregates. The spherical morphology of the vaterite may also provide higher surface area thereby providing more nucleation sites for the interaction with the aggregate. The binding of the calcium carbonate composition with aggregate leads to high compressive strengths resulting in a material suitable for building applications. It was also surprisingly and unexpectedly found that due to the binding properties of the calcium carbonate composition with aggregate and the resulting high compressive strengths, lower percentages of the calcium carbonate composition in the cementitious composition such as, but not limited to, 10-55 wt % of the calcium carbonate composition with the remaining aggregate may be used that still resulted in high compressive strengths.

In some embodiments, it was also surprisingly and unexpectedly found that the cementitious composition formed from calcium carbonate composition of the invention have high porosity of more than 10% or between 10-90% after setting. The vaterite in the calcium carbonate composition dissolves after combination with water and reprecipitates into aragonite instead of participating in the actual cementing reactions like traditional cements. Therefore, all the initial mix solution may remain in the system after the cementing reaction is completed and may leave porosity after drying. Furthermore, vaterite has a lower specific gravity than aragonite and it is contemplated that the transformation from vaterite to aragonite may leave extra pore space in the matrix. In some embodiments, depending on the water-to-cement ratio and additives used, the porosity of the calcium carbonate cement may be controlled to be between 10%-90%. Porosity may be beneficial for lightweight, thermal insulating, and filtration applications. It is contemplated that conversion of spherical vaterite to needle shaped aragonite may lead to bigger pores in the cement which is not seen in conventional cements such as Ordinary Portland Cement (OPC).

The compositions comprising calcium carbonate may further include calcium bicarbonate forms and carbonate and bicarbonate forms with other cations, such as, but not limited to sodium, magnesium, etc. In addition to the advantages associated with the cementitious compositions described as above, the compositions comprising calcium carbonates may reduce carbon dioxide emissions as these are formed by sequestering carbon dioxide from a carbon dioxide source such as waste streams, such as, but not limited to, flue gases from power plants or carbon dioxide emitted by cement plants and the like. In some embodiments, the composition comprising calcium carbonates contains carbon derived from a fuel used by humans, e.g., carbon having a fossil fuel origin. For example, in some embodiments, the compositions comprising calcium carbonates contain carbon that was released in the form of $CO_2$ from the combustion of fuel. In certain embodiments, the carbon sequestered in the composition is in the form of a carbonate compound. The sequestered carbon dioxide in the form of carbonate and/or bicarbonate is then treated with divalent cations, such as calcium optionally containing magnesium, to precipitate calcium carbonate optionally containing magnesium carbonate compound. Therefore, in certain embodiments, the compositions provided herein contain calcium carbonate compounds where at least part of or whole of the carbon in the calcium carbonate compounds is derived from a fuel used by humans, e.g., a fossil fuel. As such, production of the compositions results in the placement of $CO_2$ into a storage stable form in the cementitious composition, for example, components of the built environment, which environment comprises man-made structures such as buildings, walls, roads, etc. Production of the cementitious compositions thus results in the prevention of $CO_2$ gas from entering the atmosphere. Such capture of the carbon dioxide from burning of fossil fuel results in specific $\delta^{13}C$ value for the carbonate in the composition, described in detail herein.

Accordingly, the cementitious compositions provided herein are reduced-carbon footprint compositions. Such reduced-carbon footprint may be achieved by forming cementitious compositions of the invention using carbon dioxide from flue gas, as well as by offsetting the carbon dioxide emission by replacing the carbon dioxide producing conventional cements, such as OPC. For example, a carbon reduction may result from combining both a cement credit from offsetting the use of ordinary Portland cement (i.e., the $CO_2$ avoided) and the quantity of sequestered carbon from fossil point sources. Each ton of material comprising a $CO_2$-sequestering component (i.e., the calcium carbonate composition or a component comprising precipitation material described herein, or a component prepared from precipitation material) may result in a $CO_2$ reduction of up to 1 ton or more, such as 1.2 tons or more, including 1.6 tons or more, for example 2 tons or more of $CO_2$.

Such reduced-carbon footprint concrete compositions, by virtue of the method of manufacture have smaller carbon footprints than corresponding conventional concrete compositions. In some embodiments, the reduced-carbon footprint concrete compositions are concrete compositions that in addition to calcium carbonate composition, may include a conventional cement component (e.g., OPC) but have a reduced carbon footprint as compared to a concrete that only includes the conventional cement component. As such, production of reduced-carbon footprint concrete compositions results in the prevention of $CO_2$ gas from entering the atmosphere:

In some embodiments, the calcium carbonate compositions provided herein contain carbon from fossil fuel; because of its fossil fuel origin, the carbon isotopic fractionation ($\delta^{13}C$) value of such compositions may be different from that of compositions containing inorganic carbon, e.g., limestone. Typically, the plants from which fossil fuels are derived may preferentially utilize $^{12}C$ over $^{13}C$, thus fractionating the carbon isotopes so that the value of their ratio differs from that in the atmosphere in general; this value, when compared to a standard value (PeeDee Belemnite, or PDB, standard), is termed the carbon isotopic fractionation ($\delta^{13}C$) value. $\delta^{13}C$ values for coal are generally in the range −30 to −20‰ and $\delta^{13}C$ values for methane may be as low as −20‰ to −40‰ or even −40‰ to −80‰. $\delta^{13}C$ values for atmospheric $CO_2$ are −10‰ to −7‰, for limestone +3‰ to −3‰, and for marine bicarbonate, 0‰.

The precipitation material that forms the calcium carbonate composition of the invention, which comprises one or more synthetic carbonates derived from industrial $CO_2$, reflects the relative carbon isotope composition ($\delta^{13}C$) of the fossil fuel (e.g., coal, oil, natural gas, or flue gas) from which the industrial $CO_2$ (from combustion of the fossil fuel) was derived. The relative carbon isotope composition ($\delta^{13}C$) value with units of ‰ (per mil) is a measure of the ratio of the concentration of two stable isotopes of carbon, namely $^{12}C$ and $^{13}C$, relative to a standard of fossilized belemnite (the PDB standard).

$$\delta^{13}\text{‰} = [(^{13}C/^{12}C_{sample} - {}^{13}C/^{12}C_{PDB\ standard})/(^{13}C/^{12}C_{PDB\ standard})] \times 1000$$

$^{12}C$ is preferentially taken up by plants during photosynthesis and in other biological processes that use inorganic carbon because of its lower mass. The lower mass of $^{12}C$ allows for kinetically limited reactions to proceed more efficiently than with $^{13}C$. Thus, materials that are derived from plant material, e.g., fossil fuels, have relative carbon isotope composition values that are less than those derived from inorganic sources. The carbon dioxide in flue gas produced from burning fossil fuels reflects the relative carbon isotope composition values of the organic material that was fossilized. Table I lists relative carbon isotope composition value ranges for relevant carbon sources for comparison.

Composition incorporating carbon from burning fossil fuels may reflect $\delta^{13}C$ values that are like those of plant derived material, i.e. less, than that which incorporates carbon from atmospheric or non-plant marine sources. Verification that the material produced by a carbon dioxide sequestering process is composed of carbon from burning fossil fuels can include measuring the $\delta^{13}C$ value of the resultant material and confirming that it is not similar to the values for atmospheric carbon dioxide, nor marine sources of carbon.

TABLE I

Relative carbon isotope composition ($\delta^{13}C$) values for carbon sources of interest.

| Carbon Source | $\delta^{13}C$ Range [‰] | $\delta^{13}C$ Average value [‰] |
|---|---|---|
| C3 Plants (most higher plants) | −23 to −33 | −27 |
| C4 Plants (most tropical and marsh plants) | −9 to −16 | −13 |
| Atmosphere | −6 to −7 | −6 |
| Marine Carbonate ($CO_3$) | −2 to +2 | 0 |

TABLE I-continued

Relative carbon isotope composition ($\delta^{13}C$) values for carbon sources of interest.

| Carbon Source | $\delta^{13}C$ Range [‰] | $\delta^{13}C$ Average value [‰] |
|---|---|---|
| Marine Bicarbonate ($HCO_3$) | −3 to +1 | −1 |
| Coal from Yallourn Seam in Australia[1] | −27.1 to −23.2 | −25.5 |
| Coal from Dean Coal Bed in Kentucky, USA[2] | −24.47 to −25.14 | −24.805 |

[1]Holdgate, G. R. et al., *Global and Planetary Change*, 65 (2009) pp. 89-103.
[2]Elswick, E. R. et al., *Applied Geochemistry*, 22 (2007) pp. 2065-2077.

As such, the $\delta^{13}C$ value of the composition comprising carbonates may serve as a fingerprint for a $CO_2$ gas source. The $\delta^{13}C$ value may vary from source to source (i.e., fossil fuel source), but the $\delta^{13}C$ value for composition provided herein may range between −9‰ to −35‰. In some embodiments, the $\delta^{13}C$ value for the composition is between −9‰ and −50‰, or between −15‰ and −40‰, or between −15‰ and −35‰, or between −15‰ and −25‰. In some embodiments, the $\delta^{13}C$ value for the composition is less than (i.e., more negative than) −9‰, −10‰, −11‰, −12‰, −13‰, −14‰, −15‰, −16‰, −17‰, −18‰, −19‰, −20‰, −21‰, −22‰, −23‰, −24‰, −25‰, −26‰, −27‰, −28‰, −29‰, −30‰, −31‰, −32‰, −33‰, −34‰, −35‰, −36‰, −37‰, −38‰, −39‰, −40‰, −41‰, −42‰, −43‰, −44‰, or −45‰. Any suitable method may be used for measuring the $\delta^{13}C$ value, methods including, but not limited to, mass spectrometry or off-axis integrated-cavity output spectroscopy (off-axis ICOS). One difference between the carbon isotopes is in their mass. Any mass-discerning technique sensitive enough to measure the amounts of carbon can be used to find ratios of the $^{13}C$ to $^{12}C$ isotope concentrations. Mass spectrometry is typically used to find $\delta^{13}C$ values. Commercially available are bench-top off-axis integrated-cavity output spectroscopy (off-axis ICOS) instruments that are able to determine $\delta^{13}C$ values as well. These values are obtained by the differences in the energies in the carbon-oxygen double bonds made by the $^{12}C$ and $^{13}C$ isotopes in carbon dioxide.

In some embodiments, the composition contains carbonates, e.g., magnesium and/or calcium carbonates that are characterized by having a $\delta^{13}C$ value less than −10‰. In some embodiments, the composition contains carbonates, e.g., magnesium and/or calcium carbonates that are characterized by having a $\delta^{13}C$ value less than −15‰, such as −16‰, such as less than −20‰, such as −21‰, such as −22‰, such as −23‰, such as −24‰, such as less than −25‰. In some embodiments, the composition contains organic matter or fossil fuel burning originated carbonates, that are characterized by having a $\delta^{13}C$ value less than −10‰, such as less than −15‰, such as −16‰, such as less than −20‰, such as −21 ‰, such as −22‰, such as −23‰, such as −24‰, such as less than −25‰. In some embodiments, the composition contains organic matter or fossil fuel burning originated carbonates, e.g., calcium carbonates that are characterized by having a $\delta^{13}C$ value less than −10‰. In some embodiments, the composition contains organic matter or fossil fuel burning originated carbon, e.g., calcium carbonates that are characterized by having a $\delta^{13}C$ value less than −15‰ or between −15‰ to −40‰.

In some embodiments, the composition comprising calcium carbonates may further include nitrogen oxide, sulfur oxide, mercury, metal, derivative of any of nitrogen oxide, sulfur oxide, mercury, and/or metal, or combination thereof. The derivatives of nitrogen oxide and sulfur oxide include, but not limited to, nitrates, nitrites, sulfates, and sulfites, etc. The mercury and/or the metal may be present in their derivatized form, such as, oxides and/or hydroxides, or the mercury and/or the metal may be encapsulated or present in the composition comprising carbonates in un-derivatized form. In some embodiments, the composition comprising calcium carbonates may further include one or more additional components including, but are not limited to, blast furnace slag, fly ash, diatomaceous earth, and other natural or artificial pozzolans, silica fumes, limestone, gypsum, hydrated lime, air entrainers, retarders, waterproofers and coloring agents. These components may be added to modify the properties of the cement, e.g., to provide desired strength attainment, to provide desired setting times, etc. The amount of such components present in a given composition of the invention may vary, and in certain embodiments the amounts of these components range from 0.1 to 1% w/w; or 0.1 to 10% w/w; or 1 to 50% w/w, or 10% w/w to 50% w/w, such as 2 to 10% w/w. In some embodiments, these components present in the composition comprising carbonates are in a non-leachable form such that when a leachate is formed from the composition, no more than 2 mg/L of the component is leached from the composition.

Calcium carbonate in the composition in addition to vaterite may include, but not limited to: a precursor phase of vaterite, a precursor phase of aragonite, an intermediary phase that is less stable than calcite, polymorphic forms in between these polymorphs, and combination thereof. Vaterite may be present in the cementitious composition in a monodisperse or agglomerated form, and may be in spherical, ellipsoidal, plate like shape, or hexagonal system. Vaterite typically has a hexagonal crystal structure and forms polycrystalline spherical particles upon growth. The precursor form of vaterite may comprise nanoclusters of vaterite and the precursor form of aragonite may comprise sub-micron to nanoclusters of aragonite needles. Aragonite, if present in the composition, may be needle shaped, columnar, or crystals of the rhombic system. Calcite, if present, may be cubic, spindle, or crystals of hexagonal system. An intermediary phase that is less stable than calcite may be a phase that is between vaterite and calcite, a phase between precursor of vaterite and calcite, a phase between aragonite and calcite, and/or a phase between precursor of aragonite and calcite.

Ratios of the calcium and magnesium compounds in precipitation material may be determined using X-ray diffraction (XRD), Raman spectroscopy, or a combination of both. For example, the ratio of vaterite to calcite (v/c ratio) in precipitation material comprising both polymorphs may be determined by comparison of Raman peak intensities corresponding to vaterite and calcite, respectively. Such a ratio may be helpful in determining the cementing property of the precipitation material.

In some embodiments, the compositions of the invention are non-medical or are not for medical procedures. In some embodiments, the compositions of the invention are synthetic compositions and are not naturally occurring.

In some embodiments of the aspects and embodiments described herein, the compositions comprising calcium carbonates provided herein includes at least 10% w/w vaterite; or at least 20% w/w vaterite; or at least 30% w/w vaterite; or at least 40% w/w vaterite; or at least 50% w/w vaterite; or at least 60% w/w vaterite; or at least 70% w/w vaterite; or at least 80% w/w vaterite; or at least 90% w/w vaterite; or at least 95% w/w vaterite; or at least 99% w/w vaterite; or from 10% w/w to 99% w/w vaterite; or from 10% w/w to 95% w/w vaterite; or from 10% w/w to 90% w/w vaterite; or from 10% w/w to 80% w/w vaterite; or from 10% w/w to 70% w/w vaterite; or from 10% w/w to 60% w/w vaterite; or from 10% w/w to 50% w/w vaterite; or from 10% w/w to 40% w/w vaterite; or from 10% w/w to 30% w/w vaterite; or from 10% w/w to 20% w/w vaterite; or from 30% w/w to 99% w/w vaterite; or from 30% w/w to 95% w/w vaterite; or from 30% w/w to 90% w/w vaterite; or from 30% w/w to 80% w/w vaterite; or from 30% w/w to 70% w/w vaterite; or from 30% w/w to 60% w/w vaterite; or from 30% w/w to 50% w/w vaterite; or from 30% w/w to 40% w/w vaterite; or from 50% w/w to 99% w/w vaterite; or from 50% w/w to 95% w/w vaterite; or from 50% w/w to 90% w/w vaterite; or from 50% w/w to 80% w/w vaterite; or from 50% w/w to 70% w/w vaterite; or from 50% w/w to 60% w/w vaterite; or from 70% w/w to 99% w/w vaterite; or from 70% w/w to 95% w/w vaterite; or from 70% w/w to 90% w/w vaterite; or from 70% w/w to 80% w/w vaterite; or from 80% w/w to 99% w/w vaterite; or from 80% w/w to 95% w/w vaterite; or from 80% w/w to 90% w/w vaterite; or from 90% w/w to 99% w/w vaterite; or from 90% w/w to 95% w/w vaterite; or 10% w/w vaterite; or 20% w/w vaterite; or 30% w/w vaterite; or 40% w/w vaterite; or 50% w/w vaterite; or 60% w/w vaterite; or 70% w/w vaterite; or 75% w/w vaterite; or 80% w/w vaterite; or 85% w/w vaterite; or 90% w/w vaterite; or 95% w/w vaterite; or 99% w/w vaterite. In some embodiments of the aspects and embodiments described herein, the compositions comprising calcium carbonates provided herein includes more than 40 wt % of vaterite, or more than 50 wt % of vaterite, or between 40-99 wt % vaterite or between 50-99 wt % vaterite or between 50-99.9 wt % vaterite.

In some embodiments, the composition comprising calcium carbonate is a particulate composition with an average particle size of 0.1-100 microns. The average particle size may be determined using any conventional particle size determination method, such as, but is not limited to, multi-detector laser scattering or sieving (i.e. <38 microns). In certain embodiments, unimodel or multimodal, e.g., bimodal or other, distributions are present. Bimodal distributions allow the surface area to be minimized, thus allowing a lower liquids/solids mass ratio for the cement yet providing smaller reactive particles for early reaction. In such instances, the average particle size of the larger size class can be upwards of 1000 microns (1 mm). In some embodiments, the composition comprising calcium carbonate is a particulate composition with an average particle size of 0.1-1000 microns; or 0.1-500 microns; or 0.1-200 microns; or 0.1-100 microns; or 0.1-80 microns; or 0.1-50 microns; or 0.1-40 microns; or 0.1-30 microns; or 0.1-20 microns; or 0.1-10 microns; or 0.1-5 microns; or 0.5-100 microns; or 0.5-70 microns; or 0.5-50 microns; or 0.5-10 microns; or 0.5-5 microns; or 1-100 microns; or 1-70 microns; or 1-50 microns; or 1-10 microns; or 1-5 microns; or 3-100 microns; or 3-50 microns; or 3-10 microns; or 3-8 microns; or 5-100 microns; or 5-50 microns; or 5-10 microns; or 5-8 microns; or 8-100 microns; or 8-50 microns; or 8-30 microns; or 8-20 microns; or 8-10 microns; or 10-100 microns; or 10-50 microns; or 10-30 microns; or 20-100 microns; or 20-50 microns; or 20-40 microns; or 40-100 microns; or 40-50 microns; or 50-100 microns; or 50-70 microns; or 60-100 microns; or 60-70 microns; or 70-100 microns; or 80-100 microns; or 0.1 microns; or 0.5 microns; or 1 microns; or 2 microns; or 3 microns; or 4 microns; or 5 microns; or 8 microns; or 10 microns; or 15 microns; or 20 microns; or 30 microns; or 40 microns; or 50 microns; or 60 microns; or 70 microns; or 80 microns; or 100 microns. For example, in some embodiments, the composition comprising calcium carbonate is a particulate composition with an average particle size of 0.1-30 micron; 0.1-20 micron; or 0.1-15 micron; or 0.1-10 micron; or 0.1-8 micron; or 0.1-5 micron; or 1-5 micron; or 5-10 micron.

The composition comprising calcium carbonate may be derived from, e.g., precipitated from, absorbing solution and/or water. As the $CO_2$ sequestering products are precipitated from water, they may include one or more additives that are present in the water from which they are derived. For example, where the water is salt water, the composition may include one or more compounds found in the salt water source. These compounds may be used to identify the solid precipitations of the compositions that come from the salt water source, where these identifying components and the amounts thereof are collectively referred to herein as a saltwater source identifier. For example, if the saltwater source is sea water, identifying compounds that may be present in the precipitated solids of the compositions include, but are not limited to: chloride, sodium, sulfur, potassium, bromide, silicon, strontium and the like. Any such source-identifying or "marker" elements would generally be present in small amounts, e.g., in amounts of 20,000 ppm or less, such as amounts of 2000 ppm or less. In certain embodiments, the "marker" compound is strontium, which may be present in the precipitated incorporated into the aragonite lattice, and make up 10,000 ppm or less, ranging in certain embodiments from 3 to 10,000 ppm, such as from 5 to 5000 ppm, including 5 to 1000 ppm, e.g., 5 to 500 ppm, including 5 to 100 ppm. Another "marker" compound of interest is magnesium, which may be present in amounts of up to 20% mole substitution for calcium in carbonate compounds. The saltwater source identifier of the compositions may vary depending on the particular saltwater source employed to produce the saltwater-derived carbonate composition. Also of interest are isotopic markers that identify the water source.

The surface area of the components making up the composition of the invention may vary. Given cement may have an average surface area sufficient to provide for a liquid/solid ratio upon combination with a liquid to produce a settable composition ranging from 0.5 $m^2$/gm to 50 $m^2$/gm, 0.75 to 20 $m^2$/gm, or 0.80 to 10 $m^2$/gm. In some embodiments, the surface area of the cementitious composition and/or the composition comprising calcium carbonate ranges from 10 to 25 $m^2$/gm, 10 to 20 $m^2$/gm, or 10 to 15 $m^2$/gm, or 15 to 25 $m^2$/gm, as determined using the surface area determination protocol described in Breunner, Emmit, and Teller (1953). In some embodiments, the surface area of the carbonate compositions is greater than the surface area of ground calcite due to the spherical morphology of vaterite. The larger surface area of the vaterite may provide larger number of nucleation sites for binding thereby resulting in high compressive strengths.

In one aspect, there is provided a cementitious composition, comprising between 10-55 wt % of a composition comprising calcium carbonate, wherein between 50-100 wt % of the calcium carbonate is in a metastable polymorphic form comprising vaterite, and wherein the calcium carbonate has a $\delta^{13}C$ value of between −12 to −30‰; and the cementitious composition comprises between 45-90 wt % of aggregate. The cementitious composition after combination with water sets and hardens into cement where the calcium carbonate binds to the aggregate and the cement has a compressive strength of at least 2000 psi or between 2000-6000 psi. Such binding of the calcium carbonate to the aggregate and the high compressive strength is due to the presence of vaterite in the calcium carbonate composition. In some embodiments, the cementitious composition after setting and hardening into cement has a porosity of at least 10 vol % or between 10-90 vol %.

Accordingly, in some embodiments, there is provided a cementitious composition, comprising between 10-55 wt % of a composition comprising calcium carbonate, wherein between 50-100 wt % of the calcium carbonate is in a metastable polymorphic form comprising vaterite, and wherein the calcium carbonate has a $\delta^{13}C$ value of between −12 to −30‰; and the cementitious composition comprises between 45-90 wt % of aggregate, where the cementitious composition after combination with water sets and hardens into cement where the calcium carbonate binds to the aggregate and the cement has a compressive strength of at least 2000 psi or between 2000-6000 psi, and further wherein the cement has a porosity of at least 10 vol % or between 10-90 vol %.

The aggregate component in the cementitious compositions includes fine and/or coarse aggregates, which aggregates may be $CO_2$-sequestering aggregate prepared from precipitation material as described in U.S. patent application Ser. No. 12/475,378, filed 29 May 2009, which application is incorporated herein by reference in its entirety. The "aggregate" is used herein in its art-accepted manner to include a particulate composition that finds use in concretes, mortars and other materials, e.g., roadbeds, asphalts, and other structures and is suitable for use in such structures. Aggregates are particulate compositions that may in some embodiments be classified as fine or coarse. In some embodiments, the fine aggregates are particulate compositions that almost entirely pass through a Number 4 sieve (ASTM C 125 and ASTM C 33). In some embodiments, the fine aggregates have an average particle size ranging from 0.001 inch (in) to 0.25 in, such as 0.05 in to 0.125 in and including 0.01 in to 0.08 in. In some embodiments, the coarse aggregates are compositions that are predominantly retained on a Number 4 sieve (ASTM C 125 and ASTM C 33). In some embodiments, the coarse aggregate have an average particle size ranging from 0.125 in to 6 in, such as 0.187 in to 3.0 in and including 0.25 in to 1.0 in. As used herein, "aggregate" may also in some embodiments encompass larger sizes, such as 3 in to 12 in or even 3 in to 24 in, or larger, such as 12 in to 48 in, or larger than 48 in, e.g., such as sizes used in riprap and the like. In some embodiments, such as producing wave-resistant structures for the ocean, the sizes may be even larger, such as over 48 in, e.g., over 60 in, or over 72 in.

Other properties of the aggregates may include one or more of hardness, abrasion resistance, density, porosity, chemical composition, mineral composition, isotopic composition, size, shape, acid resistance, alkaline resistance, leachable chloride content, reactivity (or lack thereof), or combination thereof. In some embodiments, the aggregates have a density that may vary so long as the aggregate provides the desired properties for the use for which it will be employed, e.g., for the building material in which it is employed. In certain instances, the density of the aggregate particles ranges from 1.1 to 5 gm/cc, such as 1.3 gm/cc to 3.15 gm/cc, and including 1.8 gm/cc to 2.7 gm/cc. Other particle densities e.g., for lightweight aggregates, may range from 1.1 to 2.2 gm/cc, e.g., 1.2 to 2.0 g/cc or 1.4 to 1.8 g/cc. In some embodiments, the aggregates range in bulk density (unit weight) from 50 lb/$ft^3$ to 200 lb/$ft^3$, or 75 lb/$ft^3$ to 175 lb/$ft^3$, or 50 lb/$ft^3$ to 100 lb/$ft^3$, or 75 lb/$ft^3$ to 125 lb/$ft^3$, or 90 lb/$ft^3$ to 115 lb/$ft^3$, or 100 lb/$ft^3$ to 200 lb/$ft^3$, or 125 lb/$ft^3$ to 175 lb/$ft^3$, or 140 lb/$ft^3$ to 160 lb/$ft^3$, or 50 lb/$ft^3$ to 200 lb/$ft^3$. Some embodiments of the invention include lightweight aggregate, e.g., aggregate that has a bulk density (unit weight) of 75 lb/$ft^3$ to 125 lb/$ft^3$. Some embodiments of the invention include lightweight aggregate, e.g., aggregate that has a bulk density (unit weight) of 90 lb/$ft^3$ to 115 lb/$ft^3$.

The hardness of the aggregate particles making up the aggregate in the compositions and methods provided herein may also vary, and in some embodiments the hardness, expressed on the Mohs scale, ranges from 1.0 to 9, such as 0.1 to 7, including 1 to 6 or 1 to 5. In some embodiments, the Mohr's hardness of aggregates of the invention ranges from 2-5, or 2-4. In some embodiments, the Mohs hardness ranges from 2-6. Other hardness scales may also be used to characterize the aggregate, such as the Rockwell, Vickers, or Brinell scales, and equivalent values to those of the Mohs scale may be used to characterize the aggregates; e.g., a Vickers hardness rating of 250 corresponds to a Mohs rating of 3; conversions between the scales are known in the art. The abrasion resistance of an aggregate may also be of significance, e.g., for use in a roadway surface, where aggregates of high abrasion resistance are useful to keep surfaces from polishing. Abrasion resistance may be related to hardness but may not be the same. Aggregates include aggregates that have an abrasion resistance similar to that of natural limestone, or aggregates that have an abrasion resistance superior to natural limestone, as well as aggregates having an abrasion resistance lower than natural limestone, as measured by art accepted methods, such as ASTM C131-03. In some embodiments aggregates have an abrasion resistance of less than 50%, or less than 40%, or less than 35%, or less than 30%, or less than 25%, or less than 20%, or less than 15%, or less than 10%, when measured by ASTM C131-03. Aggregates may also have a porosity within a particular ranges. In some embodiments, a highly porous aggregate is desired, in others an aggregate of moderate porosity is desired, while in other cases aggregates of low porosity, or no porosity, are desired. Porosities of aggregates, as measured by water uptake after oven drying followed by full immersion for 60 minutes, expressed as % dry weight, can be in the range of 1-40%, such as 2-20%, or 2-15%, including 2-10% or even 3-9%. The chemical, mineral, and/or isotopic composition of aggregates may vary depending on methods of manufacturing, raw materials, and the like.

Various types of aggregates are commercially available. In some embodiments, the aggregate may be synthesized from the calcium carbonate compositions, as described in the methods section. The aggregate thus formed from the cemented calcium carbonate compositions would have all the properties of the calcium carbonate composition such as $\delta^{13}C$ value, aragonite content, $CO_2$ sequestration, etc.

The cementitious compositions may further include one or more conventional SCMs (e.g., fly ash, slag, etc.). As such, the cementitious compositions include the presence of a $CO_2$-sequestering component (i.e. calcium carbonate composition or a component comprising precipitation material, or a component prepared from precipitation material), and an aggregate, fine and/or coarse.

When precipitation material or calcium carbonate composition is used to the exclusion of any additional cement components, it may be referred to as cement substitute (CS). As provided herein, such precipitation material or calcium carbonate composition or cement substitute comprises calcium carbonate polymorph vaterite and optionally other polymorphs such as, amorphous calcium carbonate, aragonite, and/or calcite. Such calcium carbonate composition is used in conjunction with fine and/or coarse aggregate, and further optionally in conjunction with supplementary cementitious material (SCM) such fly ash, slag, and/or metakaolin as described in more detail herein. Table II below gives few examples of various combinations of components that may be used in cementitious compositions where the cement component is calcium carbonate composition to the exclusion of any additional cement component.

TABLE II

| Concrete Composition | Cement component Calcium carbonate composition | Aggregate | | SCM | | |
|---|---|---|---|---|---|---|
| | | Fine Aggregate | Coarse Aggregate | Fly Ash | Slag | Metakaolin |
| 1 | X | | | | | |
| 2 | X | X | | | | |
| 3 | X | X | X | | | |
| 4 | X | X | X | X | | |
| 5 | X | X | X | X | X | |
| 6 | X | X | X | X | X | X |
| 7 | X | X | X | X | | X |
| 8 | X | X | X | | X | X |
| 9 | X | X | X | | | X |
| 10 | X | | X | | | |
| 11 | X | | X | X | | |
| 12 | X | | X | X | X | |
| 13 | X | | X | X | X | X |
| 14 | X | X | | X | | |
| 15 | X | X | | X | X | |
| 16 | X | X | | X | X | X |
| 17 | X | X | | X | | X |
| 18 | X | X | | | X | X |
| 19 | X | X | | | | X |
| 20 | X | | X | X | | |
| 21 | X | | X | X | X | |
| 22 | X | | X | X | X | X |
| 23 | X | | X | X | | X |
| 24 | X | | X | | X | X |
| 25 | X | | X | | | X |
| 26 | X | | | X | | |
| 27 | X | | | X | X | |
| 28 | X | | | X | X | X |
| 29 | X | | | X | | X |
| 30 | X | | | | X | X |
| 31 | X | | | | | X |

The fine aggregate described in the Table II may be conventional fine aggregate such as sand or $CO_2$-sequestering fine aggregate made from the calcium carbonate composition, as described herein and in U.S. patent application Ser. No. 12/475,378, filed 29 May 2009, which application is incorporated herein by reference in its entirety. The coarse aggregate described in the Table II may be conventional coarse aggregate such as gravel, crushed stone, slag, recycled concrete, geosynthetic aggregate, glass, or coarse $CO_2$-sequestering aggregate made from the calcium carbonate composition as described herein and in U.S. patent application Ser. No. 12/475,378, filed 29 May 2009.

The cements may further include one or more SCMs, such as, but not limited to, fly ash, slag, metakaolin, and the like. In certain embodiments, the cements may be blends, in that they include not only calcium carbonate composition described herein, but also one or more additional components that may be added to modify the properties of the cement (e.g., to provide desired strength attainment, to provide desired setting times, etc.). Components of interest that may be present in blended cements include, but are not limited to: blast furnace slag, fly ash, diatomaceous earth, natural or artificial pozzolans, silica fumes, limestone, gypsum, hydrated lime, etc. The amount of such components present in a given concrete composition (if present at all) may vary, and in certain embodiments the amounts of these components range from 1% to 50% w/w, such as 2% to 25% w/w, including 10% to 20% w/w.

Figure 7:
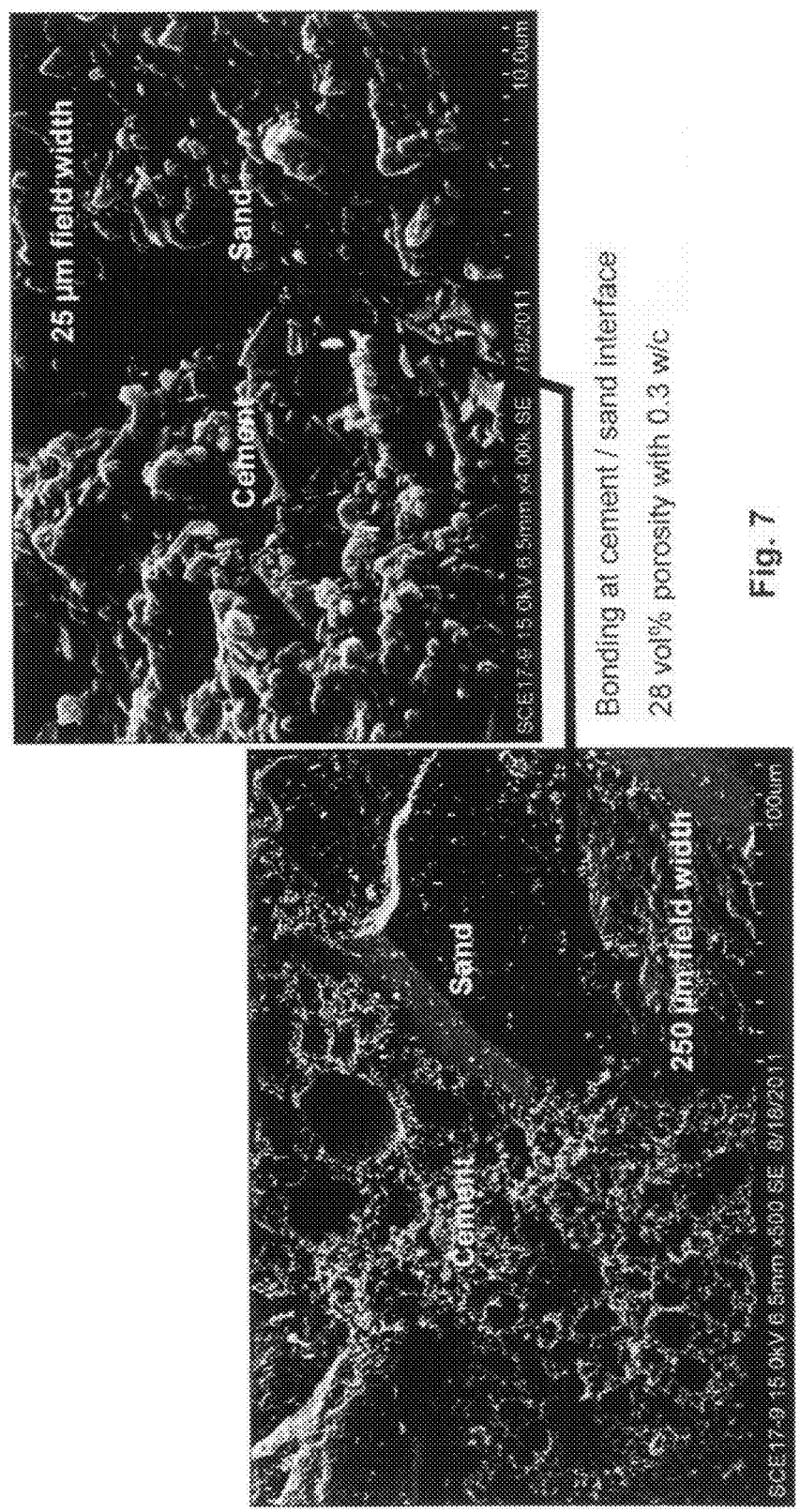
FIG. 7 illustrates SEM images of calcium carbonate cement binding with sand in a mortar.

With respect to pastes and mortars, it was unexpectedly and surprisingly found that the calcium carbonate composition, to the exclusion of any additional cement component(s), acts much like a conventional cement. The calcium carbonate composition, when prepared (e.g., mix water added, cast, etc.) and allowed to harden in accordance with standard procedures known in the art for pastes, achieves high compressive strengths as described below in reference to the compressive strengths of the compositions of Table II. Mortars comprising fine aggregate such as sand, which may be prepared (e.g., mixed, mix water added, cast, etc.) and allowed to harden in accordance with standard procedures known in the art (e.g., ASTM 109), achieves high compressive strengths as described below in reference to the compressive strengths of the compositions of Table II. Such mortars also behave like cement, binding the fine aggregate (e.g., sand) as shown in FIG. 7.

The mortars, which may be considered binary mixtures of the calcium carbonate composition and fine aggregate (e.g., sand), may comprise at least 5%, at least 10%, at least 20%, at least 30%, at least 40%, at least 50%, at least 60%, at least 65%, at least 70%, at least 75%, at least 80%, at least 85%, at least 90%, or at least 95% by weight or between 45-95%, or between 45-90%; or between 45-80%, or between 45-75%, or between 45-70%, or between 45-60%, or between 45-55%, or between 45-50%, or between 50-95%, or between 50-90%; or between 50-80%, or between 50-75%, or between 50-70%, or between 50-60%, or between 65-95%, or between 65-90%; or between 65-80%, or between 65-75%, or between 75-95%, or between 75-90%; or between 75-80%, or between 80-95%, or between 80-90%; or between 85-95%, or between 85-90%, by weight of the fine aggregate (e.g., sand), the remainder being the calcium carbonate composition. For example, there is provided a cementitious composition, comprising between 10-55 wt %, or between 10-50 wt %, or between 10-40 wt %, or between 10-30 wt %, or between 10-20 wt %, or between 20-55 wt %, or between 20-50 wt %, or between 20-40 wt %, or between 20-30 wt %, or between 30-55 wt %, or between 30-50 wt %, or between 30-40 wt %, or between 40-55 wt %, or between 40-50 wt %, or between 50-55 wt %, of a composition comprising calcium carbonate, wherein between 50-100 wt % of the calcium carbonate is in a metastable polymorphic form comprising vaterite, and wherein the calcium carbonate has a $\delta^{13}C$ value of between −12 to −30‰; and between 45-95%, or between 45-90%; or between 45-80%, or between 45-75%, or between 45-70%, or between 45-60%, or between 45-55%, or between 45-50%, or between 50-95%, or between 50-90%; or between 50-80%, or between 50-75%, or between 50-70%, or between 50-60%, or between 65-95%, or between 65-90%; or between 65-80%, or between 65-75%, or between 75-95%, or between 75-90%; or between 75-80%, or between 80-95%, or between 80-90%; or between 85-95%, or between 85-90%, by weight of the fine aggregate.

For example, in some embodiments, the mortars, which may be considered binary mixtures of precipitation material or the calcium carbonate composition and fine aggregate (e.g., sand), may comprise at least 1% and less than 95% fine aggregate by weight, at least 25% and less than 95% fine aggregate by weight, at least 50% and less than 95% fine aggregate by weight, at least 50% and less than 90% fine aggregate by weight, at least 50% and less than 85% fine aggregate by weight, at least 55% and less than 85% fine aggregate by weight.

In some embodiments, the cementitious compositions containing calcium carbonate composition and fine aggregate, as described above and herein, after combination with water, set and harden into cement where the calcium carbonate binds to the aggregate and the cement has a compressive strength of at least 2000 psi, or at least 3000 psi, or at least 4000 psi, or at least 5000 psi, or at least 6000 psi, or between 2000-6000 psi, or between 2000-5000 psi, or between 2000-4000 psi, or between 2000-3000 psi, or between 3000-6000 psi, or between 3000-5000 psi, or between 3000-4000 psi, or between 4000-6000 psi, or between 4000-5000 psi, or between 5000-6000 psi.

Accordingly, in some embodiments, there is provided a cementitious composition, comprising between 10-55 wt %, or between 10-50 wt %, or between 10-40 wt %, or between 10-30 wt %, or between 10-20 wt %, or between 20-55 wt %, or between 20-50 wt %, or between 20-40 wt %, or between 20-30 wt %, or between 30-55 wt %, or between 30-50 wt %, or between 30-40 wt %, or between 40-55 wt %, or between 40-50 wt %, or between 50-55 wt %, of a composition comprising calcium carbonate, wherein between 50-100 wt % of the calcium-carbonate is in a metastable polymorphic form comprising vaterite, and wherein the calcium carbonate has a $\delta^{13}C$ value of between −12 to −30‰; and the cementitious composition comprises between 45-90%, or between 45-80%, or between 45-75%, or between 45-70%, or between 45-60%, or between 45-55%, or between 45-50%, or between 50-95%, or between 50-90%; or between 50-80%, or between 50-75%, or between 50-70%, or between 50-60%, or between 65-95%, or between 65-90%; or between 65-80%, or between 65-75%, or between 75-95%, or between 75-90%; or between 75-80%, or between 80-95%, or between 80-90%; or between 85-95%, or between 85-90%, by weight of aggregate, where the cementitious composition after combination with water sets and hardens into cement where the calcium carbonate binds to the aggregate and the cement has a compressive strength of at least 2000 psi, or at least 3000 psi, or at least 4000 psi, or at least 5000 psi, or at least 6000 psi, or between 2000-6000 psi, or between 2000-5000 psi, or between 2000-4000 psi, or between 2000-3000 psi, or between 3000-6000 psi, or between 3000-5000 psi, or between 3000-4000 psi, or between 4000-6000 psi, or between 4000-5000 psi, or between 5000-6000 psi.

In some embodiments, there is provided a cementitious composition, comprising between 10-55 wt %, or between 10-50 wt %, or between 10-40 wt %, or between 10-30 wt %, or between 10-20 wt %, or between 20-55 wt %, or between 20-50 wt %, or between 20-40 wt %, or between 20-30 wt %, or between 30-55 wt %, or between 30-50 wt %, or between 30-40 wt %, or between 40-55 wt %, or between 40-50 wt %, or between 50-55 wt %, of a composition comprising calcium carbonate, wherein between 50-100 wt % of the calcium carbonate is in a metastable polymorphic form comprising vaterite, and wherein the calcium carbonate has a $\delta^{13}C$ value of between −12 to −30‰; and the cementitious composition comprises between 45-90%, or between 45-80%, or between 45-75%, or between 45-70%, or between 45-60%, or between 45-55%, or between 45-50%, or between 50-95%, or between 50-90%; or between 50-80%, or between 50-75%, or between 50-70%, or between 50-60%, or between 65-95%, or between 65-90%; or between 65-80%, or between 65-75%, or between 75-95%, or between 75-90%; or between 75-80%, or between 80-95%, or between 80-90%; or between 85-95%, or between 85-90%, by weight of aggregate, where the cementitious composition after combination with water sets and hardens into cement where the calcium carbonate binds to the aggregate; the cement has a compressive strength of at least 2000 psi, or at least 3000 psi, or at least 4000 psi, or at least 5000 psi, or at least 6000 psi, or between 2000-6000 psi, or between 2000-5000 psi, or between 2000-4000 psi, or between 2000-3000 psi, or between 3000-6000 psi, or between 3000-5000 psi, or between 3000-4000 psi, or between 4000-6000 psi, or between 4000-5000 psi, or between 5000-6000 psi; and the cement has porosity in the range of between 10-90 vol %, or between 10-75 vol %, or between 10-55 vol %, or between 10-45 vol %, or between 10-35 vol %, or between 10-25 vol %.

In some embodiments, a mortar comprises at least 65% and less than 95% fine aggregate (e.g., sand) by weight, between 5-45% by weight of composition comprising calcium carbonate wherein between 50-100 wt % of the calcium carbonate is in a metastable polymorphic form comprising vaterite, and wherein the calcium carbonate has a $\delta^{13}C$ value of between −12 to −30‰, where the mortar after combination with water, sets and hardens into cement that has a compressive strength of at least 3000 psi and less than 8000 psi and where the calcium carbonate binds with the fine aggregate.

In some embodiments, a mortar comprises at least 85% and less than 95% fine aggregate (e.g., sand) by weight, between 5-15% by weight of composition comprising calcium carbonate wherein between 50-100 wt % of the calcium carbonate is in a metastable polymorphic form comprising vaterite, and wherein the calcium carbonate has a $\delta^{13}C$ value of between −12 to −30‰, where the mortar after combination with water; sets and hardens into cement that has a compressive strength of at least 3000 psi and less than 8000 psi and where the calcium carbonate binds with the fine aggregate.

In some embodiments, a mortar comprises at least 75% and less than 85% fine aggregate (e.g., sand) by weight, between 15-25% by weight of composition comprising calcium carbonate wherein between 50-100 wt % of the calcium carbonate is in a metastable polymorphic form comprising vaterite, and wherein the calcium carbonate has a $\delta^{13}C$ value of between −12 to −30‰, where the mortar after combination with water, sets and hardens into cement that has a compressive strength of at least 3000 psi and less than 8000 psi and where the calcium carbonate binds with the fine aggregate.

In some embodiments, a mortar comprises at least 70% and less than 80% fine aggregate (e.g., sand) by weight, between 20-30% by weight of composition comprising calcium carbonate wherein between 50-100 wt % of the calcium carbonate is in a metastable polymorphic form comprising vaterite, and wherein the calcium carbonate has a $\delta^{13}C$ value of between −12 to −30‰, where the mortar after combination with water, sets and hardens into cement that has a compressive strength of at least 3000 psi and less than 8000 psi and where the calcium carbonate binds with the fine aggregate.

In some embodiments, a mortar comprises at least 65% and less than 75% fine aggregate (e.g., sand) by weight, between 25-35% by weight of composition comprising calcium carbonate wherein between 50-100 wt % of the calcium carbonate is in a metastable polymorphic form comprising vaterite, and wherein the calcium carbonate has a $\delta^{13}C$ value of between −12 to −30‰, where the mortar after combination with water, sets and hardens into cement that has a compressive strength of at least 3000 psi and less than 8000 psi and where the calcium carbonate binds with the fine aggregate.

In some embodiments, the foregoing embodiments optionally have a porosity of between 10-90 vol %, or between 10-60 vol %, or between 10-40 vol %, or between 25-90 vol %, or between 25-60 vol %, or between 30-90 vol %. In some embodiments, in the foregoing embodiments the compressive strength is after 1 day, 7 days or 28 days.

The foregoing paste and mortar compositions may further comprise one more admixtures or additives (e.g., GLENIUM® 7500) which provides the paste and mortar performance for pastes and mortars.

Coarse aggregate may be used in place of a portion of fine aggregate in the foregoing mortars to produce concrete compositions. The concretes, which may be considered binary mixtures of the calcium carbonate composition and coarse aggregate (e.g., rock), may comprise at least 5%, at least 10%, at least 20%, at least 30%, at least 40%, at least 50%, at least 60%, at least 65%, at least 70%, at least 75%, at least 80%, at least 85%, at least 90%, or at least 95% by weight or between 45-95%, or between 45-90%; or between 45-80%, or between 45-75%, or between 45-70%, or between 45-60%, or between 45-55%, or between 45-50%, or between 50-95%, or between 50-90%; or between 50-80%, or between 50-75%, or between 50-70%, or between 50-60%, or between 65-95%, or between 65-90%; or between 65-80%, or between 65-75%, or between 75-95%; or between 75-90%; or between 75-80%, or between 80-95%, or between 80-90%; or between 85-95%, or between 85-90%, by weight of the coarse aggregate (e.g., rock), the remainder being the calcium carbonate composition. For example, there is provided a cementitious composition, comprising between 10-55 wt %, or between 10-50 wt %, or between 10-40 wt %, or between 10-30 wt %, or between 10-20 wt %, or between 20-55 wt %, or between 20-50 wt %, or between 20-40 wt %, or between 20-30 wt %, or between 30-55 wt %, or between 30-50 wt %, or between 30-40 wt %, or between 40-55 wt %, or between 40-50 wt %, or between 50-55 wt %, of a composition comprising calcium carbonate, wherein between 50-100 wt % of the calcium carbonate is in a metastable polymorphic form comprising vaterite, and wherein the calcium carbonate has a $\delta^{13}C$ value of between −12 to −30‰; and between 45-95%, or between 45-90%; or between 45-80%, or between 45-75%, or between 45-70%, or between 45-60%, or between 45-55%, or between 45-50%, or between 50-95%, or between 50-90%; or between 50-80%, or between 50-75%, or between 50-70%, or between 50-60%, or between 65-95%, or between 65-90%; or between 65-80%, or between 65-75%, or between 75-95%, or between 75-90%; or between 75-80%, or between 80-95%, or between 80-90%; or between 85-95%, or between 85-90%, by weight of the coarse aggregate. In some embodiments, the cementitious compositions containing calcium carbonate composition and coarse aggregate, as described herein, after combination with water, set and harden into cement with a compressive strength of at least 2000 psi, or at least 3000 psi, or at least 4000 psi, or at least 5000 psi, or at least 6000 psi, or between 2000-6000 psi, or between 2000-5000 psi, or between 2000-4000 psi, or between 2000-3000 psi, or between 3000-6000 psi, or between 3000-5000 psi, or between 3000-4000 psi, or between 4000-6000 psi, or between 4000-5000 psi, or between 5000-6000 psi.

Accordingly, in some embodiments, there is provided a cementitious composition, comprising between 10-55 wt %, or between 10-50 wt %, or between 10-40 wt %, or between 10-30 wt %, or between 10-20 wt %, or between 20-55 wt %, or between 20-50 wt %, or between 20-40 wt %, or between 20-30 wt %, or between 30-55 wt %, or between 30-50 wt %, or between 30-40 wt %, or between 40-55 wt %, or between 40-50 wt %, or between 50-55 wt %, of a composition comprising calcium carbonate, wherein between 50-100 wt % of the calcium carbonate is in a metastable polymorphic form comprising vaterite, and wherein the calcium carbonate has a $\delta^{13}C$ value of between −12 to −30‰; and the cementitious composition comprises between 45-90%, or between 45-80%, or between 45-75%, or between 45-70%, or between 45-60%, or between 45-55%, or between 45-50%, or between 50-95%, or between 50-90%; or between 50-80%, or between 50-75%, or between 50-70%, or between 50-60%, or between 65-95%, or between 65-90%; or between 65-80%, or between 65-75%, or between 75-95%; or between 75-90%; or between 75-80%, or between 80-95%, or between 80-90%; or between 85-95%, or between 85-90%, by weight of coarse aggregate, where the cementitious composition after combination with water sets and hardens into cement where the calcium carbonate binds to the aggregate and the cement has a compressive strength of at least 2000 psi, or at least 3000 psi, or at least 4000 psi, or at least 5000 psi, or at least 6000 psi, or between 2000-6000 psi, or between 2000-5000 psi, or between 2000-4000 psi, or between 2000-3000 psi, or between 3000-6000 psi, or between 3000-5000 psi, or between 3000-4000 psi, or between 4000-6000 psi, or between 4000-5000 psi, or between 5000-6000 psi.

In some embodiments, there is provided a cementitious composition, comprising between 10-55 wt %, or between 10-50 wt %, or between 10-40 wt %, or between 10-30 wt %, or between 10-20 wt %, or between 20-55 wt %, or between 20-50 wt %, or between 20-40 wt %, or between 20-30 wt %, or between 30-55 wt %, or between 30-50 wt %, or between 30-40 wt %, or between 40-55 wt %, or between 40-50 wt %, or between 50-55 wt %, of a composition comprising calcium carbonate, wherein between 50-100 wt % of the calcium carbonate is in a metastable polymorphic form comprising vaterite, and wherein the calcium carbonate has a $\delta^{13}C$ value of between −12 to −30 ‰; and the cementitious composition comprises between 45-90%, or between 45-80%, or between 45-75%, or between 45-70%, or between 45-60%, or between 45-55%, or between 45-50%, or between 50-95%, or between 50-90%; or between 50-80%, or between 50-75%, or between 50-70%, or between 50-60%, or between 65-95%, or between 65-90%; or between 65-80%, or between 65-75%, or between 75-95%, or between 75-90%; or between 75-80%, or between 80-95%, or between 80-90%; or between 85-95%, or between 85-90%, by weight of coarse aggregate, where the cementitious composition after combination with water sets and hardens into cement where the calcium carbonate binds to the aggregate; the cement has a compressive strength of at least 2000 psi, or at least 3000 psi, or at least 4000 psi, or at least 5000 psi, or at least 6000 psi, or between 2000-6000 psi, or between 2000-5000 psi, or between 2000-4000 psi, or between 2000-3000 psi, or between 3000-6000 psi, or between 3000-5000 psi, or between 3000-4000 psi, or between 4000-6000 psi, or between 4000-5000 psi, or between 5000-6000 psi; and the cement has porosity in the range of between 10-90 vol %, or between 10-75 vol %, or between 10-55 vol %, or between 10-45 vol %, or between 10-35 vol %, or between 10-25 vol %.

In some embodiments, the concrete comprises at least 65% and less than 95% coarse aggregate by weight, between 5-45% by weight of composition comprising calcium carbonate wherein between 50-100 wt % of the calcium carbonate is in a metastable polymorphic form comprising vaterite, and wherein the calcium carbonate has a Γ$^{13}$C value of between −12 to −30‰, where the concrete after combination with water, sets and hardens into cement that has a compressive strength of at least 3000 psi and less than 8000 psi and where the calcium carbonate binds with the coarse aggregate.

In some embodiments, a concrete comprises at least 85% and less than 95% coarse aggregate by weight, between 5-15% by weight of composition comprising calcium carbonate wherein between 50-100 wt % of the calcium carbonate is in a metastable polymorphic form comprising vaterite, and wherein the calcium carbonate has a $\delta^{13}C$ value of between −12 to −30‰, where the concrete after combination with water, sets and hardens into cement that has a compressive strength of at least 3000 psi and less than 8000 psi and where the calcium carbonate binds with the coarse aggregate.

In some embodiments, a concrete comprises at least 75% and less than 85% coarse aggregate by weight, between 15-25% by weight of composition comprising calcium carbonate wherein between 50-100 wt % of the calcium carbonate is in a metastable polymorphic form comprising vaterite, and wherein the calcium carbonate has a $\delta^{13}C$ value of between −12 to −30‰, where the concrete after combination with water, sets and hardens into cement that has a compressive strength of at least 3000 psi and less than 8000 psi and where the calcium carbonate binds with the coarse aggregate.

In some embodiments, a concrete comprises at least 70% and less than 80% coarse aggregate by weight, between 20-30% by weight of composition comprising calcium carbonate wherein between 50-100 wt % of the calcium carbonate is in a metastable polymorphic form comprising vaterite, and wherein the calcium carbonate has a $\delta^{13}C$ value of between −12 to −30‰, where the concrete after combination with water, sets and hardens into cement that has a compressive strength of at least 3000 psi and less than 8000 psi and where the calcium carbonate binds with the coarse aggregate.

In some embodiments, a concrete comprises at least 65% and less than 75% coarse aggregate by weight, between 25-35% by weight of composition comprising calcium carbonate wherein between 50-100 wt % of the calcium carbonate is in a metastable polymorphic form comprising vaterite, and wherein the calcium carbonate has a $\delta^{13}C$ value of between −12 to −30‰, where the concrete after combination with water, sets and hardens into cement that has a compressive strength of at least 3000 psi and less than 8000 psi and where the calcium carbonate binds with the coarse aggregate.

In some embodiments, the foregoing embodiments optionally have a porosity of between 10-90 vol %, or between 10-60 vol %, or between 10-40 vol %, or between 25-90 vol %, or between 25-60 vol %, or between 30-90 vol %. In some embodiments, in the foregoing embodiments the compressive strength is after 1 day, 7 days or 28 days.

Combinations of the foregoing are also useful for describing concrete compositions comprising calcium carbonate compositions, fine aggregate, and coarse aggregate. For example, in some embodiments, the concrete compositions, which may be considered ternary mixtures of calcium carbonate compositions, fine aggregate (e.g., sand), and coarse aggregate (e.g., rock) may comprise at least 5%, at least 10%, at least 20%, at least 30%, at least 40%, at least 50%, at least 60%, at least 65%, at least 70%, at least 75%, at least 80%, at least 85%, at least 90%, or at least 95% by weight or between 45-95%, or between 45-90%; or between 45-80%, or between 45-75%, or between 45-70%, or between 45-60%, or between 45-55%, or between 45-50%, or between 50-95%, or between 50-90%; or between 50-80%, or between 50-75%, or between 50-70%, or between 50-60%, or between 65-95%, or between 65-90%; or between 65-80%, or between 65-75%, or between 75-95%, or between 75-90%; or between 75-80%, or between 80-95%, or between 80-90%; or between 85-95%, or between 85-90%, by weight of the aggregate (i.e. both fine and coarse aggregate), the remainder being the calcium carbonate composition. For example, there is provided a cementitious composition, comprising between 10-55 wt %, or between 10-50 wt %, or between 10-40 wt %, or between 10-30 wt %, or between 10-20 wt %, or between 20-55 wt %, or between 20-50 wt %, or between 20-40 wt %, or between 20-30 wt %, or between 30-55 wt %, or between 30-50 wt %, or between 30-40 wt %, or between 40-55 wt %, or between 40-50 wt %, or between 50-55 wt %, of a composition comprising calcium carbonate, wherein between 50-100 wt % of the calcium carbonate is in a metastable polymorphic form comprising vaterite, and wherein the calcium carbonate has a $\delta^{13}C$ value of between −12 to −30960; and between 45-95%, or between 45-90%; or between 45-80%, or between 45-75%, or between 45-70%, or between 45-60%, or between 45-55%, or between 45-50%, or between 50-95%, or between 50-90%; or between 50-80%, or between 50-75%, or between 50-70%, or between 50-60%, or between 65-95%, or between 65-90%; or between 65-80%, or between 65-75%, or between 75-95%, or between 75-90%; or between 75-80%, or between 80-95%, or between 80-90%; or between 85-95%, or between 85-90%, by weight of the aggregate (i.e. both fine and coarse aggregate). In some embodiments, the cementitious compositions containing calcium carbonate composition and aggregate, as described herein, after combination with water, set and harden into cement with a compressive strength of at least 2000 psi, or at least 3000 psi, or at least 4000 psi, or at least 5000 psi, or at least 6000 psi, or between 2000-6000 psi, or between 2000-5000 psi, or between 2000-4000 psi, or between 2000-3000 psi, or between 3000-6000 psi, or between 3000-5000 psi, or between 3000-4000 psi, or between 4000-6000 psi, or between 4000-5000 psi, or between 5000-6000 psi.

Accordingly, in some embodiments, there is provided a cementitious composition, comprising between 10-55 wt %, or between 10-50 wt %, or between 10-40 wt %, or between 10-30 wt %, or between 10-20 wt %, or between 20-55 wt %, or between 20-50 wt %, or between 20-40 wt %, or between 20-30 wt %, or between 30-55 wt %, or between 30-50 wt %, or between 30-40 wt %, or between 40-55 wt %, or between 40-50 wt %, or between 50-55 wt %, of a composition comprising calcium carbonate, wherein between 50-100 wt % of the calcium carbonate is in a metastable polymorphic form comprising vaterite, and wherein the calcium carbonate has a $\delta^{13}C$ value of between −12 to −30‰; and the cementitious composition comprises between 45-90%, or between 45-80%, or between 45-75%, or between 45-70%, or between 45-60%, or between 45-55%, or between 45-50%, or between 50-95%, or between 50-90%; or between 50-80%, or between 50-75%, or between 50-70%, or between 50-60%, or between 65-95%, or between 65-90%; or between 65-80%, or between 65-75%, or between 75-95%, or between 75-90%; or between 75-80%, or between 80-95%, or between 80-90%; or between 85-95%, or between 85-90%, by weight of aggregate (i.e. both fine and coarse aggregate), where the cementitious composition after combination with water sets and hardens into cement where the calcium carbonate binds to the aggregate and the cement has a compressive strength of at least 2000 psi, or at least 3000 psi, or at least 4000 psi, or at least 5000 psi, or at least 6000 psi, or between 2000-6000 psi, or between 2000-5000 psi, or between 2000-4000 psi, or between 2000-3000 psi, or between 3000-6000 psi, or between 3000-5000 psi, or between 3000-4000 psi, or between 4000-6000 psi, or between 4000-5000 psi, or between 5000-6000 psi.

In some embodiments, there is provided a cementitious composition, comprising between 10-55 wt %, or between 10-50 wt %, or between 10-40 wt %, or between 10-30 wt %, or between 10-20 wt %, or between 20-55 wt %, or between 20-50 wt %, or between 20-40 wt %, or between 20-30 wt %, or between 30-55 wt %, or between 30-50 wt %, or between 30-40 wt %, or between 40-55 wt %, or between 40-50 wt %, or between 50-55 wt %, of a composition comprising calcium carbonate, wherein between 50-100 wt % of the calcium carbonate is in a metastable polymorphic form comprising vaterite, and wherein the calcium carbonate has a $\delta^{13}C$ value of between −12 to −30‰; and the cementitious composition comprises between 45-90%, or between 45-80%, or between 45-75%, or between 45-70%, or between 45-60%, or between 45-55%, or between 45-50%, or between 50-95%, or between 50-90%; or between 50-80%, or between 50-75%, or between 50-70%, or between 50-60%, or between 65-95%, or between 65-90%; or between 65-80%, or between 65-75%, or between 75-95%, or between 75-90%; or between 75-80%, or between 80-95%, or between 80-90%; or between 85-95%, or between 85-90%, by weight of aggregate (i.e. both fine and coarse aggregate), where the cementitious composition after combination with water sets and hardens into cement where the calcium carbonate binds to the aggregate; the cement has a compressive strength of at least 2000 psi, or at least 3000 psi, or at least 4000 psi, or at least 5000 psi, or at least 6000 psi, or between 2000-6000 psi, or between 2000-5000 psi, or between 2000-4000 psi, or between 2000-3000 psi, or between 3000-6000 psi, or between 3000-5000 psi, or between 3000-4000 psi, or between 4000-6000 psi, or between 4000-5000 psi, or between 5000-6000 psi; and the cement has porosity in the range of between 10-90 vol %, or between 10-75 vol %, or between 10-55 vol %, or between 10-45 vol %, or between 10-35 vol %, or between 10-25 vol %.

The compositions containing both the fine and coarse aggregate can have the fine and the coarse aggregate in any ratio, such as, fine aggregate: coarse aggregate in the range of 4:1 to 1:4, or 3:1 to 1:3, or 2:1 to 1:2, or 1:1.

In some embodiments, the concrete comprises at least 65% and less than 95% aggregate (i.e. both fine and coarse aggregate) by weight, between 5-45% by weight of composition comprising calcium carbonate wherein between 50-100 wt % of the calcium carbonate is in a metastable polymorphic form comprising vaterite, and wherein the calcium carbonate has a $\delta^{13}C$ value of between −12 to −30‰, where the concrete after combination with water, sets and hardens into cement that has a compressive strength of at least 3000 psi and less than 8000 psi and where the calcium carbonate binds with the aggregate.

In some embodiments, a concrete comprises at least 85% and less than 95% aggregate (i.e. both fine and coarse aggregate) by weight, between 5-15% by weight of composition comprising calcium carbonate wherein between 50-100 wt % of the calcium carbonate is in a metastable polymorphic form comprising vaterite, and wherein the calcium carbonate has a $\delta^{13}C$ value of between −12 to −30‰, where the concrete after combination with water, sets and hardens into cement that has a compressive strength of at least 3000 psi and less than 8000 psi and where the calcium carbonate binds with the aggregate.

In some embodiments, a concrete comprises at least 75% and less than 85% aggregate (i.e. both fine and coarse aggregate) by weight, between 15-25% by weight of composition comprising calcium carbonate wherein between 50-100 wt % of the calcium carbonate is in a metastable polymorphic form comprising vaterite, and wherein the calcium carbonate has a $\delta^{13}C$ value of between −12 to −30‰, where the concrete after combination with water, sets and hardens into cement that has a compressive strength of at least 3000 psi and less than 8000 psi and where the calcium carbonate binds with the aggregate.

In some embodiments, a concrete comprises at least 70% and less than 80% aggregate (i.e. both fine and coarse aggregate) by weight, between 20-30% by weight of composition comprising calcium carbonate wherein between 50-100 wt % of the calcium carbonate is in a metastable polymorphic form comprising vaterite, and wherein the calcium carbonate has a $\delta^{13}C$ value of between −12 to −30‰, where the concrete after combination with water, sets and hardens into cement that has a compressive strength of at least 3000 psi and less than 8000 psi and where the calcium carbonate binds with the aggregate.

In some embodiments, a concrete comprises at least 65% and less than 75% aggregate (i.e. both fine and coarse aggregate) by weight, between 25-35% by weight of composition comprising calcium carbonate wherein between 50-100 wt % of the calcium carbonate is in a metastable polymorphic form comprising vaterite, and wherein the calcium carbonate has a $\delta^{13}C$ value of between −12 to −30‰, where the concrete after combination with water, sets and hardens into cement that has a compressive strength of at least 3000 psi and less than 8000 psi and where the calcium carbonate binds with the aggregate.

In some embodiments, the foregoing embodiments optionally have a porosity of between 10-90 vol %, or between 10-80 vol %, or between 10-70 vol %, or between 10-60 vol %, or between 10-50 vol %, or between 10-40 vol %, or between 10-30 vol %, or between 20-90 vol %, or between 20-70 vol %, or between 25-90 vol %, or between 25-60 vol %, or between 30-60 vol %, or between 50-90 vol %, or between 50-60 vol %, or between 40-90 vol %, or between 70-90 vol %. In some embodiments, in the foregoing embodiments the compressive strength is after 1 day, 7 days or 28 days.

The foregoing concrete compositions may further comprise one more admixtures or additives (e.g., GLENIUM® 7500) as described herein, which may add to the concrete performance for concrete.

Various binary, ternary, quaternary, etc. cement blends comprising calcium carbonate (or a component prepared from precipitation material) may result in reductions in carbon footprint for concrete compositions described herein.

The cementitious compositions of the invention behave in a fashion similar to conventional OPC-concrete compositions enabling the cementitious compositions to be used in similar places and for similar functions. For example, the cementitious compositions may be placed into parking areas (e.g. a 5,000 square foot parking lot). The cementitious compositions, due to the higher albedo of such compositions, reduce carbon emissions via reduced lighting demands. This reduction of carbon emissions may occur over the lifetime of the cementitious compositions. For example, albedo and luminance measurements of parking areas comprising the cementitious compositions compared to asphalt parking areas may be used to determine the difference in lighting needed and, thus, the level of carbon reduction that may be possible due to the use of higher albedo cementitious compositions. Albedo tests of such compositions demonstrate urban heat island reduction abilities, e.g., by 2-fold or more, 5-fold or more, 10-fold or more, 20-fold or more.

With respect to calculation of carbon footprint, the carbon footprint of the cementitious compositions may be determined by multiplying the pounds per cubic yard of each constituent by its per pound carbon footprint, summing these values, and adding 10.560 kg/yd$^3$ (the carbon footprint of transporting one yard of concrete 20 miles on average). With respect to the OPC component, assuming an average $CO_2$ release from Portland cement production of 0.86 tonnes $CO_2$/tonne cement (as reported for California Cement Climate Action Team), each pound of Portland cement has a production carbon footprint of 0.86 pounds. Assuming an average transportation distance of 100 miles, the transportation footprint for each pound of Portland cement is 0.016 pounds, for a total carbon footprint of 0.876 pounds $CO_2$ per pound of OPC. For purposes of carbon footprint calculation, conventional aggregate may be assumed to have a carbon footprint of 0.043 lbs $CO_2$/lb aggregate, while carbon footprint of conventional supplementary cementitious materials (SCMs), e.g., fly ash, slag, etc., may be assumed to be 0.045 lbs $CO_2$/lb conventional SCM. Compared to reference concrete comprising conventional aggregate (e.g., sand and/or rock) and OPC as the only cement component, the magnitude of the carbon footprint reduction of the reduced-carbon footprint concrete compositions may be equal to or more than 25 lbs. $CO_2$/yd$^3$ concrete, 50 lbs $CO_2$/yd$^3$ concrete, 100 lbs $CO_2$/yd$^3$ concrete, more than 200 lbs $CO_2$/yd$^3$ concrete, more than 300 lbs $CO_2$/yd$^3$ concrete, more than 400 lbs $CO_2$/yd$^3$ concrete, or more than 500 lbs $CO_2$/yd$^3$ concrete. For example, a reduced-carbon footprint concrete composition comprising OPC, 20% calcium carbonate composition, and 20% fly ash may exhibit a carbon footprint reduction of about 250 lbs $CO_2$/yd$^3$ concrete, such as a reduction of 244 lbs $CO_2$/yd$^3$ concrete. Such a reduced-carbon footprint concrete composition exhibits nearly half the carbon footprint of a conventional concrete composition.

These reductions in carbon footprint may be achieved with concrete mixes that include less than 50% by weight conventional SCMs, such as less than 40% by weight conventional SCMs, including less than 30% by weight conventional SCMs, for example, less than 20% conventional SCMs.

Any of the compositions described in this section, or elsewhere in this application may be used to prepare formed building materials as described in U.S. Provisional Patent Application No. 61/475,204, filed 13 Apr. 2011.

Binary mixtures comprising the calcium carbonate composition and the aggregate may have up to 60% SCM by weight, ternary mixtures comprising at least two SCMs, quaternary mixtures comprising as least three SCMs, etc. may also have up to 60% SCM by weight, the remainder of material being the calcium carbonate composition and the aggregate.

Ternary mixtures (as well as quaternary mixtures, quinary mixtures, etc.) may be described with respect to the cement component comprising the calcium carbonate composition and the aggregate in combination with a bulk SCM, which bulk SCM includes, for example, one of fly ash, slag, or metakaolin in excess of any other SCM. In such ternary mixtures (as well as quaternary mixtures, quinary mixtures, etc.), the bulk SCM (e.g., fly ash, slag, or metakaolin) may be up to 60% by weight of the combined cement component and the bulk SCM.

In certain embodiments, the cementitious compositions may be employed with one or more admixtures. Admixtures are compositions added to concrete compositions to provide fresh concrete or set concrete with desirable characteristics that may not obtainable with basic concrete mixtures (e.g., cement, fine and/or coarse aggregate, water), or to modify properties of fresh concrete to make it more readily useable. As is known in the art, an admixture may be any material or composition, other than the hydraulic cement, aggregate and water, that is used as a component of the concrete or mortar to enhance some characteristic, or lower the cost, thereof. The amount of admixture that is employed may vary depending on the nature of the admixture. In certain embodiments, the amounts of these admixture components, which include synthetic admixtures range from 1% to 50% w/w, such as 5% to 25% w/w, including 10% to 20% w/w, for example, 2% to 10% w/w.

Some reasons for using admixtures may be (1) to achieve certain structural improvements in the resulting cured concrete; (2) to improve the quality of concrete through the successive stages of mixing, transporting, placing, and curing during adverse weather or traffic conditions; (3) to overcome certain emergencies during concreting operations; and/or (4) to reduce the cost of concrete construction. In some instances, the desired concrete performance characteristics can be achieved by the use of an admixture. In some cases, using an admixture allows for the use of less expensive construction methods or designs, the savings from which can more than offset the cost of the admixture.

Admixtures of interest include finely divided mineral admixtures. Finely divided mineral admixtures are materials in powder or pulverized form added to concrete before or during the mixing process to improve or change some of the plastic or hardened properties of the cement. The finely divided mineral admixtures can be classified according to their chemical or physical properties as: cementitious materials; pozzolans; pozzolanic and cementitious materials; and nominally inert materials. A pozzolan is a siliceous or aluminosiliceous material that possesses little or no cementitious value but will, in the presence of water and in finely divided form, chemically react with the calcium hydroxide released by the hydration of Portland cement to form materials with cementitious properties. Pozzolans can also be used to reduce the rate at which water under pressure is transferred through concrete. Diatomaceous earth, opaline cherts, clays, shales, fly ash, silica fume, volcanic tuffs, and pumicites are some of the known pozzolans. Certain ground granulated blast-furnace slags and high calcium fly ashes possess both pozzolanic and cementitious properties. Nominally inert materials can also include finely divided raw quartz, dolomites, limestone, marble, granite, and others.

Fly ash, as well as material comprising metal silicates (e.g., wollastonite, mafic minerals such as olivine and serpentine), may be used to produce pozzolanic material (i.e., a synthetic admixture), which may be used in the cementitious compositions. Such pozzolanic materials are described in U.S. patent application Ser. No. 12/486,692, filed 17 Jun. 2009 and U.S. patent application Ser. No. 12/501,217, filed 10 Jul. 2009, each of which is incorporated herein by reference. Briefly, digestion of fly ash (e.g., by slaking) or material comprising metal silicates generates, in addition to divalent cations, proton-removing agents, or a combination thereof, silica-based material, which, if present during precipitation of carbonate compositions, may be encapsulated by calcium carbonate, magnesium carbonate, or a combination thereof. As such, silica-based material acts as a nucleation site for precipitation of calcium carbonate, magnesium carbonate, or a mixture thereof. Pozzolanic material prepared in this way may be passivated, which reduces the reactivity of the pozzolanic material, which may be desired in certain embodiments. Fly ash, such as that described in U.S. patent application Ser. No. 12/486,692, filed 17 Jun. 2009, which is incorporated herein by reference, may be used as above, or it may be used as an additive to cementitious compositions containing precipitation material described herein.

Quaternary mixtures (e.g., precipitation material, fly ash, and slag; precipitation material, fly ash, and metakaolin; or precipitation material, slag, and metakaolin) and quinary mixtures (e.g., precipitation material, fly ash, slag, and metakaolin) are also anticipated to have increased cement and concrete performance based on the performance and characteristics of the binary and ternary mixture described herein.

One type of admixture of interest may be a plasticizer. Plasticizers may be added to a concrete to provide it with improved workability for ease of placement with reduced consolidating effort and in reinforced concretes required to flow uniformly without leaving void space under reinforcing bars. Also of interest as admixtures are accelerators, retarders, air-entrainers, foaming agents, water reducers, corrosion inhibitors, and pigments. Accelerators are used to increase the cure rate (hydration) of the concrete formulation and are of particular importance in applications where it is desirable for the concrete to harden quickly and in low temperature applications. Retarders act to slow the rate of hydration and increase the time available to pour the concrete and to form it into a desired shape. Retarders are of particular importance in applications where the concrete is being used in hot climates. Air-entrainers are used to distribute tiny air bubbles throughout the concrete. Air-entrainers are of particular value for utilization in regions that experience cold weather because the tiny entrained air bubbles help to allow for some contraction and expansion to protect the concrete from freeze-thaw damage. Pigments can also be added to concrete to provide it with desired color characteristics for aesthetic purposes.

As such, admixtures of interest include, but are not limited to: set accelerators, set retarders, air-entraining agents, defoamers, alkali-reactivity reducers, bonding admixtures, dispersants, coloring admixtures, corrosion inhibitors, damp proofing admixtures, gas formers, permeability reducers, pumping aids, shrinkage compensation admixtures, fungicidal admixtures, germicidal admixtures, insecticidal admixtures, rheology modifying agents, finely divided mineral admixtures, pozzolans, aggregates, wetting agents, strength enhancing agents, water repellents, and any other concrete or mortar admixture or additive. When using an admixture, the fresh cementitious composition, to which the admixture raw materials are introduced, may be mixed for sufficient time to cause the admixture raw materials to be dispersed relatively uniformly throughout the fresh concrete.

Set accelerators are used to accelerate the setting and early strength development of concrete. A set accelerator that can be used with the admixture system can be, but is not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulfate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxyalkylamine; a halide salt of an alkali metal or alkaline earth metal (e.g., chloride). Examples of set accelerators that may be used in the present dispensing method include, but are not limited to, POZZOLITH®NC534, nonchloride type set accelerator and/or RHEOCRETE®CNI calcium nitrite-based corrosion inhibitor, both sold under the above trademarks by BASF Admixtures Inc. of Cleveland, Ohio.

Also of interest are set retarding admixtures. Set retarding, also known as delayed-setting or hydration control, admixtures are used to retard, delay, or slow the rate of setting of concrete. They can be added to the concrete mix upon initial batching or sometime after the hydration process has begun. Set retarders are used to offset the accelerating effect of hot weather on the setting of concrete, or delay the initial set of concrete or grout when difficult conditions of placement occur, or problems of delivery to the job site, or to allow time for special finishing processes. Most set retarders also act as low level water reducers and can also be used to entrain some air into concrete. Retarders that can be used include, but are not limited to an oxy-boron compound, corn syrup, lignin, a polyphosphonic acid, a carboxylic acid, a hydroxycarboxylic acid, polycarboxylic acid, hydroxylated carboxylic acid, such as fumaric, itaconic, malonic, borax, gluconic, and tartaric acid, lignosulfonates, ascorbic acid, isoascorbic acid, sulfonic acid-acrylic acid copolymer, and their corresponding salts, polyhydroxysilane, polyacrylamide, carbohydrates and mixtures thereof. Illustrative examples of retarders are set forth in U.S. Pat. Nos. 5,427,617 and 5,203,919, incorporated herein by reference. A further example of a retarder suitable for use in the admixture system is a hydration control admixture sold under the trademark DELVO® by BASF Admixtures Inc. of Cleveland, Ohio.

Also of interest as admixtures are air entrainers. The term air entrainer includes any substance that will entrain air in cementitious compositions. Some air entrainers can also reduce the surface tension of a composition at low concentration. Air-entraining admixtures are used to purposely entrain microscopic air bubbles into concrete. Air-entrainment dramatically improves the durability of concrete exposed to moisture during cycles of freezing and thawing. In addition, entrained air greatly improves concrete's resistance to surface scaling caused by chemical deicers. Air entrainment also increases the workability of fresh concrete while eliminating or reducing segregation and bleeding. Materials used to achieve these desired effects can be selected from wood resin, natural resin, synthetic resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. Air entrainers are added in an amount to yield a desired level of air in a cementitious composition. Examples of air entrainers that can be utilized in the admixture system include, but are not limited to MB AE 90, MB VR and MICRO AIR®, all available from BASF Admixtures Inc. of Cleveland, Ohio.

Also of interest as admixtures are defoamers. Defoamers are used to decrease the air content in the cementitious composition. Examples of defoamers that can be utilized in the cementitious composition include, but are not limited to mineral oils, vegetable oils, fatty acids, fatty acid esters, hydroxyl functional compounds, amides, phosphoric esters, metal soaps, silicones, polymers containing propylene oxide moieties, hydrocarbons, alkoxylated hydrocarbons, alkoxylated polyalkylene oxides, tributyl phosphates, dibutyl phthalates, octyl alcohols, water-insoluble esters of carbonic and boric acid, acetylenic diols, ethylene oxide-propylene oxide block copolymers and silicones.

Also of interest as admixtures are dispersants. The term dispersant as used throughout this specification includes, among others, polycarboxylate dispersants, with or without polyether units. The term dispersant is also meant to include those chemicals that also function as a plasticizer, water reducer such as a high range water reducer, fluidizer, antiflocculating agent, or superplasticizer for cementitious compositions, such as lignosulfonates, salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins for example LOMAR D® dispersant (Cognis Inc., Cincinnati, Ohio), polyaspartates, or oligomeric dispersants. Polycarboxylate dispersants can be used, by which is meant a dispersant having a carbon backbone with pendant side chains, wherein at least a portion of the side chains are attached to the backbone through a carboxyl group or an ether group. The polycarboxylate dispersants of interest include but are not limited to dispersants or water reducers sold under the trademarks GLENIUM® 3030NS, GLENIUM® 3200 HIES, GLENIUM 3000NS®, GLENIUM® 7500 (BASF Admixtures Inc., Cleveland, Ohio), ADVA® (W. R. Grace Inc., Cambridge, Mass.), VISCOCRETE® (Sika, Zurich, Switzerland), and SUPERFLUX® (Axim Concrete Technologies Inc., Middlebranch, Ohio).

Also of interest as admixtures are alkali reactivity reducers. Alkali reactivity reducers can reduce the alkali-aggregate reaction and limit the disruptive expansion forces that this reaction can produce in hardened concrete. The alkali-reactivity reducers include pozzolans (fly ash, silica fume), blast-furnace slag, salts of lithium and barium, and other air-entraining agents.

Natural and synthetic admixtures are used to color concrete for aesthetic and safety reasons. These coloring admixtures are usually composed of pigments and include carbon black, iron oxide, phthalocyanine, umber, chromium oxide, titanium oxide, cobalt blue, and organic coloring agents.

Also of interest as admixtures are corrosion inhibitors. Corrosion inhibitors in concrete serve to protect embedded reinforcing steel from corrosion due to its highly alkaline nature. The high alkaline nature of the concrete causes a passive and noncorroding protective oxide film to form on steel. However, carbonation or the presence of chloride ions from deicers or seawater can destroy or penetrate the film and result in corrosion. Corrosion-inhibiting admixtures chemically arrest this corrosion reaction. The materials most commonly used to inhibit corrosion are calcium nitrite, sodium nitrite, sodium benzoate, certain phosphates or fluorosilicates, fluoroaluminates, amines and related chemicals.

Also of interest are damp proofing admixtures. Damp proofing admixtures reduce the permeability of concrete that have low cement contents, high water-cement ratios, or a deficiency of fines in the aggregate. These admixtures retard moisture penetration into dry concrete and include certain soaps, stearates, and petroleum products.

Also of interest are gas former admixtures. Gas formers, or gas-forming agents, are sometimes added to concrete and grout in very small quantities to cause a slight expansion prior to hardening. The amount of expansion is dependent upon the amount of gas-forming material used and the temperature of the fresh mixture. Aluminum powder, resin soap and vegetable or animal glue, saponin or hydrolyzed protein can be used as gas formers.

Also of interest are permeability reducers. Permeability reducers are used to reduce the rate at which water under pressure is transmitted through concrete. Silica fume, fly ash, ground slag, natural pozzolans, water reducers, and latex can be employed to decrease the permeability of the concrete.

Also of interest are rheology modifying agent admixtures. Rheology modifying agents can be used to increase the viscosity of cementitious compositions. Suitable examples of rheology modifier include firmed silica, colloidal silica, hydroxyethyl cellulose, hydroxypropyl cellulose, fly ash (as defined in ASTM C618), mineral oils (such as light naphthenic), hectorite clay, polyoxyalkylenes, polysaccharides, natural gums, or mixtures thereof.

Also of interest are shrinkage compensation admixtures. The shrinkage compensation agent which may be used in the cementitious composition may include, but is not limited to, $RO(AO)_{1-10}H$, wherein R is a $C_{1-5}$ alkyl or $C_{5-6}$ cycloalkyl radical and A is a $C_{2-3}$ alkylene radical, alkali metal sulfate, alkaline earth metal sulfates, alkaline earth oxides, preferably sodium sulfate and calcium oxide. TETRAGUARD® is an example of a shrinkage reducing agent and is available from BASF Admixtures Inc. of Cleveland, Ohio.

Bacterial and fungal growth on or in hardened concrete may be partially controlled through the use of fungicidal and germicidal admixtures. The most effective materials for these purposes are polyhalogenated phenols, dialdrin emulsions, and copper compounds.

Also of interest in certain embodiments are workability improving admixtures. Entrained air, which acts like a lubricant, can be used as a workability improving agent. Other workability agents are water reducers and certain finely divided admixtures.

In certain embodiments, the cements are employed, with fibers, e.g., where one desires fiber-reinforced concrete. Fibers can be made of zirconia containing materials, steel, carbon, fiberglass, or synthetic materials, e.g., polypropylene, nylon, polyethylene, polyester, rayon, high-strength aramid, (i.e. Kevlar®), or mixtures thereof.

B. Methods

In one aspect, there is provided a method for forming a cementitious or concrete composition, by mixing between 10-55 wt % of a composition comprising calcium carbonate, wherein between 50-100 wt % of the calcium carbonate is in a metastable polymorphic form comprising vaterite, and wherein the calcium carbonate has a $\delta^{13}C$ value of between −12 to −30‰, with between 45-90 wt % of aggregate to form a cementitious composition, and contacting the cementitious composition with water when the cementitious composition sets and hardens into cement with a compressive strength of at least 2000 psi where the calcium carbonate binds to the aggregate.

Some examples of the methods to prepare the composition comprising calcium carbonate and the cementitious composition are described herein.

In some embodiments, in the foregoing aspect, before the mixing step there is further provided a method for forming a cementitious or concrete composition, by a) making a composition comprising calcium carbonate by contacting an industrial waste gas stream comprising carbon dioxide with a proton removing agent or an alkali to form a carbon dioxide charged water; and b) contacting the carbon dioxide charged water with divalent cations to form the composition comprising calcium carbonate. In some embodiments, the foregoing method further includes contacting the carbon dioxide charged water with the divalent cations under precipitation conditions that favor the formation of the composition comprising calcium carbonate that has between 50-100 wt % of the calcium carbonate in a metastable polymorphic form comprising vaterite. In some embodiments, the precipitation conditions favor the formation of more than 50 wt % vaterite or between 50-100 wt % vaterite or between 50-99 wt % vaterite in the composition comprising calcium carbonate. Some examples of such precipitation conditions have been described herein.

An illustration of the process to make the composition comprising carbonate is depicted in FIG. 1. In some embodiments, an absorbing solution, e.g., an alkaline solution is charged with $CO_2$ to produce $CO_2$ charged solution 30, which $CO_2$ charged solution is then subjected to carbonate compound precipitation conditions at step 20. In some embodiments, the divalent cation solution 10 is contacted with the $CO_2$ charged solution containing bicarbonate/carbonate ions, which solution is then subjected to carbonate compound precipitation conditions to form the carbonate composition. The "divalent cation" used herein includes calcium (such as in hydrated lime or carbide lime or gypsum or any solution containing calcium ions) optionally containing magnesium to precipitate calcium carbonate optionally containing calcium bicarbonate, and/or magnesium bicarbonate/carbonate. As illustrated in FIG. 1, a $CO_2$ gaseous stream 30 may also be contacted with the divalent cation solution at precipitation step 20. The "$CO_2$ charged water" or "$CO_2$ charged solution" includes water that has had $CO_2$ gas contacted with it to produce, e.g., carbonic acid, bicarbonate and/or carbonate ion.

Below are provided various components that may be used in making the compositions comprising carbonate.

Carbon Dioxide

The source of $CO_2$ that is used in the embodiments provided herein may be any convenient $CO_2$ source. The $CO_2$ source may be a liquid, solid (e.g., dry ice) or gaseous $CO_2$ source. In certain embodiments, the $CO_2$ source is a gaseous $CO_2$ source. This gaseous $CO_2$ is, in some embodiments, a waste stream or product from an industrial plant. The nature of the industrial plant may vary in these embodiments, where industrial plants of interest include power plants, chemical processing plants, steel mills, paper mills, cement plants, and other industrial plants that produce $CO_2$ as a byproduct. The industrial waste gas stream includes a stream of gas (or analogous stream) that is produced as a byproduct of an active process of the industrial plant. The gaseous stream may be substantially pure $CO_2$ or a multi-component gaseous stream that includes $CO_2$ and one or more additional gases. Multi-component gaseous streams (containing $CO_2$) that may be employed as a $CO_2$ source in embodiments of the methods include both reducing, e.g., syngas, shifted syngas, natural gas, and hydrogen and the like, and oxidizing condition streams, e.g., flue gases from combustion. Particular multi-component gaseous streams of interest that may be treated according to the invention include: oxygen containing combustion power plant flue gas, turbo charged boiler product gas, coal gasification product gas, shifted coal gasification product gas, anaerobic digester product gas, wellhead natural gas stream, reformed natural gas or methane hydrates, and the like.

Thus, the waste streams may be produced from a variety of different types of industrial plants. Suitable waste streams for the invention include waste streams, such as, flue gas, produced by industrial plants that combust fossil fuels (e.g., coal, oil, natural gas) or anthropogenic fuel products of naturally occurring organic fuel deposits (e.g., tar sands, heavy oil, oil shale, etc.). In some embodiments, a waste stream suitable for systems and methods of the invention is sourced from a coal-fired power plant, such as a pulverized coal power plant, a supercritical coal power plant, a mass burn coal power plant, a fluidized bed coal power plant. In some embodiments, the waste stream is sourced from gas or oil-fired boiler and steam turbine power plants, gas or oil-fired boiler simple cycle gas turbine power plants, or gas or oil-fired boiler combined cycle gas turbine power plants. In some embodiments, waste streams produced by power plants that combust syngas (i.e., gas that is produced by the gasification of organic matter, for example, coal, biomass, etc.) are used. In some embodiments, waste streams from integrated gasification combined cycle (IGCC) plants are used. In some embodiments, waste streams produced by Heat Recovery Steam Generator (HRSG) plants are used to produce compositions in accordance with systems and methods of the invention.

Waste streams produced by cement plants are also suitable for systems and methods of the invention. Cement plant waste streams include waste streams from both wet process and dry process plants, which plants may employ shaft kilns or rotary kilns, and may include pre-calciners. These industrial plants may each burn a single fuel, or may burn two or more fuels sequentially or simultaneously.

Contact protocols for absorbing $CO_2$, include, but are not limited to: direct contacting protocols, e.g., bubbling the gas through the volume of water, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient.

Carbon dioxide may be the primary non-air derived component in waste gas streams. In some embodiments, waste gas streams may comprise carbon dioxide in amounts ranging from 200 ppm to 1,000,000 ppm, such as 200,000 ppm to 1000 ppm and including 200,000 ppm to 2000 ppm, for example 130,000 ppm to 2000 ppm, wherein the amounts of carbon dioxide may be considered time-averaged amounts. For example, in some embodiments, waste gas streams may comprise carbon dioxide in an amount ranging from 40,000 ppm (4%) to 100,000 ppm (10%) depending on the waste gas stream (e.g., $CO_2$ from natural gas-fired power plants, furnaces, small boilers, etc.). For example, in some embodiments, waste gas streams may comprise carbon dioxide in an amount ranging from 100,000 ppm (10%) to 150,000 ppm (15%) depending on the waste gas stream (e.g., $CO_2$ from coal-fired power plants, oil generators, diesel generators, etc.). For example, in some embodiments, waste gas streams may comprise carbon dioxide in an amount ranging from 200,000 ppm (20%) to 400,000 ppm (40%) depending on the waste gas stream (e.g., $CO_2$ from cement plant calcination, chemical plants, etc.). For example, in some embodiments, waste gas streams may comprise carbon dioxide in an amount ranging from 900,000 ppm (90%) to 1,000,000 ppm (100%) depending on the waste gas stream (e.g., $CO_2$ from ethanol fermenters, $CO_2$ from steam reforming at refineries, ammonia plants, substitute natural gas (SNG) plants, $CO_2$ separated from sour gases, etc.). The concentration of $CO_2$ in a waste gas stream may be decreased by 10% or more, 20% or more, 30% or more, 40% or more, 50% or more, 60% or more, 70% or more, 80% or more, 90% or more, 95% or more, 99% or more, 99.9% or more, or 99.99%. In other words, at least 10%, 20%, 30%, 40%, 50%, 60%, 70%, 80%, 90%, 95%, 99%, 99.9%, or 99.99% of the carbon dioxide may be removed from the waste gas stream.

A portion of the waste gas stream (i.e., not the entire gaseous waste stream) from an industrial plant may be used to produce compositions comprising carbonates, bicarbonates, or carbonates and bicarbonates. In these embodiments, the portion of the waste gas stream that is employed in producing compositions may be 75% or less, such as 60% or less, and including 50% and less of the waste gas stream. In yet other embodiments, most (e.g., 80% or more) of the entire waste gas stream produced by the industrial plant is employed in producing compositions. In these embodiments, 80% or more, such as 90% or more, including 95% or more, up to 100% of the waste gas stream (e.g., flue gas) generated by the source may be employed for producing compositions of the invention.

Although a waste gas stream from an industrial plant offers a relatively concentrated source of $CO_2$ and/or additional components resulting from combustion of fossil fuels, methods and systems provided herein are also applicable to removing combustion gas components from less concentrated sources (e.g., atmospheric air), which may contain a lower concentration of pollutants than, for example, flue gas. Thus, in some embodiments, methods and systems encompass decreasing the concentration of $CO_2$ and/or additional components in atmospheric air by producing compositions of the invention. As with waste gas streams, the concentration of $CO_2$ in a portion of atmospheric air may be decreased by 10% or more, 20% or more, 30% or more, 40% or more, 50% or more, 60% or more, 70% or more, 80% or more, 90% or more, 95% or more, 99% or more, 99.9% or more, or 99.99%. Such decreases in $CO_2$ may be accomplished with yields as described herein, or with higher or lower yields, and may be accomplished in one processing step or in a series of processing steps.

Waste gas streams suitable for the invention may further comprise one or more additional components including water; sulfur oxides (SOx); nitrogen oxides (NOx); carbon monoxide (CO); metals such as antimony (Sb), arsenic (As), barium (Ba), beryllium (Be), boron (B), cadmium (Cd), chromium (Cr), cobalt (Co), copper (Cu), lead (Pb), manganese (Mn), mercury (Hg), molybdenum (Mo), nickel (Ni), radium (Ra), selenium (Se), silver (Ag), strontium (Sr), thallium (Tl), vanadium (V), and zinc (Zn), wherein the metals may be in any available form including, but not limited to, an elemental form (e.g., Hg), a salt (e.g., $HgCl_2$), an inorganic compound (e.g., HgO), an organic compound (e.g., an organomercury compound), or particulate form (e.g., Hg(p)); particulate matter (suspended particles of solids or liquids) such as fly ash, dust (e.g., from calcining), and metals; halides such as hydrogen chloride and hydrogen fluoride, which may also be considered acid gases along with, for example, SOx (e.g., $SO_3$, $SO_2$); organics such as volatile organic compounds (VOCs), hydrocarbons, dioxins, and polyaromatic hydrocarbons (PAHs); toxic substances such as hydrogen cyanide and sulfur nitrate ($SNO_3$); and radioactive isotopes such as uranium (U) and thorium (Th), any one or more (e.g., two or more, three or more, four or more, five or more, etc.) of which may be sequestered in a composition of the invention.

In some embodiments, there is provided at least 1%, 5%, 10%, 25%, 30%, 40%, 50%, 60%, 70%, 75%, 80%, 85%, 90%, 95%, 96%, 97%, 98%, 99%, 99.9%, or 99.99% removal of one or more of the additional waste gas stream components, wherein each of the one or more components may be removed at the same or a different percentage level. For example, in some embodiments, 98% of the SOx and 95% of the mercury may be removed from a waste gas stream using systems and methods provided herein, while in other embodiments, 98% of the SOx and 98% of the mercury may be removed from the waste gas stream. In another exemplary embodiment, at least 99% $SO_2$, at least 88% $SO_3$, and 81% HCl, each of which may be considered an acid gas, may be removed from a waste gas stream using systems and methods provided herein. In such an embodiment, there is provided at least 80% removal of acid gases (e.g., SOx, HCl, etc.). In addition to the foregoing, at least 10%, 20%, 30%, 40%, 50%, 60%, 70%, 80%, 90%, 95%, 96%, 97%, 98%, 99%, 99.9%, or 99.99% of the carbon dioxide may be removed from the waste gas stream.

In a typical untreated flue gas resulting from combustion of a low-sulfur eastern bituminous coal, the flue gas may comprise $H_2O$ (5-7%); $O_2$ (3-4%); $CO_2$ (15-16%); Hg (1 ppb); CO (20 ppm); hydrocarbons (10 ppm); HCl (100 ppm); SOx (810 ppm, wherein the concentration of $SO_2$ is 800 ppm and the concentration of $SO_3$ is 10 ppm); NOx (500 ppm, wherein the concentration of NO is 475 ppm and the concentration of $NO_2$ is 25 ppm), and $N_2$ (balance). Different coals may give untreated flue gases with different contaminant concentrations (e.g., 10-15% $CO_2$, 10-20 ppm CO, 500-3000 ppm SOx, 150-500 ppm NOx, 1-2 ppb Hg, 5-10% fly ash, etc.), any of which flue gases are suitable for use herein. In reference to the medium (e.g., aqueous solution) in which $CO_2$ is processed, many of the additional components of waste gas streams may be conveniently, though not strictly, grouped as soluble (e.g., $HgCl_2$, $NO_2$, etc.), reactive (e.g., HCl, HF, etc.), or not soluble and not reactive (e.g., As, Cd, Pb, Cr, V, Se, etc.). Methods provided herein include treating waste gas streams such that certain additional components may be more soluble or more reactive in the medium in which $CO_2$ is processed. For example, in some embodiments, elemental mercury may be oxidized to mercuric chloride ($HgCl_2$) in the presence of hydrogen chloride (HCl) or chlorine ($Cl_2$), which may be generated by electrochemical methods of the invention.

A variety of different methods may be employed to prepare the compositions of the invention. $CO_2$ sequestration protocols of interest include, but are not limited to, those disclosed in U.S. patent application Ser. No. 12/126,776, filed 23 May 2008; Ser. No. 12/163,205, filed 27 Jun. 2008; Ser. No.

12/486,692, filed 17 Jun. 2009; Ser. No. 12/501,217, filed 10 Jul. 2009; and Ser. No. 12/557,492, filed 10 Sep. 2009; as well as International Application No. PCT/US08/88318, filed 24 Dec. 2008; and PCT/US09/45722, filed 29 May 2009; the disclosures of which are herein incorporated by reference in their entireties.

In some embodiments, the absorbing solution charged with the partially or fully dissolved $CO_2$ is made by parging or diffusing the $CO_2$ gaseous stream through a solution to make a $CO_2$ charged water. In some embodiments, the solution with $CO_2$ includes an alkaline agent or a proton removing agent or a pH raising agent. In some embodiments, the $CO_2$ gas is bubbled or parged through a solution containing alkali, such as sodium or potassium hydroxide or sodium or potassium carbonate, in an absorber. In some embodiments, the absorber may include a bubble chamber where the $CO_2$ gas is bubbled through the solution containing the alkali. In some embodiments, the absorber may include a spray tower where the solution containing the alkali is sprayed or circulated through the $CO_2$ gas. In some embodiments, the absorber may include a pack bed to increase the surface area of contact between the $CO_2$ gas and the solution containing the alkali. In some embodiments, a typical absorber fluid temperature is 32-37° C. The absorber for absorbing $CO_2$ in the solution is described in U.S. application Ser. No. 12/721,549, filed on Mar. 10, 2010, which is incorporated herein by reference in its entirety. The $CO_2$ charged water may be then contacted with the divalent cation i.e. alkaline earth metal containing water to form the carbonate composition.

Absorbing Solution or Alkaline Solution

In some embodiments, the absorbing solution that comes into contact with the $CO_2$ source is an alkaline solution. An "alkaline solution" or "alkali" or "proton removing agent" or "pH raising agent", as used herein, includes solutions of pH greater than 8, e.g. 8-14, such as, but not limited to, NaOH, $Na_2CO_3$, KOH, $K_2CO_3$, $NH_4OH$, $Ca(OH)_2$, $Mg(OH)_2$, or combinations thereof.

Provided is a method for contacting an alkaline solution with a source of carbon dioxide to produce a composition comprising carbonates, bicarbonates, or carbonates and bicarbonates, wherein the composition is a solution or slurry. Contacting the alkaline solution with the source of carbon dioxide facilitates dissolution of $CO_2$ into the alkaline solution producing carbonic acid (e.g., hydrated $CO_2$), a species in equilibrium with both bicarbonate and carbonate. In order to produce compositions comprising carbonate (e.g., precipitation material comprising carbonates, bicarbonates, or carbonates and bicarbonates), protons are removed from various species (e.g. carbonic acid, bicarbonate, hydronium, etc.) in the alkaline solution to shift the equilibrium toward bicarbonate, carbonate, or somewhere in between. As protons are removed, more $CO_2$ goes into solution. In some embodiments, proton-removing agents and/or methods are used while contacting an aqueous solution with $CO_2$ to increase $CO_2$ absorption in one phase of the reaction, wherein the pH may remain constant, increase, or even decrease, followed by a rapid removal of protons (e.g., by addition of a base), which, in some embodiments, may cause rapid precipitation of precipitation material. Protons may be removed from the various species (e.g. carbonic acid, bicarbonate, hydronium, etc.) by any convenient approach, including, but not limited to use of naturally occurring proton-removing agents, use of microorganisms and fungi, use of synthetic chemical proton-removing agents, recovery of waste streams from industrial processes, and using electrochemical means.

In some embodiments, the hydrated lime or the carbide lime that is being used as a source of divalent cations also acts as a source of proton removing agents due to the presence of $CaO/Ca(OH)_2$. In some embodiments, the absorbing solution is a saltwater solution comprising the alkali. A saltwater, as used herein, includes, but is not limited to, sea water, brackish water, brines, and salt containing solutions, such as, sodium chloride solutions. Other absorbing solutions that may be used in methods of the invention to contact the $CO_2$ from the $CO_2$ source include, but are not limited to, water, municipal water, surface water, amine solutions, non-aqueous solutions, organic solvent solutions, or any combination thereof. Absorbing solution may be used to remove gaseous carbon dioxide from a gaseous source of carbon dioxide in a gaseous carbon dioxide removal process.

Naturally occurring proton-removing agents encompass any proton-removing agents found in the wider environment that may create or have a basic local environment. Some embodiments provide for naturally occurring proton-removing agents including minerals that create basic environments upon addition to solution. Such minerals include, but are not limited to, lime (CaO); periclase (MgO); iron hydroxide minerals (e.g., goethite and limonite); and volcanic ash. Methods for digestion of such minerals and rocks comprising such minerals are described in U.S. patent application Ser. No. 12/501,217, filed 10 Jul. 2009, which is incorporated herein by reference in its entirety. Some embodiments provide for using naturally occurring bodies of water as a source proton-removing agents, which bodies of water comprise carbonate, borate, sulfate, or nitrate alkalinity, or some combination thereof. Any alkaline brine (e.g., surface brine, subsurface brine, a deep brine, etc.) is suitable for use in the invention. In some embodiments, a surface brine comprising carbonate alkalinity provides a source of proton-removing agents. In some embodiments, a surface brine comprising borate alkalinity provides a source of proton-removing agents. In some embodiments, a subsurface brine comprising carbonate alkalinity provides a source of proton-removing agents. In some embodiments, a subsurface brine comprising borate alkalinity provides a source of proton-removing agents. In some embodiments, a deep brine comprising carbonate alkalinity provides a source of proton-removing agents. In some embodiments, a deep brine comprising borate alkalinity provides a source of proton-removing agents. Examples of naturally alkaline bodies of water include, but are not limited to surface water sources (e.g. alkaline lakes such as Mono Lake in California) and ground water sources (e.g. basic aquifers such as the deep geologic alkaline aquifers located at Searles Lake in California). Other embodiments provide for use of deposits from dried alkaline bodies of water such as the crust along Lake Natron in Africa's Great Rift Valley. For additional sources of brines and evaporites, see U.S. Provisional Patent Application No. 61/264,564, filed 25 Nov. 2009, which is incorporated herein by reference in its entirety.

In some embodiments, organisms that excrete basic molecules or solutions in their normal metabolism are used as proton-removing agents. Examples of such organisms are fungi that produce alkaline protease (e.g., the deep-sea fungus Aspergillus ustus with an optimal pH of 9) and bacteria that create alkaline molecules (e.g., cyanobacteria such as Lyngbya sp. from the Atlin wetland in British Columbia, which increases pH from a byproduct of photosynthesis). In some embodiments, organisms are used to produce proton-removing agents, wherein the organisms (e.g., Bacillus pasteurii, which hydrolyzes urea to ammonia) metabolize a contaminant (e.g. urea) to produce proton-removing agents or solutions comprising proton-removing agents (e.g., ammonia, ammonium hydroxide). In some embodiments, organisms are cultured separately from the precipitation reaction mixture, wherein proton-removing agents or solution comprising proton-removing agents are used for addition to the precipitation reaction mixture. In some embodiments, naturally occurring or manufactured enzymes are used in combination with proton-removing agents to invoke precipitation of precipitation material. Carbonic anhydrase, which is an enzyme produced by plants and accelerates transformation of carbonic acid to bicarbonate in aqueous solution. As such, carbonic anhydrase may be used to enhance dissolution of $CO_2$ and accelerate precipitation of precipitation material, as described in herein.

Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary amines such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phosphazene is used to remove protons from various species (e.g., carbonic acid, bicarbonate, hydronium, etc.) for preparation of compositions of the invention. In some embodiments, ammonia is used to raise pH to a level sufficient for preparation of compositions of the invention. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used. Carbonates for use in the invention include, but are not limited to, sodium carbonate.

In addition to providing cations (e.g., $Ca^{2+}$, $Mg^{2+}$, etc.) and other suitable metal forms suitable for use herein, waste streams from various industrial processes (i.e., industrial waste streams) may provide proton-removing agents. Such waste streams include, but are not limited to, mining wastes; ash (e.g., coal ash such as fly ash, bottom ash, boiler slag); slag (e.g. iron slag, phosphorous slag); cement kiln waste (e.g., cement kiln dust (CKD)); oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Mining wastes include any wastes from the extraction of metal or another precious or useful mineral from the earth. In some embodiments, wastes from mining are used to modify pH, wherein the waste is selected from red mud from the Bayer aluminum extraction process; waste from magnesium extraction from seawater (e.g., $Mg(OH)_2$ such as that found in Moss Landing, Calif.); and wastes from mining processes involving leaching. For example, red mud may be used to modify pH as described in U.S. Provisional Patent Application No. 61/161,369, filed 18 Mar. 2009, which is incorporated herein by reference in its entirety. Red mud, depending on processing conditions and source material (e.g., bauxite) might comprise $Fe_2O_3$, $Al_2O_3$, $SiO_2$, $Na_2O$, CaO, $TiO_2$, $K_2O$, MgO, $CO_2$, $S_2O$, $Mno_2$, $P_2O_5$, each of which species are loosely listed in order from most abundant to least abundant, and each of which species are expressed as oxides for convenience. Coal ash, cement kiln dust, and slag, collectively waste sources of metal oxides, further described in U.S. patent application Ser. No. 12/486,692, filed 17 Jun. 2009, the disclosure of which is incorporated herein in its entirety, may be used in alone or in combination with other proton-removing agents to provide proton-removing agents for the invention. Agricultural waste, either through animal waste or excessive fertilizer use, may contain potassium hydroxide (KOH) or ammonia ($NH_3$) or both. As such, agricultural waste may be used in some embodiments of the invention as a proton-removing agent. This agricultural waste is often collected in ponds, but it may also percolate down into aquifers, where it can be accessed and used.

The alkali such as NaOH, KOH, $Na_2CO_3$, etc. may be made using any electrochemical method known in the art. Some examples of the electrochemical methods are described herein below.

Electrochemical Methods

Electrochemical methods may be used to produce alkalinity, such as hydroxide species (e.g. NaOH, KOH, $OH^-$) or carbonate species (e.g. $Na_2CO_3$, $K_2CO_3$, $H_2CO_3$, $CO_3^{2-}$). Electrochemical methods may be used to produce alkalinity at a cathode, such as hydroxide species (e.g. NaOH, KOH, $OH^-$) or carbonate species (e.g. $Na_2CO_3$, $K_2CO_3$, $H_2CO_3$, $CO_3^{2-}$). The electrochemical methods of the invention are described in more detail in commonly assigned applications with application Ser. No. 12/541,055, filed Aug. 13, 2009; Ser. No. 12/503,557, filed Jul. 15, 2009; and Ser. No. 13/474,598, filed May 17, 2012, and commonly assigned U.S. Pat. Nos. 7,875,163 and 7,790,012, each of which are incorporated by reference herein in their entirety.

Figure 2:
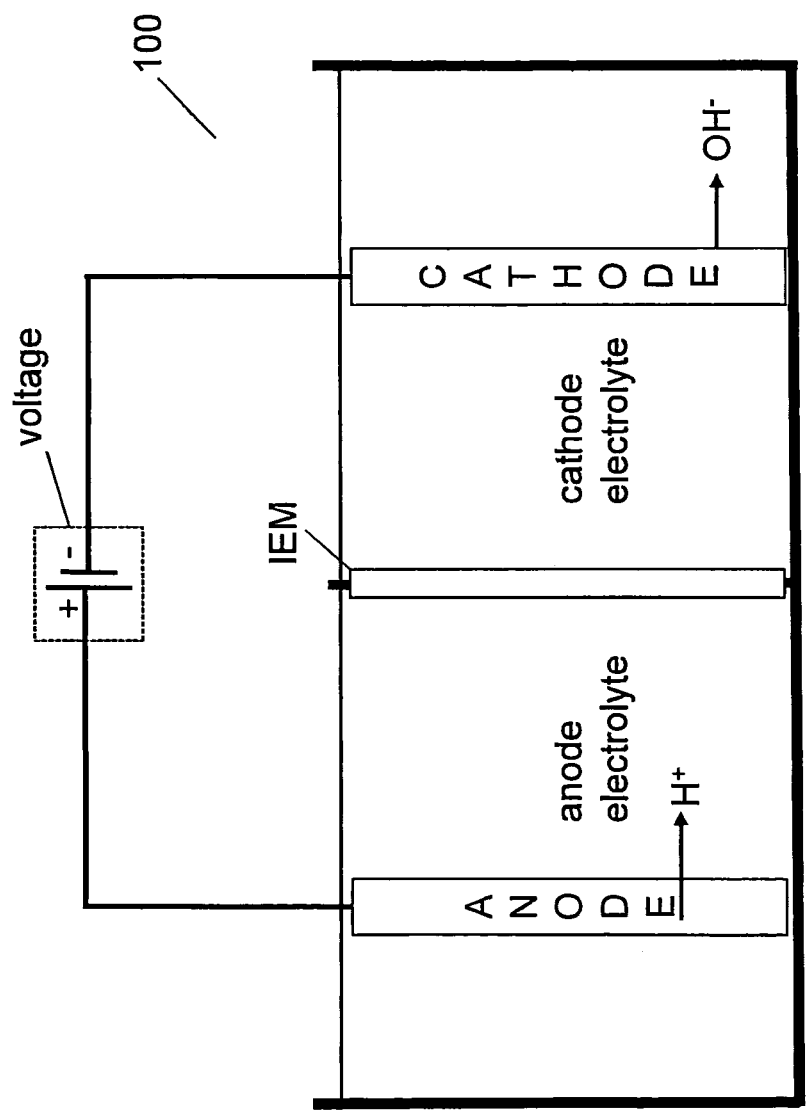
FIG. 2 illustrates an embodiment of the electrochemical system provided herein.
Figure 3:
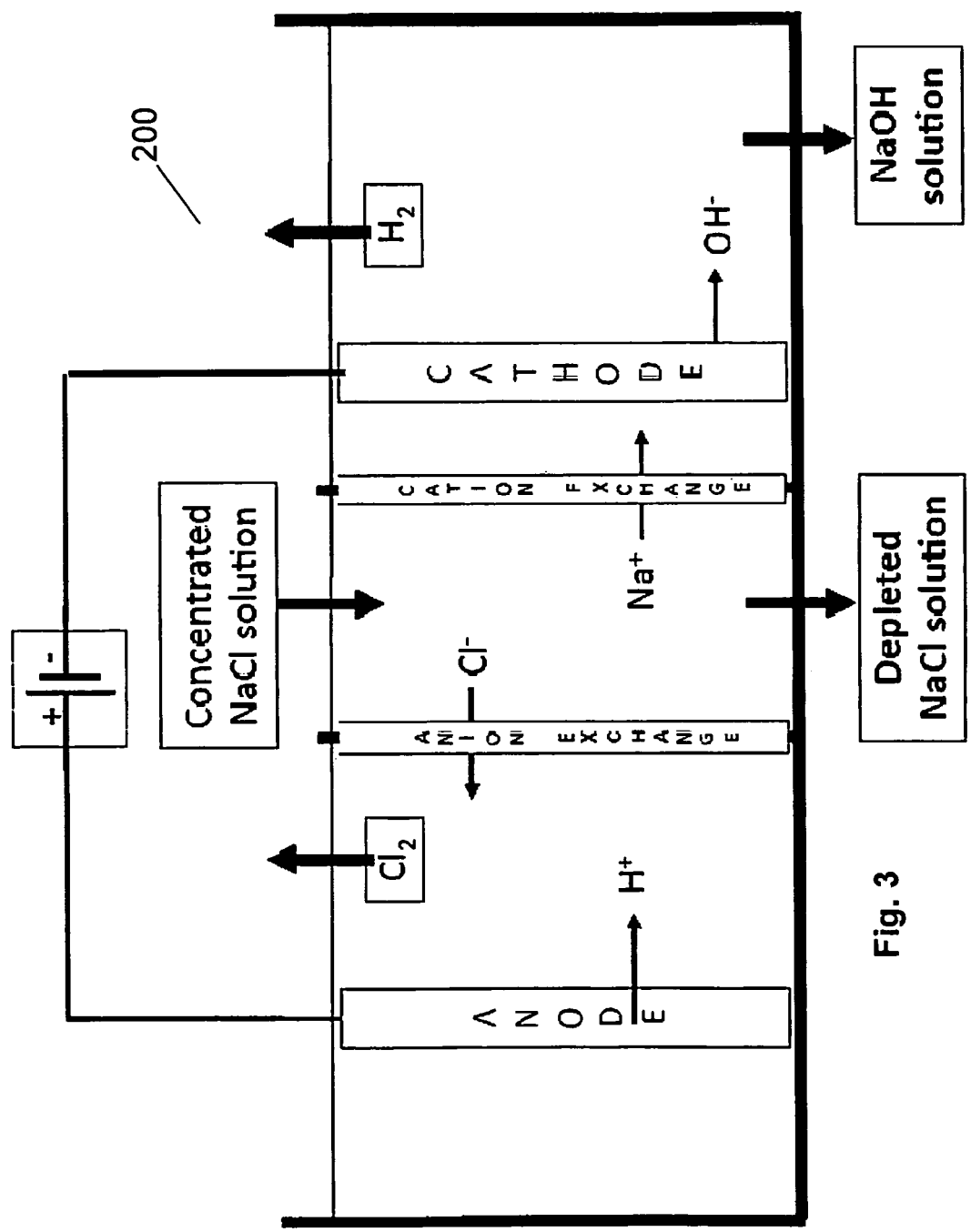
FIG. 3 illustrates an embodiment of the electrochemical system provided herein.

In some embodiments, the electrochemical cell includes at least one unit cell, the unit cell including at least a cathode, an anode, at least one ion exchange membrane, electrolytes, and a potentiostat device for applying a voltage across the anode and cathode of such a unit cell or a collection of units cells that could be in stacked in a larger electrochemical cell. An example of the electrochemical cell is illustrated in FIG. 2 where the electrochemical cell 100 has a cathode chamber containing the cathode and the cathode electrolyte; an anode chamber containing the anode and the anode electrolyte; and an ion exchange membrane between the cathode chamber and the anode chamber. The hydroxide is formed in the cathode electrolyte and depending on the electrolyte used an acid is formed in the anode electrolyte. For example, if sodium chloride is used as the anode electrolyte, then chloride ions may combine with the hydrogen ions formed at the anode to form acid in the anode electrolyte. The sodium ions may pass through the ion exchange membrane to the cathode electrolyte to form sodium hydroxide. It is to be understood that FIG. 2 is for illustration purposes only and deviations from the electrochemical cell are well within the scope of the invention as long as an alkali is formed in the cathode electrolyte. For example, the cell may contain an anion exchange membrane and a cation exchange membrane as illustrated in the electrochemical cell 200 in FIG. 3. As illustrated in FIG. 3, the hydrogen gas is formed at the cathode which is then transferred to the anode to form hydrogen ions.

In some embodiments, a potentiostat device is used to apply a voltage of 2.0V or less across the anode and the cathode of the electrochemical cell, resulting in production of alkalinity at the cathode without production of any gas at the anode. The alkaline solution may be withdrawn from the electrochemical cell to be used in the absorption of carbon dioxide to form the cementitious composition of the invention. In some embodiments, a potentiostat device is used to apply a voltage of 1.9V or less across an anode and a cathode of an electrochemical cell, resulting in production of alkalinity at the cathode without production of any gas at the anode, such as 1.8V or less, such as 1.7V or less, such as 1.6V or less, such as 1.5V or less, such as 1.4V or less, such as 1.3V or less, such as 1.2V or less, such as 1.1V or less, such as 1.0V or less, such as 0.9V or less, such as 0.8V or less, such as 0.7V or less, such as 0.6V or less, such as 0.5V or less resulting in the production of alkalinity at the cathode. In some embodiments, a potentiostat device is used to apply a voltage of 0.5V or less across an anode and a cathode of an electrochemical cell, resulting in production of alkalinity at the cathode without production of any gas at the anode.

In some embodiments, the acid formed in the anode electrolyte may be used for chlorination. In some embodiments, the acid may be used to chlorinate unsaturated hydrocarbons such as, but not limited to, ethylene, styrene etc. to form chlorinated products, such as, but not limited to, styrene chloride, vinyl chloride, etc. The chlorinated products may be then used as monomers (e.g. chlorinated products of olefins, acrylates, monomers of condensation polymers, ethylene, styrene, propylene, methyl methacrylate) to form polymers, such as but not limited to, poly(vinyl chloride) etc. The polymers may then be used as reinforcing materials in the compositions of the invention. In some embodiments, the unsaturated hydrocarbon may be added to the anode electrolyte where the acid formed in the anode electrolyte reacts with the unsaturated hydrocarbon to form chlorinated products. In some embodiments, the unsaturated hydrocarbon is treated with the acid outside the anode chamber to form the chlorinated products.

In some embodiments, the anode oxidizes metals to form metal chlorides in higher oxidation state which may be used to chlorinate the unsaturated or saturated hydrocarbons to form chlorinated hydrocarbons (not shown in figures). The chlorinated hydrocarbons may be used to form vinyl chloride monomer and then PVC. The cathode in such systems forms hydroxides which may be used to form absorbing solution for absorbing carbon dioxide gas to form the cementitious compositions of the invention. Such electrochemical systems and methods are described in more detail in commonly assigned application with application Ser. No. 13/474,598, filed May 17, 2012, which is incorporated by reference herein in its entirety.

In some embodiments, the carbon dioxide may be passed into the cathode electrolyte where the hydroxide dissolves the carbon dioxide to form carbonate/bicarbonate species. This cathode electrolyte containing the carbonate/bicarbonate species may be withdrawn from the cathode chamber and reacted with cations from the cation source to form the compositions of the invention. In some embodiments, the cathode electrolyte may be withdrawn and transferred to a contactor which is also connected to the source of carbon dioxide. The contactor containing the alkaline cathode electrolyte may then absorb the carbon dioxide to form carbonate/bicarbonate species in the solution. The carbonate/bicarbonate species containing solution may be contacted with the cations to form the compositions of the invention or the carbonate/bicarbonate species containing solution is recirculated back to the cathode chamber where the bicarbonate may be converted to the carbonate and the carbonate solution is withdrawn from the cathode chamber. Such electrochemical systems and methods are described in more detail in commonly assigned application with application Ser. No. 12/503,557, filed Jul. 15, 2009, which is incorporated by reference herein in its entirety.

Cation Source

The absorbing alkaline solution after being contacted with carbon dioxide may result in a $CO_2$ charged solution or $CO_2$ charged water containing carbonic acid, bicarbonate, carbonate, or combination thereof. The solution may be then treated with divalent cations from a source of cations to form carbonate/bicarbonates containing products such as but not limited to, calcium carbonate, calcium bicarbonate, magnesium carbonate, magnesium bicarbonate, or combination thereof.

In some embodiments, an order for the addition of the $CO_2$ or the $CO_2$ charged water and the divalent cation containing water to the reactor for the precipitation, may be varied. In some embodiments, the $CO_2$ gaseous stream or the solution containing the partially or fully dissolved $CO_2$ or the affluent from the absorber containing an alkaline solution of $CO_2$ is added to the reactor containing the divalent cation containing water for precipitation of the carbonate precipitate in the precipitation step 20 (illustrated in FIG. 1). In some embodiments, the divalent cation containing water is added to the reactor containing the $CO_2$ gaseous stream or the solution containing the partially or fully dissolved $CO_2$ or the affluent from the absorber containing an alkaline solution of $CO_2$ or the $CO_2$ charged water for precipitation of the carbonate precipitate in the precipitation step 20. In some embodiments, the divalent cation containing water is added to the reactor containing less than 20%, or less than 15%, or less than 10%, or less than 5% of the $CO_2$ gaseous stream or the solution containing the partially or fully dissolved $CO_2$ or the affluent from the absorber containing an alkaline solution of $CO_2$ for precipitation of the carbonate precipitate in the precipitation step 20.

The source of cations, such as sodium, potassium, or divalent cation etc., is any aqueous medium containing alkaline earth metals, such as, but are not limited to, calcium, magnesium, strontium, barium, etc. or combination thereof. The "divalent cation" and "alkaline earth metal ion" are used interchangeably herein. In some embodiments, the divalent cation is calcium, magnesium, or combination thereof and the source of divalent cation is any aqueous medium containing calcium, magnesium or combination thereof. In some embodiments, the divalent cation source is also the source of water and/or source of alkalinity, as described herein. For example, the aqueous solution of divalent cations may comprise cations derived from freshwater, brackish water, seawater, or brine (e.g., naturally occurring subterranean brines or anthropogenic subterranean brines such as geothermal plant wastewaters, desalination plant waste waters), as well as other salines having a salinity that is greater than that of freshwater, any of which may be naturally occurring or anthropogenic.

In some embodiments, the divalent cations such as, alkaline earth-metal containing water may be a hydrated lime or carbide lime which is contacted with a solution charged with the partially or fully dissolved $CO_2$, which $CO_2$ solution is then subjected to one or more carbonate compound precipitation conditions. In such embodiments, the hydrated lime or the carbide lime also provides proton removing agents or alkalinity sufficient to precipitate calcium and/or magnesium carbonates. In some embodiments, the alkalinity of the carbide lime may be supplemented with other proton removing agents, such as, hydroxides. Such use of carbide lime in sequestering $CO_2$ to form carbonate compositions is being described in U.S. Provisional Application No. 61/617,243, filed Mar. 29, 2012, titled "Methods and systems for utilizing carbide lime," which is incorporated herein by reference in its entirety.

In some embodiments, the divalent cations such as, alkaline earth-metal containing water may be gypsum solution which may be contacted with a solution charged with the partially or fully dissolved $CO_2$, which $CO_2$ solution is then subjected to one or more carbonate compound precipitation conditions. Such use of gypsum as a source of calcium to form carbonate compositions is being described in U.S. application Ser. No. 13/566,213, filed Aug. 3, 2012, which is incorporated herein by reference in its entirety.

Divalent cations (e.g., alkaline earth metal cations such as $Ca^{2+}$ and $Mg^{2+}$), which are useful for producing composition comprising carbonate, may be found in industrial wastes, seawater, brines, hard water, minerals, and many other suitable sources. In some embodiments, the commercially available divalent cations, such as, but not limited to, calcium chloride dissolved in water, may be used as the divalent cation solution for the precipitation of the composition.

In some locations, industrial waste streamsfrom various industrial processes provide for convenient sources of cations (as well as in some cases other materials useful in the process, e.g., metal hydroxide). Such waste streams include, but are not limited to, mining wastes; fossil fuel burning ash (e.g., fly ash, bottom ash, boiler slag); slag (e.g., iron slag, phosphorous slag); cement kiln waste (e.g., cement kiln dust); oil refinery/petrochemical refinery waste (e.g., oil field and methane seam brines); coal seam wastes (e.g., gas production brines and coal seam brine); paper processing waste; water softening waste brine (e.g., ion exchange effluent); silicon processing wastes; agricultural waste; metal finishing waste; high pH textile waste; and caustic sludge. In some embodiments, an aqueous solution of divalent cations may be obtained from an industrial plant that is also providing a waste gas stream (e.g., combustion gas stream). For example, in water-cooled industrial plants, such as seawater-cooled industrial plants, water that has been used by an industrial plant for cooling may then be used as water for producing precipitation material. If desired, the water may be cooled prior to entering a precipitation system of the invention. Such approaches may be employed, for example, with once-through cooling systems. For example, a city or agricultural water supply may be employed as a once-through cooling system for an industrial plant. Water from the industrial plant may then be employed for producing precipitation material, wherein output water has a reduced hardness and greater purity.

In some locations, a convenient source of cations for use in systems and methods of the invention is water (e.g., an aqueous solution including cations such as seawater or subterranean brine), which may vary depending upon the particular location at which the invention is practiced. Suitable aqueous solutions of cations that may be used include solutions including one or more divalent cations, e.g., alkaline earth metal cations such as $Ca^{2+}$ and $Mg^{2+}$. In some embodiments, the aqueous source of cations comprises alkaline earth metal cations. In some embodiments, the alkaline earth metal cations include calcium, magnesium, or a mixture thereof. In some embodiments, the aqueous solution of cations comprises calcium in amounts ranging from 50 to 50,000 ppm, 50 to 40,000 ppm, 50 to 20,000 ppm, 100 to 10,000 ppm, 200 to 5000 ppm, or 400 to 1000 ppm, or 10,000 to 50,000 ppm, or 20,000 to 50,000 ppm, or 20,000 to 30,000 ppm.

In some embodiments, mineral rich freshwater may be a convenient source of cations (e.g., cations of alkaline earth metals such as $Ca^{2+}$ and $Mg^{2+}$). Any number of suitable freshwater sources may be used, including freshwater sources ranging from sources relatively free of minerals to sources relatively rich in minerals. Mineral-rich freshwater sources may be naturally occurring, including any number of hard water sources, lakes, or inland seas. Some mineral-rich freshwater sources such as alkaline lakes or inland seas (e.g., Lake Van in Turkey) also provide a source of pH-modifying agents. Mineral-rich freshwater sources may also be anthropogenic. For example, a mineral-poor (soft) water may be contacted with a source of cations such as alkaline earth metal cations (e.g., $Ca^{2+}$, $Mg^{2+}$, etc.) to produce a mineral-rich water that is suitable for methods and systems described herein. Cations or precursors thereof (e.g., salts, minerals) may be added to freshwater (or any other type of water described herein) using any convenient protocol (e.g., addition of solids, suspensions, or solutions). In some embodiments, divalent cations selected from $Ca^{2+}$ and $Mg^{2+}$ are added to freshwater. In some embodiments, freshwater including $Ca^{2+}$ is combined with magnesium silicates (e.g., olivine or serpentine), or products or processed forms thereof, yielding a solution including calcium and magnesium cations.

The aqueous solution of divalent cations may comprise divalent cations derived from freshwater, brackish water, seawater, or brine (e.g., naturally occurring brines or anthropogenic brines such as geothermal plant wastewaters, desalination plant waste waters), as well as other aqueous solutions having a salinity that is greater than that of freshwater, any of which may be naturally occurring or anthropogenic. Freshwater may be considered to have a salinity of less than 0.5 ppt (parts per thousand). Brackish water may comprise more salt than freshwater, but not as much as salt as seawater. Brackish water may be considered to have a salinity ranging from about 0.5 to about 35 ppt. Seawater may be water from a sea, an ocean, or any other body of water that has a salinity ranging from about 35 to about 50 ppt. Brine may have a salinity that is about 50 ppt or greater. As such, brine may be water saturated or nearly saturated with salt. In some embodiments, the water source from which divalent cations are derived is a mineral rich (e.g., calcium-rich and/or magnesium-rich) freshwater source. In some embodiments, the water source from which divalent cations are derived is a naturally occurring saltwater source selected from a sea, an ocean, a lake, a swamp, an estuary, a lagoon, a surface brine, a deep brine, an alkaline lake, an inland sea, or the like. In some embodiments, the water source from which divalent cations are derived is a surface brine. In some embodiments, the water source from which divalent cations are derived is a subsurface brine. In some embodiments, the water source from which divalent cations are derived is a deep brine. In some embodiments, the water source from which divalent cations are derived is a Ca—Mg—Na—(K)—Cl; Na—(Ca)—$SO_4$—Cl; Mg—Na—(Ca)—$SO_4$—Cl; Na—$CO_3$—Cl; or Na—$CO_3$—$SO_4$—Cl brine. In some embodiments, the water source from which divalent cation are derived is an anthropogenic brine selected from a geothermal plant wastewater or a desalination wastewater.

Many minerals provide sources of cations and, in addition, some minerals are sources of base. Divalent cation-containing minerals include mafic and ultramafic minerals such as olivine, serpentine, and other suitable minerals, which may be dissolved using any convenient protocol. In one embodiment, cations such as calcium may be provided for methods and compositions of this invention from feldspars such as anorthite. Cations may be obtained directly from mineral sources or from subterranean brines, high in calcium or other divalent cations. Other minerals such as wollastonite may also be used. Dissolution may be accelerated by increasing surface area, such as by milling by conventional means or by, for example, jet milling, as well as by use of, for example, ultrasonic techniques. In addition, mineral dissolution may be accelerated by exposure to acid or base.

Metal silicates (e.g., magnesium silicates) and other minerals including cations of interest may be dissolved, for example, in acid such as HCl (optionally from an electrochemical process) to produce, for example, magnesium and other metal cations for use in compositions of the invention. In some embodiments, magnesium silicates and other minerals may be digested or dissolved in an aqueous solution that has become acidic due to the addition of carbon dioxide and other components of waste gas (e.g., combustion gas). Alternatively, other metal species such as metal hydroxide (e.g., $Mg(OH)_2$, $Ca(OH)_2$) may be made available for use by dissolution of one or more metal silicates (e.g., olivine and serpentine) with aqueous alkali hydroxide (e.g., NaOH) or any other suitable caustic material. Any suitable concentration of aqueous alkali hydroxide or other caustic material may be used to decompose metal silicates, including highly concentrated and very dilute solutions. The concentration (by weight) of an alkali hydroxide (e.g., NaOH) in solution may be, for example, from 30% to 80% (w/w).

Precipitation Conditions

In some embodiments, the methods described herein include contacting the carbon dioxide charged water with the divalent cations under precipitation conditions that favor the formation of the composition comprising calcium carbonate where between 50-100 wt % of the calcium carbonate is in a metastable polymorphic form comprising vaterite. In some embodiments, the precipitation conditions favor the formation of more than 50 wt % vaterite or between 50-100 wt % vaterite or between 50-99 wt % vaterite in the cementitious composition. Accordingly, there are provided methods for forming a cementitious or concrete composition, by a) making a composition comprising calcium carbonate by contacting an industrial waste gas stream comprising carbon dioxide with a proton removing agent to form a carbon dioxide charged water; b) contacting the carbon dioxide charged water with divalent cations under one or more precipitation conditions that favor the formation of the composition comprising calcium carbonate where between 50-100 wt % of the calcium carbonate is in a metastable polymorphic form comprising vaterite, and wherein the calcium carbonate has a $\delta^{13}C$ value of between −12 to −30‰; c) mixing between 10-55 wt % of a composition comprising calcium carbonate with between 45-90 wt % of aggregate, to form a cementitious or concrete composition; and d) contacting the cementitious composition with water when the cementitious composition sets and hardens into cement with a compressive strength of at least 2000 psi where the calcium carbonate binds to the aggregate.

In some embodiments, the one or more precipitation conditions include, but not limited to, temperature, pH, residence time, proton removing agent, additive, ion ratio, rate of precipitation, mixing rate, form of agitation, presence of seed crystal, catalyst, membrane, or substrate, separation, drying, refining, or combinations thereof. Accordingly, there are provided methods for forming a cementitious or concrete composition, by a) making a calcium composition comprising carbonate by contacting an industrial waste gas stream comprising carbon dioxide with a proton removing agent to form a carbon dioxide charged water; b) contacting the carbon dioxide charged water with divalent cations under one or more precipitation conditions that favor the formation of the composition comprising calcium carbonate where between 50-100 wt % of the calcium carbonate is in a metastable polymorphic form comprising vaterite, and wherein the calcium carbonate has a $\delta^{13}C$ value of between −12 to −30‰, wherein the one or more precipitation conditions include, but not limited to, temperature, pH, residence time, proton removing agent, additive, ion ratio, rate of precipitation, mixing rate, form of agitation, presence of seed crystal, catalyst, membrane, or substrate, separation, drying, refining, or combination thereof; c) mixing between 10-55 wt % of a composition comprising calcium carbonate with between 45-90 wt % of aggregate, to form a cementitious or concrete composition; and d) contacting the cementitious composition with water when the cementitious composition sets and hardens into cement with a compressive strength of at least 2000 psi where the calcium carbonate binds to the aggregate. In some of the foregoing embodiments, the precipitation conditions favor the formation of more than 50 wt % vaterite or between 50-99 wt % vaterite in the cementitious composition. In some of the foregoing embodiments, the cement is formed with a porosity of between 10-90 vol %, or between 10-50 vol %.

Some of the precipitation conditions are described in commonly assigned U.S. Pat. Nos. 7,735,274, and 8,062,418, both of which are incorporated herein by reference in their entirety.

At precipitation step 20 (FIG. 1), carbonate compounds, which may be amorphous or crystalline, are precipitated. Precipitation conditions include those that change the physical environment of the water to produce the desired precipitate product. In some embodiments, the precipitation conditions include temperature of the aqueous solution, including adjustment the solution temperature to between 0° C. and 100° C., such as between 5° C. and 90° C., such as between 10° and 80° C., such as between 20° C. and 60° C., such as between 20° C. and 50° C.

The residence time of the precipitate in the reactor before the precipitate is removed from the solution, may vary. In some embodiments, the residence time of the precipitate in the solution is more than 5 seconds, or between 5 seconds-1 hour, or between 5 seconds-1 minute, or between 5 seconds to 20 seconds, or between 5 seconds to 30 seconds, or between 5 seconds to 40 seconds. Without being limited by any theory, it is contemplated that the residence time of the precipitate may affect the size of the particle. For example, a shorter residence time may give smaller size particles or more disperse particles whereas longer residence time may give agglomerated or larger size particles. In some embodiments, the residence time in the process of the invention may be used to make small size as well as large size particles in a single or multiple batches which may be separated or may remain mixed for later steps of the process. In some embodiments, the finely disperse particles may be processed further to give the composition of the invention. In some embodiments, the large or agglomerated particles may be processed to give the composition comprising carbonate.

While the pH of the water may range from 7 to 14 during a given precipitation process, in certain embodiments the pH is raised to alkaline levels in order to drive the precipitation of carbonate compound as desired. In some embodiments, the pH is raised to a level which minimizes if not eliminates $CO_2$ gas generation during precipitation. In these embodiments, the pH may be raised to 10 or higher, such as 11 or higher. In some embodiments, the one or more conditions or the precipitation conditions include contacting the saltwater or the divalent cation containing water with a proton removing agent. The proton removing agent may be any proton removing agent, as described herein, for example, but not limited to, oxide, hydroxide, such as sodium hydroxide, carbonate, coal ash, naturally occurring mineral, and combination thereof. In some embodiments, the one or more conditions or the precipitation conditions include contacting the saltwater or the divalent cation containing water to electrochemical conditions. Such electrochemical conditions have been described herein.

The nature of the precipitate may be affected by the pH of the precipitation process. In some embodiments, high pH may lead to rapid precipitation and agglomeration of the particles whereas lower pH or slow raise in the pH may lead to finer particles. Additives other than pH elevating agents may also be introduced into the water in order to influence the nature of the precipitate that is produced. As such, certain embodiments of the methods include providing an additive in water before or during the time when the water is subjected to the precipitation conditions. Certain calcium carbonate polymorphs can be favored by trace amounts of certain additives. For example, vaterite, an unstable or metastable polymorph of $CaCO_3$ which precipitates in a variety of different morphologies and converts rapidly to calcite, can be obtained at very high yields by including trace amounts of lanthanum as lanthanum chloride in a supersaturated solution of calcium carbonate. Other additives beside lanthanum that are of interest include, but are not limited to transition metals and the like.

The nature of the precipitate (such as the formation of vaterite) can also be influenced by selection of appropriate major ion ratios. Major ion ratios also have influence of polymorph formation. For example, as the magnesium:calcium ratio in the water increases, aragonite may become the favored polymorph of calcium carbonate over low-magnesium calcite. At low magnesium:calcium ratios, low-magnesium calcite is the preferred polymorph. As such, a wide range of magnesium:calcium ratios can be employed, including, e.g., 100/1, 50/1, 20/1, 10/1, 5/1, 2/1, 1/1, 1/2, 1/5, 1/10, 1/20, 1/50, 1/100. In certain embodiments, the magnesium:calcium ratio is determined by the source of water employed in the precipitation process (e.g., seawater, brine, brackish water, fresh water), whereas in other embodiments, the magnesium:calcium ratio is adjusted to fall within a certain range.

Rate of precipitation may also have an effect on compound phase formation. The most rapid precipitation can be achieved by seeding the solution with a desired phase. Without seeding, rapid precipitation can be achieved by rapidly increasing the pH of the water, which results in more amorphous constituents. When silica is present, the more rapid the reaction rate, the more silica is incorporated with the carbonate precipitate. The higher the pH is, the more rapid the precipitation is and the more amorphous the precipitate is.

Accordingly, a set of precipitation conditions to produce a desired precipitate from a water include, in certain embodiments, the water's temperature and pH, and in some instances the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate compound precipitates according to the invention may be batch or continuous protocols. It will be appreciated that precipitation conditions may be different to produce a given precipitate in a continuous, flow system compared to a batch system.

$CO_2$ charging and carbonate compound precipitation may occur in a continuous process or at separate steps. As such, charging and precipitation may occur in the same reactor of a system, e.g., as illustrated in FIG. 1 at step 20, according to certain embodiments of the invention. In yet other embodiments of the invention, these two steps may occur in separate reactors, such that the water is first charged with $CO_2$ in a charging reactor and the resultant $CO_2$ charged water is then subjected to precipitation conditions in a separate reactor.

In certain embodiments, the methods further include contacting the volume of water that is subjected to the mineral precipitation conditions with $CO_2$. Contact of the water with the $CO_2$ may occur before and/or during the time when the water is subjected to $CO_2$ precipitation conditions. Accordingly, embodiments of the invention include methods in which the volume of water is contacted with $CO_2$ prior to subjecting the volume of salt water to mineral precipitation conditions. Embodiments of the invention include methods in which the volume of salt water is contacted with the $CO_2$ while the volume of salt water is being subjected to carbonate compound precipitation conditions. Embodiments of the invention include methods in which the volume of water is contacted with the $CO_2$ both prior to subjecting the volume of salt water to carbonate compound precipitation conditions and while the volume of salt water is being subjected to carbonate compound precipitation conditions. In some embodiments, the same water may be cycled more than once, wherein a first cycle of precipitation removes primarily calcium carbonate and magnesium carbonate minerals, and leaves remaining alkaline water to which other divalent cations may be added, that can have more carbon dioxide cycled through it, precipitating more carbonate compounds.

The above described processes result in the production of a slurry of a calcium carbonate containing precipitate and a mother liquor. Where desired, the compositions made up of the precipitate and the mother liquor may be stored for a period of time following precipitation and prior to further processing. For example, the composition may be stored for a period of time ranging from 1 to 1000 days or longer, such as 1 to 10 days or longer, at a temperature ranging from 1 to 40° C., such as 20 to 25° C.

Following production of the calcium carbonate precipitate from the water, the resultant precipitated carbonate compound composition is separated from the mother liquor to produce separated calcium carbonate compound precipitate product, as illustrated at step 40 of FIG. 1. The slurry components are separated. Embodiments may include treatment of the mother liquor, where the mother liquor may or may not be present in the same composition as the product. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ is carried out in a manner sufficient to reduce the pH to a range between 5 and 9, e.g., 6 and 8.5, including 7.5 to 8.2. In certain embodiments, the treated brine may be contacted with the $CO_2$, e.g., as described above, to sequester further $CO_2$. For example, where the mother liquor is to be returned to the ocean, the mother liquor may be contacted with the $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2.

The resultant mother liquor of the reaction may be disposed of using any convenient protocol. In certain embodiments, it may be sent to a tailings pond for disposal 42. In certain embodiments, it may be disposed of in a naturally occurring body of water, e.g., ocean, sea, lake or river. In certain embodiments, the mother liquor is returned to the source of feedwater for the methods of invention, e.g., an ocean or sea. Alternatively, the mother liquor may be further processed, e.g., subjected to desalination protocols, as described further in U.S. application Ser. No. 12/163,205, filed Jun. 27, 2008; the disclosure of which is herein incorporated by reference.

In certain embodiments, following production of the carbonate precipitate, the resultant product is separated from the mother liquor to produce separated calcium carbonate composition. Separation of the product can be achieved using any convenient approach, including a mechanical approach, e.g., where bulk excess water is drained from the product, e.g., either by gravity alone or with the addition of vacuum, mechanical pressing, by filtering the product from the mother liquor to produce a filtrate, etc. Separation of bulk water produces, in certain embodiments, a wet, dewatered precipitate. Dewatered precipitation material may comprise at least 10%, 40%, 50%, 75%, or 90% (w/w) or (w/v) solids (e.g. calcium carbonates, bicarbonates, or a combination of carbonates and bicarbonates). For example, in some embodiments a concentrated composition of precipitation material or the concentrated composition containing calcium carbonate may comprise at least 20% solids and less than 90% solids, at least 25% solids and less than 90% solids, or at least 30% solids and less than 90% solids. Process water (i.e., water used for processing $CO_2$ to produce precipitation material comprising carbonates, bicarbonates, or a mixture of carbonates and bicarbonates) may be partially removed such that the remainder of water in a slurry comprising precipitation material may be used as mix water (e.g., admixture solution) for pastes, mortars, and/or concrete compositions described herein. As such, a slurry comprising precipitation material (e.g., carbonates, bicarbonates, or a mixture of carbonates or bicarbonates) may be dewatered such that the water:precipitation material is less than 0.7, 0.6, 0.5, 0.4, 0.3, 0.2, or 0.1. For example, in some embodiments, a slurry comprising precipitation material (e.g., carbonates, bicarbonates, or a mixture of carbonates or bicarbonates) may be dewatered such that the water:precipitation material is less than 0.6 and more than 0.1, less than 0.5 and more than 0.2, or less than 0.4 and more than 0.2.

The resultant dewatered precipitate (may be used directly as the composition comprising carbonate) is then dried to produce the composition comprising calcium carbonate, as illustrated at step 60 of FIG. 1. Drying can be achieved by air drying the filtrate. Where the filtrate is air dried, air drying may be at room or elevated temperature. In yet another embodiment, the precipitate is spray dried to dry the precipitate, where the liquid containing the precipitate is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc.

Where the dewatered precipitation material is air dried, air drying may be at room or elevated temperature. Elevated temperatures, in some embodiments, may be greater than room temperature, such as greater than 20° C., 30° C., 40° C., 50° C., 60° C., 70° C., 80° C., 90° C., 100° C., 110° C., 120° C., 150° C., 200° C., or 250° C. For example, in some embodiments, precipitation material may be dried at greater than 25° C. and less than 100° C., greater than 35° C. and less than 90° C., greater than 35° C. and less than 90° C., greater than 50° C. and less than 90° C., and greater than 60° C. and less than 85° C.

Elevated temperatures may be attained in any conventional manner or apparatus commonly used for drying. In some embodiments, for example, a conventional apparatus that may be used for drying precipitation material is an oven. In some embodiments, dewatered precipitation material may be spray dried to dry the precipitation material, wherein a slurry comprising the precipitation material may be dried by feeding it through a hot gas (such as the gaseous waste stream from the power plant). For example, the slurry feed may be pumped through an atomizer into a main drying chamber and a hot gas may be passed as a co-current or counter-current to the atomizer direction. In some embodiments, dewatered precipitation material is dried using a swirl fluidizer. Precipitation material that has been dried (e.g., spray dried; dried by swirl fluidizer) may be more than 80%, 85%, 90%, 95%, 99%, or 99.9% (w/w) or (w/v) solids. For example, in some embodiments, precipitation material that has been dried may be more than 80% and less than 99.9% solids, more than 85% and less than 99.9% solids, or more than 95% and less than 99.9% solids.

Where desired, the dewatered precipitate product from the separation reactor 40 may be washed before drying, as illustrated at optional step 50 of FIG. 1. The precipitate may be washed with freshwater, e.g., to remove salts (such as NaCl) from the dewatered precipitate. Used wash water may be disposed of as convenient, e.g., by disposing of it in a tailings pond, etc.

At step 70, the dried precipitate (may be used directly as the composition comprising carbonate) may be refined, e.g., to provide for desired physical characteristics, such as particle size, surface area, etc., or to add one or more components to the precipitate, to produce the composition comprising calcium carbonate 80. In certain embodiments, the precipitate product is refined (i.e., processed) in some manner prior to subsequent use. Refinement may include a variety of different protocols. In certain embodiments, the product is subjected to mechanical refinement, e.g., grinding, in order to obtain a product with desired physical properties, e.g., particle size, etc.

In some embodiments, the particles with different morphologies, such as fine or agglomerated, and/or the particles with different sizes (blends) may be mixed to make the composition comprising carbonate. For example, the composition comprising carbonate may include a mix of fine disperse particles with larger agglomerated particles or the composition comprising carbonate may include a mix of particles with different sizes, e.g., particles with sizes ranging between 0.1 micron to 100 micron. In some embodiments, the composition comprising carbonate may be modulated by mixing the particles with different particle size, surface area, zeta potential, and/or morphologies.

The vaterite containing carbonate composition may be optionally activated by refining, milling, aging, and/or curing, e.g., to provide for desired physical characteristics, such as activation, particle size, surface area, zeta potential, etc. The vaterite containing carbonate composition may also be activated by adding an aragonite seed, inorganic additive or organic additive. Further, one or more components may be added to the composition, such as the aggregate, e.g. sand and/or rocks etc., to produce the cementitious composition of the invention 90. In some embodiments, the product may be subjected to mechanical refinement in order to obtain a product with desired physical properties (e.g., particle size, etc.). Grinding the precipitation material may be effected by any conventional grinder, including, but not limited to a ball mill; a rod mill, an autogenous mill, a semi-autogenous grinding (SAG) mill, a pebble mill, a high pressure grinding roll, a buhrstone mill, a vertical shaft impactor mill (VSI mill), a tower mill, and a vibratory mill. The mean particle size of particles in precipitation material described herein may be at least 0.1, 0.05, 1, 5, 10, 15, 20, 25, 30, 35, 40, 45, 50, 75, 100, 150, 200, 250, 300, 350, 400, 450, 500, 600, 700, 800, 900, or 1000 microns. Combinations of the foregoing ranges (e.g., at least 0.1 microns and less than 100 microns; at least 1 micron and less than 100 microns; at least 1 micron and less than 50 microns; at least 10 microns and less than 40 microns; etc.) may also be used to describe the mean particle size of precipitation material.

In some embodiments, the product may be utilized to produce aggregates (as illustrated in FIG. 1). The resultant precipitation material may be prepared as an aggregate, with or without drying the powders. For example, as noted herein, the precipitation material may be combined with fresh water in a manner sufficient to cause the precipitation material to set and harden and form a solid product, where the metastable carbonate compounds present in the precipitation material have converted to a form that is stable in fresh water. The cement thus formed may be chopped to form the aggregate. This aggregate (or aggregate from other sources) may be mixed with the composition containing calcium carbonate to form the cementitious compostion of the invention.

By controlling the water content of the wet material, the porosity, and eventual strength and density of the final aggregate may be controlled. Typically a wet cake may be 40-60 volume % water. For denser aggregates, the wet cake may be <50% water, for less dense cakes, the wet cake may be >50% water. After hardening, the resultant solid product may then be mechanically processed, e.g., crushed or otherwise broken up and sorted to produce aggregate of the desired characteristics, e.g., size, particular shape, etc. In these processes, the setting and mechanical processing steps may be performed in a substantially continuous fashion or at separate times. In certain embodiments, large volumes of precipitation material may be stored in the open environment where the precipitation material is exposed to the atmosphere. For the setting step, the precipitation material may be irrigated in a convenient fashion with fresh water, or allowed to be rained on naturally or order to produce the set product. The set product may then be mechanically processed as described above. Following production of the precipitation material, the precipitation material may be processed to produce the desired aggregate. In some embodiments, the precipitation material may be mechanically spread in a uniform manner using a belt conveyor and highway grader onto a compacted earth surface to a depth of interest, e.g., up to twelve inches, such as 1 to 12 inches, including 6 to 12 inches. The spread material may then be irrigated with fresh water at a convenient rate, e.g., of one/half gallon of water per cubic foot of precipitation material. The material may then be compacted using multiple passes with a steel roller, such as those used in compacting asphalt. The surface may be re-irrigated on a weekly basis until the material exhibits the desired chemical and mechanical properties, at which point the material may be mechanically processed into aggregate by crushing.

In an example of an additional embodiment, the calcium carbonate compound precipitation material, once separated from the mother liquor, may be washed with fresh water, then placed into a filter press to produce a filter cake with 30-60% solids. This filter cake may then be mechanically pressed in a mold, using any convenient means, e.g., a hydraulic press, at adequate pressures, e.g.; ranging from 5 to 1000 psi, such as 1 to 200 psi, to produce a formed solid, e.g., a rectangular brick. These resultant solids may then be cured, e.g., by placing outside and storing, by placing in a chamber within which they are subjected to high levels of humidity and heat, etc. These resultant cured solids may then be used as building materials themselves or crushed to produce aggregate. Such aggregates, methods for their manufacture and use are further described in co-pending U.S. Patent Application No. 61/056, 972, filed on May 29, 2008, the disclosure of which is incorporated herein by reference.

Vaterite to Aragonite Transformation

The cementitious compositions of the invention comprising the composition comprising calcium carbonate and the aggregate may be contacted with water when the cementitious compositions sets and hardens to form cement. In some embodiments, when the cementitious composition sets and hardens to form cement, vaterite transforms to aragonite and binds with the aggregate to give high compressive strength. In some embodiments, the cementitious composition of the invention after mixing in the water is poured into the molds designed to make one or more of the pre-formed building material. The composition is then allowed to set and harden into the pre-formed or pre-cast material.

The amorphous calcium carbonate (ACC) and/or vaterite present in the composition comprising carbonate when comes into contact with water, may precipitate and transform into one or more of its stable phases (aragonite and/or calcite). Accordingly, in some embodiments, after contacting the cementitious or the concrete composition with water, the vaterite converts to aragonite and the composition sets and hardens into cement.

Figure 4:
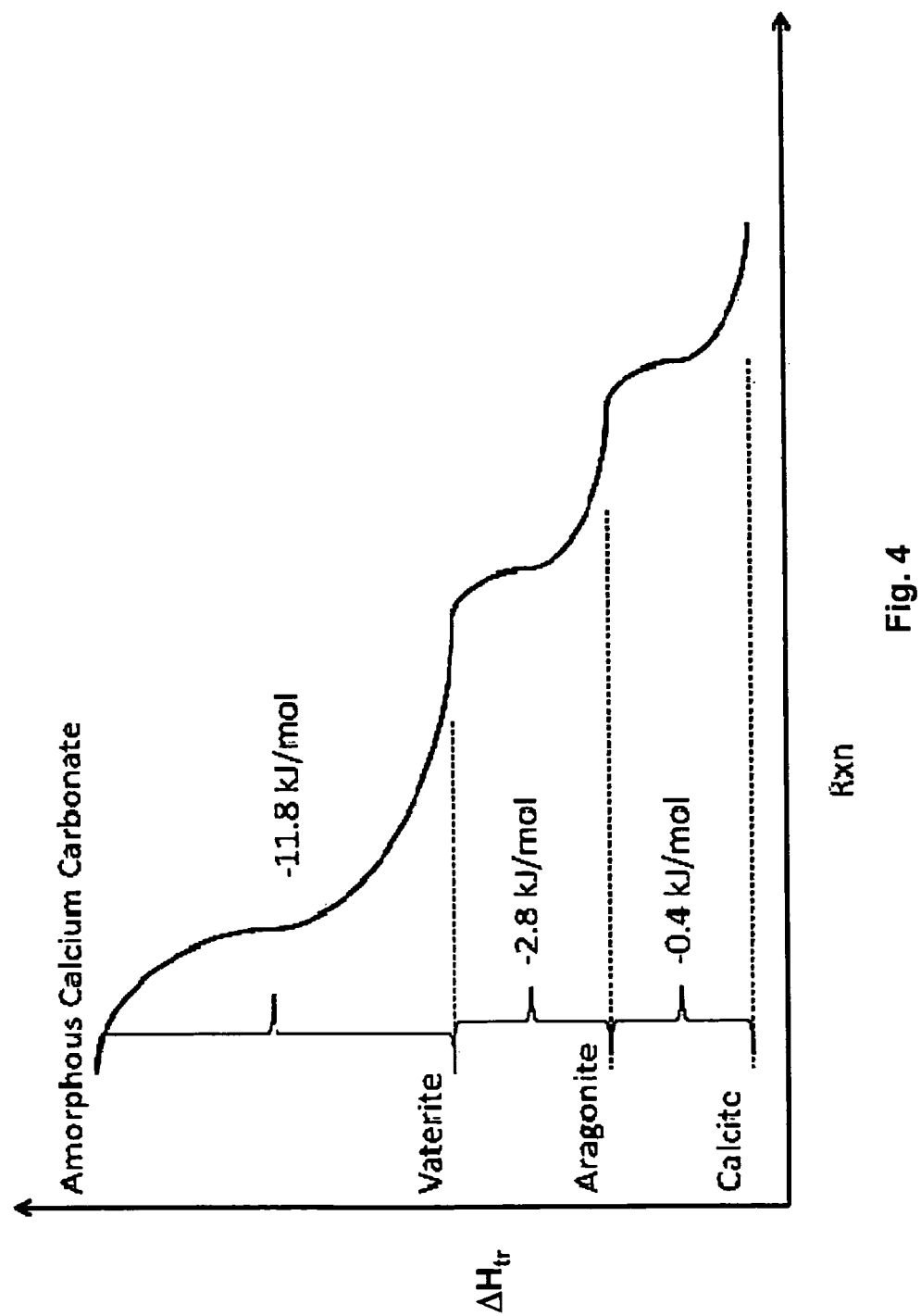
FIG. 4 illustrates a Gibbs free energy diagram of the transition from vaterite to aragonite.

A thermodynamic driving force may exist for the transformation from unstable phases, such as vaterite, to more stable phases, such as aragonite or calcite (for self-cement composition) as described by Ostwald in his Step Rule (Ostwald, W. *Zeitschrifi fur Physikalische Chemie* 289 (1897)). Calcium carbonate phases may transform in the order: ACC to vaterite, aragonite, and calcite where intermediate phases may or may not be present. For instance, ACC can transform to vaterite and may not transform to aragonite or calcite; or ACC can transform to vaterite and then directly to calcite, skipping the aragonite form; or alternatively, ACC can transform to vaterite and then to aragonite without transforming to calcite. In some embodiments, the vaterite containing compositions transform to aragonite after dissolution and reprecipitation. During this transformation, excesses of energy are released, as exhibited by FIG. 4. This intrinsic energy may be harnessed to create a strong aggregation tendency and surface interactions that may lead to agglomeration and cementing. It is to be understood that the values reported in FIG. 4 are well known in the art and may vary.

The transformation between calcium carbonate polymorphs may occur via solid-state transition or may be solution mediated. In some embodiments, the transformation is solution-mediated because it may require less energy than the thermally activated solid-state transition. The solution-mediated transformation is environmentally conscious and more applicable to a cementing application. Vaterite is metastable and the difference in thermodynamic stability of calcium carbonate polymorphs may be manifested as a difference in solubility, where the least stable phases are the most soluble (Ostwald, supra.). Therefore, vaterite may dissolve readily in solution and transform favorably towards a more stable polymorph: aragonite. The driving force for the formation of a particular calcium carbonate polymorph or combination of polymorphs is the change in Gibbs free energy from a supersaturated solution to equilibrium (Spanos & Koutsoukos *Journal of Crystal Growth* (1998) 191, 783-790).

In a polymorphic system like calcium carbonate, two kinetic processes may exist simultaneously in solution: dissolution of the metastable phase and growth of the stable phase (Kralj et al. *Journal of Crystal Growth* (1997) 177, 248-257). In some embodiments, the aragonite or calcite crystals may be growing while vaterite is undergoing dissolution in the aqueous medium.

In some embodiments, the composition of the invention, as prepared by the methods described herein, is treated with the aqueous medium under one or more suitable conditions. The compositions of the invention after combining with water set and harden into cement and may be also called settable compositions. Settable compositions may be produced by combining the concrete composition and water, either at the same time or by pre-combining a calcium carbonate composition with aggregate, and then combining the resultant dry components with water.

The aqueous medium includes, but is not limited to, fresh water optionally containing sodium chloride, calcium chloride, magnesium chloride, or combination thereof or aqueous medium may be brine. In some embodiments, aqueous medium is fresh water. In some embodiments, the one or more suitable conditions include, but are not limited to, temperature, pressure, time period for setting, a ratio of the aqueous medium to the composition, and combination thereof. The temperature may be related to the temperature of the aqueous medium. In some embodiments, the temperature is in a range of 0-110° C.; or 0-60° C.; or 0-40° C.; or 25-100° C.; or 25-50° C.; or 37-100° C.; or 37-60° C. In some embodiments, the pressure is atmospheric pressure or above atm. pressure. In some embodiments, the time period for setting the cement product is 30 min. to 48 hrs; or 30 min. to 24 hrs; or 30 min. to 12 hrs; or 30 min. to 8 hrs; or 30 min. to 4 hrs; or 30 min. to 2 hrs; 2 to 48 hrs; or 2 to 24 hrs; or 2 to 12 hrs; or 2 to 8 hrs; or 2 to 4 hrs; 5 to 48 hrs; or 5 to 24 hrs; or 5 to 12 hrs; or 5 to 8 hrs; or 5 to 4 hrs; or 5 to 2 hrs; 10 to 48 hrs; or 10 to 24 hrs; or 24 to 48 hrs.

In some embodiments, the ratio of the aqueous medium to the dry components or to the composition (aqueous medium: dry components or aqueous medium:composition) is 0.1-10; or 0.1-8; or 0.1-6; or 0.1-4; or 0.1-2; or 0.1-1; or 0.2-10; or 0.2-8; or 0.2-6; or 0.2-4; or 0.2-2; or 0.2-1; or 0.3-10; or 0.3-8; or 0.3-6; or 0.3-4; or 0.3-2; or 0.3-1; or 0.4-10; or 0.4-8; or 0.4-6; or 0.4-4; or 0.4-2; or 0.4-1; or 0.5-10; or 0.5-8; or 0.5-6; or 0.5-4; or 0.5-2; or 0.5-1; or 0.6-10; or 0.6-8; or 0.6-6; or 0.6-4; or 0.6-2; or 0.6-1; or 0.8-10; or 0.8-8; or 0.8-6; or 0.8-4; or 0.8-2; or 0.8-1; or 1-10; or 1-8; or 1-6; or 1-4; or 1-2; or 1:1; or 2:1; or 3:1.

In some embodiments, the composition may be rinsed with fresh water to remove halite or the chloride content from the composition. The chloride may be undesirable in some applications, for example, in aggregates intended for use in concrete since the chloride may have a tendency to corrode rebar. Further, the rinsing of the slurry or the composition with water may cause the vaterite in the composition to shift to more stable forms such as aragonite and result in the cemented material. For example, the cementing composition can be kept in the saltwater until before use and is rinsed with fresh water that may remove the halite from the composition and facilitate the formation of the cemented material.

In some embodiments, such rinsing may not be desirable as it may reduce the yield of the composition. In such embodiments, the precipitate may be washed with a solution having a low chloride concentration but high concentration of divalent cations (such as, calcium, magnesium, etc.). Such high concentration of the divalent ion may prevent the dissolution of the composition, thereby reducing the yield loss and the conversion to cemented material.

During the mixing of the composition with the aqueous medium, the composition may be subjected to high shear mixer. After mixing, the composition may be dewatered again and placed in pre-formed molds to make formed building materials. Alternatively, the composition may be mixed with water and is allowed to set. The composition sets over a period of days and is then placed in the oven for drying, e.g., at 40° C., or from 40° C.-60° C., or from 40° C.-50° C., or from 40° C.-100° C., or from 50° C.-60° C., or from 50° C.-80° C., or from 50° C.-100° C., or from 60° C.-80° C., or from 60° C.-100° C. The composition is then subjected to curing at high temperature, such as, from 50° C.-60° C., or from 50° C.-80° C., or from 50° C.-100° C., or from 60° C.-80° C., or from 60° C.-100° C., or 60° C., or 80° C.-100° C., in high humidity, such as, in 30%, or 40%, or 50%, or 60% humidity.

A benefit of the use of a precipitated calcium carbonate as clinker replacement is that it is generally more pure than mined limestone. In many instances, impurities in the limestone limit the use of that limestone to less than the full allowed amount, due to impurities which reduce the properties of the resultant Portland cement. In certain Portland cement plants, ability to use local mined limestone is limited to perhaps 2.0%. The utilization of a carbon-sequestering precipitated calcium carbonate at 5% would result in an improvement in carbon footprint reduction of 5.2%, from 2.0% to 7:2%.

The cement product produced by the methods described above may be an aggregate or building material or a pre-cast material or a formed building material. These materials have been described herein.

C. Systems

In some embodiments, the invention provides systems configured to perform the methods of the invention. In some embodiments, a system that includes a cement producing station that is configured to accept the calcium carbonate composition of the invention is provided. The cement producing station may be a mixing tank, pipe or a conduit. In some such embodiments, an aggregate source is provided which provides the aggregate to the system. In such embodiments, the system accepts calcium carbonate composition from the cement producing station and aggregate from the aggregate source and produces a cementitious composition suitable for structural building applications. In some embodiments, the cement producing station is configured to produce the composition comprising calcium carbonate using carbon dioxide from a carbon dioxide source, alkaline solution from an alkali source or proton removing agent source, and divalent cations from a divalent cation source. Such sources have been described herein. In some embodiments, the system further includes an alkali source operably connected to the cement producing station configured to electrochemically produce the alkaline solution.

Figure 5:
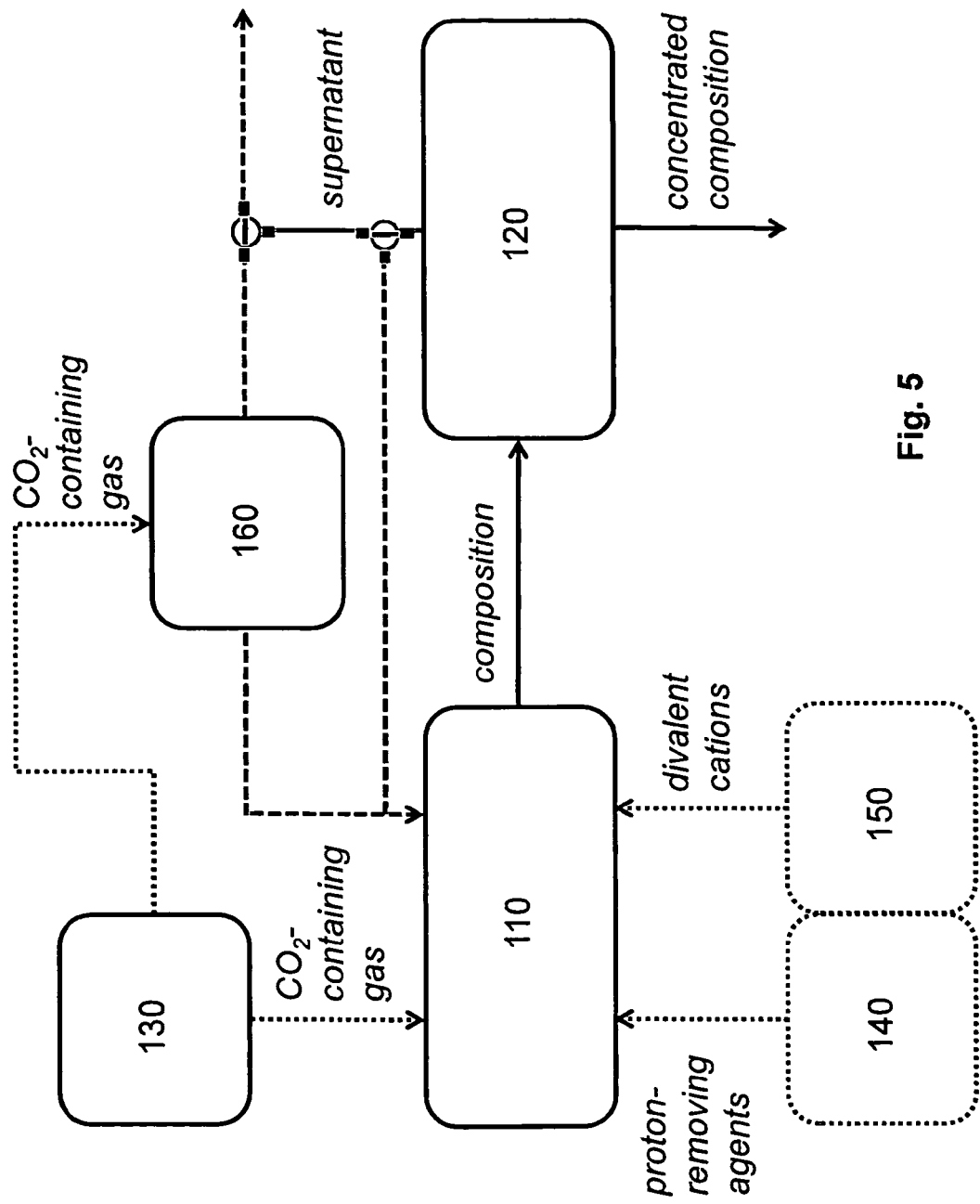
FIG. 5 illustrates a flow diagram for some embodiments provided herein.

In some embodiments, a system such as system illustrated in FIG. 5 is provided for processing carbon dioxide, wherein the system comprises a processor (110) and a treatment system (120) configured for an aqueous-based process for processing carbon dioxide from a source of carbon dioxide (130), using a source of proton-removing agents (140) and/or a source of divalent cations (150). The source of carbon dioxide optionally comprises one or more additional components to carbon dioxide. The system further comprises an electrochemical system (160), and the processor, the treatment system, and the electrochemical system may be operably connected for recirculating a portion of treatment system supernatant.

The processor of such carbon-dioxide processing systems may comprise a contactor such as a gas-liquid or a gas-liquid-solid contactor, wherein the contactor is configured for charging an aqueous solution or slurry with carbon dioxide to produce a carbon dioxide-charged composition, which composition may be a solution or slurry. In some embodiments, the contactor is configured to produce compositions from the carbon dioxide, such as from solvated or hydrated forms of carbon dioxide (e.g., carbonic acid, bicarbonates, carbonates), wherein the compositions comprise carbonates, bicarbonates, or carbonates and bicarbonates. In some embodiments, the processor may further comprise a reactor configured to produce compositions comprising carbonates, bicarbonates, or carbonates and bicarbonates from the carbon dioxide. In some embodiments, the processor may further comprise a settling tank configured for settling compositions comprising precipitation material comprising carbonates, bicarbonates, or carbonates and bicarbonates. The processor of carbon dioxide-processing systems of the invention may be configured to receive treatment system supernatant or an electrochemical system stream in the contactor (e.g., gas-liquid contactor, gas-liquid-solid contactor), the reactor, a combination of the contactor and the reactor, or in any other unit or combination of units in the processor.

The processor may further include any of a number of different components, including, but not limited to, temperature regulators (e.g., configured to heat the precipitation reaction mixture to a desired temperature); chemical additive components (e.g., for introducing chemical proton-removing agents such as hydroxides, metal oxides, or fly ash); electrochemical components (e.g., cathodes/anodes); components for mechanical agitation and/or physical stirring mechanisms; and components for recirculation of industrial plant flue gas through the precipitation plant. Processor may also contain components configured for monitoring one or more parameters including, but not limited to, internal reactor pressure, pH, precipitation material particle size, metal-ion concentration, conductivity, alkalinity, and $pCO_2$. Processor, in step with the entire precipitation plant, may operate as batch wise, semi-batch wise, or continuously.

Processor may further include an output conveyance for slurry comprising precipitation material or separated supernatant. In some embodiments, the output conveyance may be configured to transport the slurry or supernatant to a tailings pond for disposal or a naturally occurring body of water, e.g., ocean, sea, lake, or river. In other embodiments, systems may be configured to allow for the slurry or supernatant to be employed as a coolant for an industrial plant by a line running between the precipitation system and the industrial plant. In certain embodiments, the precipitation plant may be co-located with a desalination plant, such that output water from the precipitation plant is employed as input water for the desalination plant. The systems may include a conveyance (i.e., duct) where the output water (e.g., slurry or supernatant) may be directly pumped into the desalination plant.

The treatment system of such carbon dioxide-processing systems may comprise a dewatering system and/or a filtration system and/or drying system. As such, the dewatering system, the filtration system, or a combination of the dewatering system and the filtration system may be configured to provide at least a portion of supernatant to the processor for processing carbon dioxide, to the electrochemical system, or both. Though not shown, the treatment system may also be configured to provide at least a portion of supernatant to a washing system configured to wash compositions of the invention, wherein the compositions comprise precipitation material (e.g., $CaCO_3$, $MgCO_3$, or combinations thereof). In some embodiments, the carbon dioxide-processing system may be configured to provide at least a portion of the supernatant to a system (e.g., desalination plant) or process (e.g., desalination) external to the carbon-dioxide processing system. For example, a system of the invention may be operably connected to a desalination plant such that the system provides at least a portion of treatment system supernatant to the desalination plant for desalination.

The processor-produced composition may be provided to any of a number of treatment system sub-systems, which sub-systems include, but are not limited to, dewatering systems, filtration systems, or dewatering systems in combination with filtration systems, wherein treatment systems, or a sub-systems thereof, separate supernatant from the composition to produce a concentrated composition (e.g., the concentrated composition is more concentrated with to respect to carbonates, bicarbonates, or carbonates and carbonates).

The dewatering system may include a liquid-solid separator for separating precipitation material from precipitation reaction mixture. The liquid-solid separator may achieve separation of precipitation material from precipitation reaction mixture by draining (e.g., gravitational sedimentation of the precipitation material followed by draining), decanting, filtering (e.g., gravity filtration, vacuum filtration, filtration using forced air), centrifuging, pressing, or any combination thereof. At least one liquid-solid separator is operably connected to the processor such that precipitation reaction mixture may flow from the processor to the liquid-solid separator. Any of a number of different liquid-solid separators may be used in combination, in any arrangement (e.g., parallel, series, or combinations thereof), and the precipitation reaction mixture may flow directly to the liquid-solid separator, or the precipitation reaction mixture may be pre-treated.

The system may also include a washer where bulk dewatered precipitation material from liquid-solid separator is washed (e.g., to remove salts and other solutes from the precipitation material), prior to drying at the drying station. The treatment system may include a dryer for drying the precipitation material comprising carbonates (e.g., calcium carbonate, magnesium carbonate), bicarbonates, or a combination thereof produced in the processor. Depending on the particular system, the dryer may include a filtration element, freeze-drying structure, spray-drying structure, or the like. The system may include a conveyer (e.g., duct) from the industrial plant that is connected to the dryer so that heat from the $CO_2$-containing gas (i.e., industrial plant flue gas) may be contacted directly with the wet precipitation material in the drying stage.

The dried precipitation material may undergo further processing (e.g., grinding, milling) in refining station in order to obtain desired physical properties. One or more components may be added to the precipitation material during refining if the precipitation material is to be used as a building material.

The system further includes outlet conveyers (e.g., conveyer belt, slurry pump) configured for removal of precipitation material from one or more of the following: the processor, dryer, washer, or from the refining station. The composition may be used for building materials or may be disposed of in a number of different ways. The precipitation material may be transported to a long-term storage site in empty conveyance vehicles (e.g., barges, train cars, trucks, etc.) that may include both above ground and underground storage facilities. In other embodiments, the precipitation material may be disposed of in an underwater location. Any convenient conveyance structure for transporting the precipitation material to the site of disposal may be employed. In certain embodiments, a pipeline or analogous slurry conveyance structure may be employed, wherein these structures may include units for active pumping, gravitational mediated flow, and the like.

A person having ordinary skill in the art will appreciate that flow rates, mass transfer, and heat transfer may vary and may be optimized for systems and methods described herein, and that parasitic load on a power plant may be reduced while carbon sequestration is maximized.

Recirculation of treatment system supernatant may be advantageous as recirculation may provide efficient use of available resources; minimal disturbance of surrounding environments; and reduced energy requirements, which may provide lower carbon footprints for systems and methods provided herein. When a carbon dioxide-processing system of the invention is operably connected to an industrial plant (e.g., fossil fuel-fired power plant such as coal-fired power plant) and utilizes power generated at the industrial plant, reduced energy requirements provided by recirculation of treatment system supernatant provide for a reduced parasitic load on the industrial plant.

The parasitic load of carbon dioxide-processing systems of the invention may be further reduced by efficient use of other resources. In some embodiments, the parasitic load of carbon dioxide-processing systems of the invention may be further reduced by efficient use of heat from an industrial source. In some embodiments, for example, heat from the industrial source of carbon dioxide (e.g., flue gas heat from a coal-fired power plant) may be utilized for drying a composition comprising precipitation material comprising carbonates, bicarbonates, or carbonates and bicarbonates. In such embodiments, a spray dryer may be used for spray drying the composition. For example, low-grade (e.g., 150-200° C.) waste heat may be utilized by means of a heat exchanger to evaporatively spray dry the composition comprising the precipitation material. In addition, utilizing heat from the industrial source of carbon dioxide for drying compositions of the invention allows for simultaneous cooling of the industrial source of carbon dioxide (e.g., flue gas from a coal-fired power plant), which enhances dissolution of carbon dioxide, a process which is inversely related to temperature.

In some embodiments, the parasitic load of carbon dioxide-processing systems of the invention may be further reduced by efficient use of pressure. For example, in some embodiments, carbon dioxide-processing systems of the invention are configured with an energy recovery system. Such energy recovery systems are known, for example, in the art of desalination and operate by means of pressure exchange. As such, carbon dioxide-processing systems of the invention configured for recirculation, heat exchange, and/or pressure exchange may reduce the parasitic load on power-providing industrial plants while maintaining carbon dioxide processing capacity.

The gaseous waste stream may be provided by the industrial plant to the $CO_2$-processing system of the invention in any convenient manner that conveys the gaseous waste stream. In some embodiments, the waste gas stream is provided with a gas conveyor (e.g., a duct, pipe, etc.) that runs from flue or analogous structure of the industrial plant (e.g., a flue of the industrial plant) to one or more locations of the $CO_2$-processing system. In such embodiments, a line (e.g., a duct, pipe, etc.) may be connected to the flue of the industrial plant such that gas leaving through the flue is conveyed to the appropriate location(s) of the $CO_2$-processing system (e.g., processor or a component thereof, such as a gas-liquid contactor or gas-liquid-solid contactor). Depending upon the particular configuration of the $CO_2$-processing system, the location of the gas conveyor on the industrial plant may vary, for example, to provide a waste gas stream of a desired temperature. As such, in some embodiments, where a gaseous waste stream having a temperature ranging for 0° C. to 2000° C., such as 0° C. to 1800° C., including 60° C. to 700° C., for example, 100° C. to 400° C. is desired, the flue gas may be obtained at the exit point of the boiler, gas turbine, kiln, or at any point of the power plant that provides the desired temperature. The gas conveyor may be configured to maintain flue gas at a temperature above the dew point (e.g., 125° C.) in order to avoid condensation and related complications. Other steps may be taken to reduce the adverse impact of condensation and other deleterious effects, such as employing ducting that is stainless steel or fluorocarbon (such as poly(tetrafluoroethylene)) lined such the duct does not rapidly deteriorate.

D. Utility

The cementitious compositions provided herein find use in a variety of different applications, particularly as building or construction materials. Specific structures in which the settable compositions find use include, but are not limited to: pavements, architectural structures, e.g., buildings, foundations, motorways/roads, overpasses, parking structures, brick/block walls and footings for gates, fences and poles, bridges, foundations, levees, dams. Mortars find use in binding construction blocks, e.g., bricks, together and filling gaps between construction blocks. Mortars can also be used to fix existing structure, e.g., to replace sections where the original mortar has become compromised or eroded, among other uses.

In some embodiments, compositions, methods and systems find use in reducing the amount of $CO_2$ that is generated in producing buildings and then operating buildings. Specifically, the methods can reduce $CO_2$ generation in production of building materials, e.g., concrete. In addition, the methods can reduce $CO_2$ emission in power generation, which reduces $CO_2$ emissions connected with operating a building during its life.

The compositions, methods and systems find use in $CO_2$ sequestration, particularly via sequestration in the built environment. Sequestering $CO_2$ comprises removal or segregation of $CO_2$ from the gaseous stream, such as a gaseous waste stream, and fixating it into a stable non-gaseous form so that the $CO_2$ cannot escape into the atmosphere. $CO_2$ sequestration comprises the placement of $CO_2$ into a storage stable form, e.g., a component of the built environment, such as a building, road, dam, levee, foundation, etc. As such, sequestering of $CO_2$ according to some methods, results in prevention of $CO_2$ gas from entering the atmosphere and long-term storage of $CO_2$ in a manner that $CO_2$ does not become part of the atmosphere. By storage stable form is meant a form of matter that may be stored above ground or underwater under exposed conditions (i.e., open to the atmosphere, underwater environment, etc.) without significant, if any, degradation for extended durations, e.g., 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer. As the storage stable form undergoes little if any degradation while stored, the amount of degradation if any as measured in terms of $CO_2$ gas release from the product will not exceed 5%/year, and in certain embodiments will not exceed 1%/year. The above-ground storage stable forms may be storage stable under a variety of different environment conditions, e.g., from temperatures ranging from −100° C. to 600° C., humidity ranging from 0 to 100%, where the conditions may be calm, windy, turbulent or stormy. The below water storage stable forms are similarly stable to with respect to underwater environment conditions. Embodiments of the methods may be used to capture the waste $CO_2$ of industrial processes, e.g., power generation, cement production, chemical production, paper and steel mills, etc.

The following examples are put forth so as to provide those of ordinary skill in the art with a complete disclosure and description of how to make and use the system, methods, and compositions described herein, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for:

EXAMPLES

Materials produced in accordance with this disclosure used one or more of the following analytical instruments and/or methods for characterization. The following analytical instrumentation and methods of use thereof may be used to characterize materials produced in accordance with description provided herein.

Coulometry: Liquid and solid carbon containing samples were acidified with 2.0 N perchloric acid (HClO4) to evolve carbon dioxide gas into a carrier gas stream, and subsequently scrubbed with 3% w/v silver nitrate at pH 3.0 to remove any evolved sulfur gasses prior to analysis by an inorganic carbon coulometer (UIC Inc, model CM5015). Samples of cement, fly ash, and seawater are heated after addition of perchloric acid with a heated block to aid digestion of the sample.

Brunauer-Emmett-Teller (BET) Specific Surface Area: Specific surface area (SSA) measurement was by surface absorption with dinitrogen (BET method). SSA of dry samples was measured with a Micromeritics Tristar™ II 3020 Specific Surface Area and Porosity Analyzer after preparing the sample with a Flowprep™ 060 sample degas system. Briefly, sample preparation involved degassing approximately 1.0 g of dry sample at an elevated temperature while exposed to a stream of dinitrogen gas to remove residual water vapor and other adsorbants from the sample surfaces. The purge gas in the sample holder was subsequently evacuated and the sample cooled before being exposed to dinitrogen gas at a series of increasing pressures (related to adsorption film thickness). After the surface was blanketed, the dinitrogen was released from the surface of the particles by systematic reduction of the pressure in the sample holder. The desorbed gas was measured and translated to a total surface area measurement.

Particle Size Analysis (PSA): Particle size analysis and distribution were measured using static light scattering. Dry particles were suspended in isopropyl alcohol and analyzed using a Horiba Particle Size Distribution Analyzer (Model LA-950V2) in dual wavelength/laser configuration. Mie scattering theory was used to calculate the population of particles as a function of size fraction, from 0.1 mm to 1000 mm.

Powder X-ray Diffraction (XRD): Powder x-ray diffraction was undertaken with a Rigaku Miniflex™ (Rigaku) to identify crystalline phases and estimate mass fraction of different identifiable sample phases. Dry, solid samples were hand-ground to a fine powder and loaded on sample holders. The X-ray source was a copper anode (Cu kα), powered at 30 kV and 15 mA. The X-ray scan was run over 5-90°2θ, at a scan rate of 2°2θ per min, and a step size of 0.01°2θ per step. The X-ray diffraction profile was analyzed by Rietveld refinement using the X-ray diffraction pattern analysis software Jade™ (version 9, Materials Data Inc. (MDI)).

Fourier Transform Infrared ("FT-IR") spectroscopy: FT-IR analyses were performed on a Nicolet 380 equipped with the Smart Diffuse Reflectance module. All samples were weighed to 3.5±0.5 mg and hand ground with 0.5 g KBr and subsequently pressed and leveled before being inserted into the FTIR for a 5-minute nitrogen purge. Spectra were recorded in the range 400-4000 $cm^{-1}$.

Scanning Electron Microscopy (SEM): SEM was performed using a Hitachi TM-1000 tungsten filament tabletop microscope using a fixed acceleration voltage of 15 kV at a working pressure of 30-65 Pa, and a single BSE semiconductor detector. Solid samples were fixed to the stage using a carbon-based adhesive; wet samples were vacuum dried to a graphite stage prior to analysis. EDS analysis was performed using an Oxford Instruments SwiftED-TM system, the sensor for which has a detection range of 11Na-92U with an energy resolution of 165 eV.

Alternatively, SEM was performed using a Hitachi SU-6600 field emission microscope capable of operation at accelerating voltages ranging from 0.5-30 kV at working pressures ranging from 10-8-300 Pa. Available detectors include a SE, BSE, and ESED. EDX analysis utilized an Oxford Instruments INCA Energy SEM 350 Energy Dispersive Microanalysis system with INCA X-ACT Analytical Drift Detector, having a detection range of Be—Pu and a resolution of 129 eV. Sample preparation involves fixation to a stage by means of either a carbon-based adhesive or silver paint. Non-conductive samples are coated with a thin layer of either gold or carbon prior to analysis.

Chloride: Chloride concentrations were determined with Chloride QuanTab® Test Strips (Product No. 2751340), having a testing range between 300-6000 mg chloride per liter solution measured in 100-200 ppm increments.

X-ray Fluorescence (XRF): XRF analyses of solid powder samples were performed using a Thermo Scientific ARL QUANT'X Energy-Dispersive XRF spectrometer, equipped with a silver anode X-ray source and a Peltier cooled Si(Li) X-ray detector. The samples were pressed into 31 mm pellets using an aluminum sample cup. For each sample, three different spectra were gathered, each tailored for analysis of specific elements: the first using no X-ray filter at 4 kV, the second using a thin silver filter at 18 kV, and the third using a thick silver filter at 30 kV, all under vacuum conditions. Spectra were analyzed using WinTrace software, using a Fundamental Parameters analysis method attained from calibration with certified standard materials.

Thermogravimetric Analysis (TGA): TGA analyses of solid powder samples were performed with a TA Instruments SDT Q600 with simultaneous TGA/DSC (Differential Scanning calorimetry). Samples, in an alumina crucible, were placed into a furnace that was heated from room temperature to 1000° C. at a constant ramp rate of 20° C. per minute. The weight loss profile over temperature was analyzed using Universal Analysis software.

Inductively Coupled Plasma Optical Emission Spectrometry (ICP-OES): ICP-OES analyses of typical acidified, liquid samples were performed using a Thermo ICAP 6500 equipped with a CETAC autosampler. iTEVA control software was used for data acquisition and analysis. Although the detection limit for this method has not been determined typical detection limits are in the ppm range. Samples that contain high concentrations of dissolved salts (Na, Ca, Mg) were analyzed using the ICAP 6500 equipped with an ESI SEAfast autosampler equipped with a chelation column for matrix elimination analyte preconcentration.

Example 1

Calcium Carbonate Cement Paste, Mortar, and Concrete

The calcium carbonate composition was produced by the process described herein. In the process, a hard brine solution was prepared by diluting concentrated $CaCl_2$ to 0.355 mol/L and subsequently $Na_2SO_4$ was dissolved to a concentration of 0.0061 mol/L in the hard brine solution. Alkaline brine was prepared by absorbing $CO_2$ from raw flue gas from a natural gas power plant into a 1.382 mol/L NaOH solution, until the pH was between 10-11. The two solutions were mixed flowed into a mixed tank at rates of 8.17 gpm of hard brine solution and 3.88 gpm of alkaline solution. The precipitated slurry was pumped out of the bottom of the tank at a rate that maintained a constant volume of 70 gallons in the tank (average liquid residence time in the tank was 5.8 min). The slurry was allowed to gravity settle, while continuously decanting. The concentrated slurry was then filter pressed and subsequently dried in a swirl fluidized dryer resulting in the calcium carbonate composition. Characterization of the calcium carbonate composition in terms of mineralogy, composition, and particle morphology and distribution are shown in Tables 1-3.

TABLE 1

Phase composition of the calcium carbonate composition

| Phase/Oxide | Amount in Sample (weight %) |
|---|---|
| Vaterite | 83 |
| Calcite | 17 |

TABLE 2

Chemical composition of the calcium carbonate composition

| Oxide | Amount in Sample (weight %) |
|---|---|
| $SiO_2$ | 0.2 |
| CaO | 54.5 |
| MgO | 0.4 |
| SrO | 0.1 |
| $SO_3$ | 0.5 |
| LOI* | 44.1 |
| Moisture | 0.9 |

*LOI is mass lost on ignition to 950° C.

TABLE 3

| Mean particle size (PS) | 21.4 µm |
|---|---|
| Standard deviation (STD) | 7.4 µm |

The calcium carbonate cement paste, mortar, and concrete formulations were formed, as illustrated in Table 4. The formulations were in the forms of paste (100% cement or the calcium carbonate composition), mortar (cement and quartz sand), and concrete (cement, quartz sand and rocks). The materials were mixed with 1% $MgCl_2$ solution at water-to-cement ratios ranging 0.3-0.5 in a Hobart mixer for 5 mins. The mixed materials were then cast into 2×2×2 cubes and then cured in a 60° C., 100% RH chamber for 1 day. At 1 day of reaction, the test cubes had set with about 30% of the vaterite contained in the cement transformed to aragonite. The cubes were then demolded and cured in $MgCl_2$ solution bath at 60° C. for 6 days. At 7 day of reaction, majority of the vaterite contained in the cement had transformed to aragonite and the test cubes were dried in a 100° C. oven for 24 hours and stored at a 40° C. oven until testing.

TABLE 4

|  | Paste | Mortar | Concrete 1 | Concrete 2 | Concrete 3 | Concrete 4 |
|---|---|---|---|---|---|---|
| Cement (wt %) | 100 | 27 | 15 | 21 | 32 | 42 |
| Sand (wt %) | 0 | 73 | 41 | 63 | 41 | 23 |
| Rocks (wt %) | 0 | 0 | 44 | 16 | 27 | 35 |
| w/cement | 0.35 | 0.30 | 0.35 | 0.40 | 0.40 | 0.40 |
| Porosity (vol %) | 54 | 26 | 54 | 21 | 29 | 36 |
| 7-day compressive strength (psi) | 4500 | 5400 | 3100 | 4200 | 4200 | 4600 |

Figure 6:
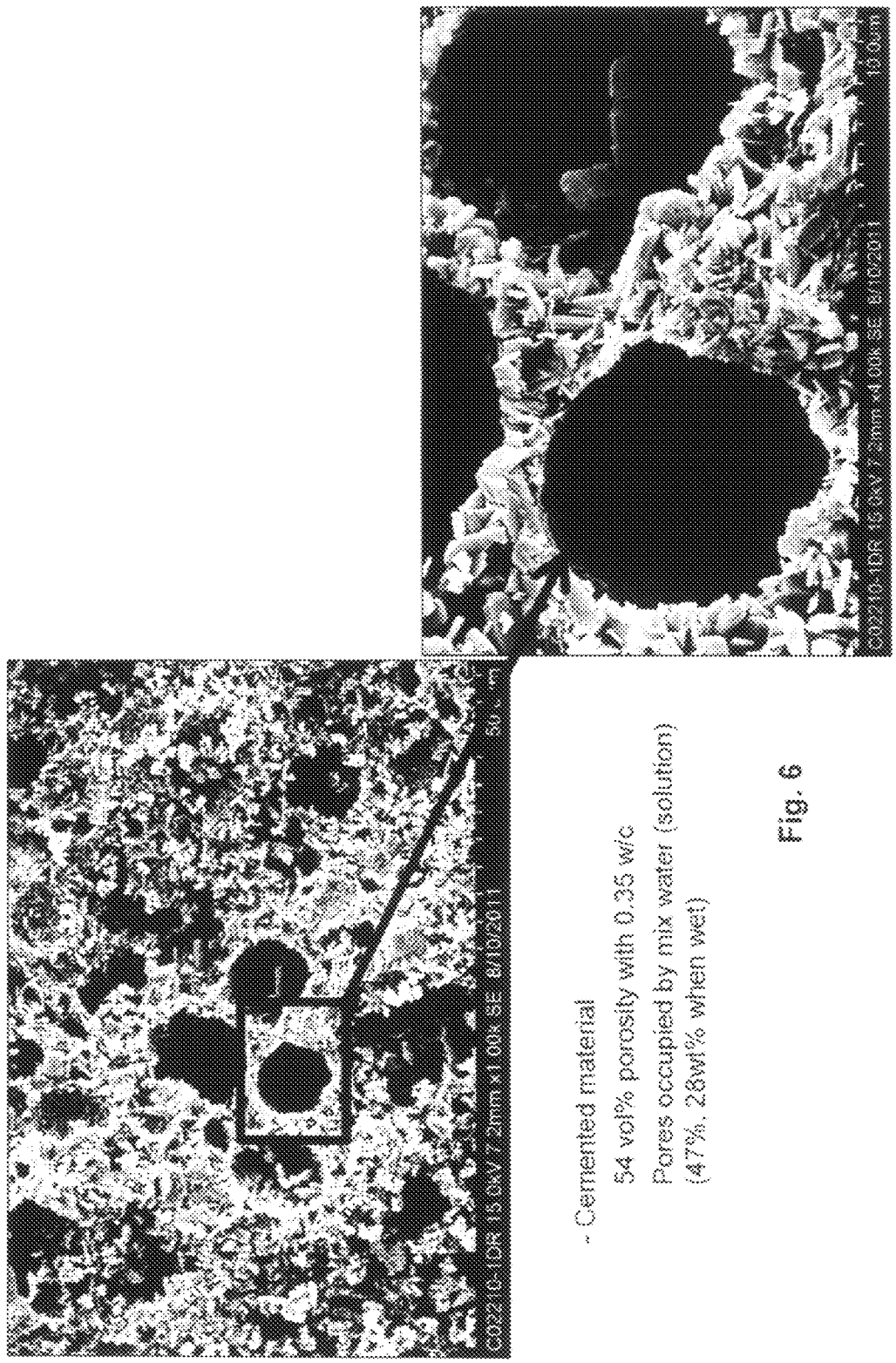
FIG. 6 illustrates scanning electron microscopy (SEM) images of 100 wt % calcium carbonate cement in a paste.

For the paste formulation (100 wt % calcium carbonate), the cemented material was found to have 54 vol % porosity after the evaporation of the water, as illustrated in the SEM image of FIG. 6. The formation of aragonitic needles is also evident in FIG. 6. For the mortar cubes, the SEM imaging showed that calcium carbonates containing vaterite after setting and hardening transformed to aragonite which acted as a binder to the sand, as illustrated in FIG. 7.

Although the foregoing has been described in some detail by way of illustration and example for purposes of clarity of understanding, it is readily apparent to those of ordinary skill in the art in light of the teachings described herein that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:
1. A cementitious composition, comprising:
between 10-55 wt % of a composition comprising calcium carbonate, wherein between 50-100 wt % of the calcium carbonate is in a metastable polymorphic form compris- ing vaterite, and wherein the calcium carbonate has a $\delta^{13}C$ value of between −12 to −30‰; and between 45-90 wt % of aggregate, wherein the cementitious composition after combination with water sets and hardens into cement wherein the calcium carbonate binds to the aggregate.

2. The cementitious composition of claim 1, comprising between 10-25 wt % of the composition comprising calcium carbonate and between 75-90 wt % of the aggregate.

3. The cementitious composition of claim 1, wherein the calcium carbonate comprises other polymorphic forms selected from the group consisting of amorphous calcium carbonate, aragonite, calcite, and combinations thereof.

4. The cementitious composition of claim 1, wherein the aggregate comprises fine aggregate, coarse aggregate, or a combination thereof.

5. The cementitious composition of claim 4, wherein the fine aggregate is sand.

6. The cementitious composition of claim 4, wherein the coarse aggregate is rock.

7. The cementitious composition of claim 1, wherein the cement has a compressive strength of at least 2000 psi after at least 1 day, 7 days, or 28 days.

8. The cementitious composition of claim 7, wherein the cement has a compressive strength of at least 3000 psi or between 2000-6000 psi.

9. The cementitious composition of claim 1, wherein the cement has a porosity of between 10-90 vol %.

10. The cementitious composition of claim 1, wherein the cementitious composition further comprises fly ash, slag, metakaolin, admixture, or combinations thereof.

11. A method for forming a cementitious composition of claim 1, comprising:

mixing between 10-55 wt % of a composition comprising calcium carbonate, wherein between 50-100 wt % of the calcium carbonate is in a metastable polymorphic form comprising vaterite, and wherein the calcium carbonate has a $\delta^{13}C$ value of between −12 to −30‰, with between 45-90 wt % of aggregate to form a cementitious composition of claim 1, and contacting the cementitious composition with water when the cementitious composition sets and hardens into cement where the calcium carbonate binds to the aggregate.

12. The method of claim 11, further comprising before the mixing step a) making the composition comprising calcium carbonate by contacting an industrial waste gas stream comprising carbon dioxide with a proton removing agent to form a carbon dioxide charged water; and b) contacting the carbon dioxide charged water with divalent cations to form the composition comprising calcium carbonate.

13. The method of claim 12, wherein the contacting of the carbon dioxide charged water with the divalent cations is under precipitation conditions that favor the formation of the composition comprising calcium carbonate that has between 50-100 wt % of the calcium carbonate in a metastable polymorphic form comprising vaterite.

14. The method of claim 13, wherein the precipitation conditions are selected from temperature, pH, residence time, proton removing agent, additive, ion ratio, rate of precipitation, mixing rate, form of agitation, presence of seed crystal, catalyst, membrane, substrate, separation, drying, refining, and combinations thereof.

15. The method of claim 12, wherein the industrial waste gas stream is from an industrial plant selected from power plant, chemical processing plant, steel mill, paper mill, cement plant, other industrial plant that produces $CO_2$ as a byproduct, and combinations thereof.

16. The method of claim 12, wherein the proton removing agent is NaOH, $Na_2CO_3$, KOH, $K_2CO_3$, $NH_4OH$, $Ca(OH)_2$, $Mg(OH)_2$, or combinations thereof.

17. The method of claim 11, wherein the calcium carbonate binds to the aggregate when the vaterite transforms to aragonite.

18. The method of claim 11, wherein the calcium carbonate comprises other polymorphic forms selected from the group consisting of amorphous calcium carbonate, aragonite, calcite, and combinations thereof.

19. The method of claim 11, wherein the aggregate comprises fine aggregate, coarse aggregate, or a combination thereof.

20. The composition of claim 1, wherein the cementitious composition after combination with water sets and hardens into cement and forms building or construction materials.

21. The composition of claim 1, wherein the cementitious composition after combination with water sets and hardens into cement and forms pavement, architectural structure, foundation, motorway/road, overpass, parking structure, brick, block, wall, footing for gate, fence and pole, bridge, foundation, levee, dam, or combinations thereof.

22. A cementitious composition, comprising:

between 10-55 wt % of a composition comprising calcium carbonate, wherein between 50-100 wt % of the calcium carbonate is in a metastable polymorphic form comprising vaterite, and wherein the calcium carbonate has a $\delta^{13}C$ value of between −12 to −30‰; and between 45-90 wt % of aggregate, wherein the cementitious composition after combination with water sets and hardens into brick or block wherein the calcium carbonate binds to the aggregate.

23. The method of claim 11, wherein the cementitious composition sets and hardens into cement with a compressive strength of at least 2000 psi.

* * * * *